(12) United States Patent
Saarenvirta

(10) Patent No.: US 11,783,338 B2
(45) Date of Patent: Oct. 10, 2023

(54) SYSTEMS AND METHODS FOR OUTLIER DETECTION OF TRANSACTIONS

(71) Applicant: Daisy Intelligence Corporation, Toronto (CA)

(72) Inventor: Kari Saarenvirta, Toronto (CA)

(73) Assignee: Daisy Intelligence Corporation, Toronto (CA)

(*) Notice: Subject to any disclaimer, the term of this patent is extended or adjusted under 35 U.S.C. 154(b) by 50 days.

(21) Appl. No.: 17/156,025

(22) Filed: Jan. 22, 2021

(65) Prior Publication Data

US 2022/0237620 A1 Jul. 28, 2022

(51) Int. Cl.
G06Q 20/40 (2012.01)

(52) U.S. Cl.
CPC ................................ *G06Q 20/4016* (2013.01)

(58) Field of Classification Search
CPC .................................................. G06Q 20/4016
See application file for complete search history.

(56) References Cited

U.S. PATENT DOCUMENTS

| | | | |
|---|---|---|---|
| 5,920,848 A | 7/1999 | Schutzer et al. | |
| 5,926,798 A | 7/1999 | Carter | |
| 5,953,707 A | 9/1999 | Huang et al. | |
| 6,029,139 A | 2/2000 | Cunningham et al. | |
| 6,032,146 A | 2/2000 | Chadha et al. | |
| 6,119,101 A | 9/2000 | Peckover | |
| 6,366,890 B1 | 4/2002 | Usrey | |
| 6,401,080 B1 | 6/2002 | Bigus et al. | |
| 6,609,101 B1 | 8/2003 | Landvater | |
| 6,892,376 B2 | 5/2005 | McDonald et al. | |
| 6,910,017 B1 | 6/2005 | Woo et al. | |
| 7,024,592 B1 | 4/2006 | Voas et al. | |
| 7,069,560 B1 | 6/2006 | Cheyer et al. | |
| 7,130,811 B1 | 10/2006 | Delurgio et al. | |
| 7,249,031 B2 | 7/2007 | Close et al. | |

(Continued)

FOREIGN PATENT DOCUMENTS

| | | |
|---|---|---|
| CA | 2982930 A1 | 4/2019 |
| CN | 111539733 A | 8/2020 |

(Continued)

OTHER PUBLICATIONS

"Irofti et al., Quick survey of graph-based fraud detection methods, Jan. 11, 2021, Arxiv.org, entire document" (Year: 2021).*

(Continued)

*Primary Examiner* — Abhishek Vyas
*Assistant Examiner* — Adam Hilmantel
(74) *Attorney, Agent, or Firm* — BERESKIN & PARR LLP/S.E.N.C.R.L. s.r.l; Isis E. Caulder; Paul David Blizzard

(57) ABSTRACT

Described are systems and methods for outlier detection and transaction monitoring. This may include collecting corporate data, determining features, detecting relevant features, determining a system model, determining a control policy, monitoring incoming transactions, determining if an outlier alert should be sent, transmitting the outlier alert, receiving user adjudication of the fraud alerts, and feedback of the adjudication. The systems and methods may use aspects of fuzzy logic, predictive modeling, network and community detection, outlier detection, and fuzzy aggregation.

18 Claims, 41 Drawing Sheets

(56) References Cited

U.S. PATENT DOCUMENTS

| | | |
|---|---|---|
| 7,249,032 B1 | 7/2007 | Close et al. |
| 7,249,033 B1 | 7/2007 | Close et al. |
| 7,302,410 B1 | 11/2007 | Venkatraman et al. |
| 7,379,890 B2 | 5/2008 | Myr et al. |
| 7,480,623 B1 | 1/2009 | Landvater |
| 7,523,047 B1 | 4/2009 | Neal et al. |
| 7,668,769 B2 | 2/2010 | Baker et al. |
| 7,672,866 B2 | 3/2010 | Venkatraman et al. |
| 7,752,067 B2 | 7/2010 | Fotteler et al. |
| 8,010,404 B1 | 8/2011 | Wu et al. |
| 8,370,184 B2 | 2/2013 | Fotteler et al. |
| 8,370,185 B2 | 2/2013 | Fotteler et al. |
| 8,620,722 B2 | 12/2013 | Kettner et al. |
| 8,639,548 B2 | 1/2014 | Fotteler et al. |
| 8,639,558 B2 | 1/2014 | Desai et al. |
| 9,940,649 B2 | 4/2018 | Rosenberg |
| 10,074,142 B1 | 9/2018 | Rozenson |
| 10,141,780 B2 | 11/2018 | Sun et al. |
| 10,147,065 B1 | 12/2018 | Yiftachel et al. |
| 10,567,402 B1 * | 2/2020 | Comeaux ............ H04L 63/1433 |
| 10,621,533 B2 | 4/2020 | Saarenvirta |
| 10,629,191 B1 | 4/2020 | Cheng et al. |
| 10,832,251 B1 | 11/2020 | Pike et al. |
| 10,878,460 B2 | 12/2020 | Genc-Kaya et al. |
| 11,468,387 B2 | 10/2022 | Saarenvirta |
| 11,562,386 B2 | 1/2023 | Saarenvirta |
| 2002/0069134 A1 | 6/2002 | Solomon |
| 2002/0116349 A1 | 8/2002 | Batachia et al. |
| 2002/0147630 A1 | 10/2002 | Rose et al. |
| 2003/0149578 A1 | 8/2003 | Wong |
| 2003/0187708 A1 | 10/2003 | Baydar et al. |
| 2003/0229502 A1 | 12/2003 | Woo |
| 2003/0233305 A1 | 12/2003 | Solomon |
| 2004/0059549 A1 | 3/2004 | Kropaczek et al. |
| 2004/0205034 A1 | 10/2004 | Bigus et al. |
| 2005/0091147 A1 | 4/2005 | Ingargiola et al. |
| 2005/0125768 A1 | 6/2005 | Wong et al. |
| 2005/0144218 A1 | 6/2005 | Heintz |
| 2005/0189414 A1 | 9/2005 | Fano et al. |
| 2005/0197882 A1 | 9/2005 | Fotterler et al. |
| 2005/0197886 A1 | 9/2005 | Veit |
| 2005/0197899 A1 | 9/2005 | Veit et al. |
| 2005/0197901 A1 | 9/2005 | Veit et al. |
| 2005/0197928 A1 | 9/2005 | Fotterler et al. |
| 2005/0234696 A1 | 10/2005 | North et al. |
| 2005/0256787 A1 | 11/2005 | Wadawadigi et al. |
| 2005/0267807 A1 | 12/2005 | Bentley |
| 2005/0273376 A1 | 12/2005 | Ouimet et al. |
| 2005/0288993 A1 | 12/2005 | Weng et al. |
| 2006/0020866 A1 | 1/2006 | Lo et al. |
| 2006/0155660 A1 | 7/2006 | Koshizen et al. |
| 2007/0033098 A1 | 2/2007 | Peters et al. |
| 2007/0143186 A1 | 6/2007 | Apple et al. |
| 2007/0192168 A1 | 8/2007 | Van Luchene |
| 2007/0282668 A1 | 12/2007 | Cereghini et al. |
| 2007/0282684 A1 | 12/2007 | Prosser et al. |
| 2007/0294736 A1 | 12/2007 | Brady et al. |
| 2008/0065476 A1 | 3/2008 | Klein et al. |
| 2008/0077459 A1 | 3/2008 | Desai et al. |
| 2008/0235076 A1 | 9/2008 | Cereghini et al. |
| 2008/0288354 A1 | 11/2008 | Flinn et al. |
| 2009/0070129 A1 | 3/2009 | Inbar et al. |
| 2009/0112608 A1 | 4/2009 | Abu-Hakima et al. |
| 2009/0138365 A1 | 5/2009 | Mueller et al. |
| 2009/0249287 A1 | 10/2009 | Patrick |
| 2009/0259516 A1 | 10/2009 | Zeevi et al. |
| 2009/0271245 A1 | 10/2009 | Joshi et al. |
| 2009/0327476 A1 | 12/2009 | Grell et al. |
| 2010/0100418 A1 | 4/2010 | Richter et al. |
| 2010/0106561 A1 | 4/2010 | Peredriy et al. |
| 2010/0145773 A1 | 6/2010 | Desai et al. |
| 2010/0169114 A1 | 7/2010 | Henderson et al. |
| 2010/0205044 A1 | 8/2010 | Scheer |
| 2010/0217702 A1 | 8/2010 | Tu |
| 2010/0235231 A1 | 9/2010 | Jewer et al. |
| 2010/0287029 A1 | 11/2010 | Dodge et al. |
| 2010/0318403 A1 | 12/2010 | Bottom |
| 2010/0324941 A1 | 12/2010 | Stevenson et al. |
| 2011/0107260 A1 | 5/2011 | Park et al. |
| 2011/0153386 A1 | 6/2011 | Kim et al. |
| 2012/0226613 A1 | 9/2012 | Adjaoute |
| 2012/0245887 A1 | 9/2012 | Spears et al. |
| 2013/0145174 A1 | 6/2013 | Hallum et al. |
| 2013/0218498 A1 | 8/2013 | Droit et al. |
| 2013/0325596 A1 | 12/2013 | Ouimet |
| 2014/0058763 A1 | 2/2014 | Zizzamia et al. |
| 2014/0222594 A1 | 8/2014 | Rose et al. |
| 2014/0278479 A1 | 9/2014 | Wang et al. |
| 2014/0314225 A1 | 10/2014 | Riahi et al. |
| 2015/0032512 A1 | 1/2015 | Bateni |
| 2015/0046332 A1 | 2/2015 | Adjaoute |
| 2015/0081393 A1 | 3/2015 | Cohen et al. |
| 2015/0161622 A1 | 6/2015 | Hoffmann et al. |
| 2015/0195300 A1 | 7/2015 | Adjaoute |
| 2015/0227951 A1 | 8/2015 | Hawley et al. |
| 2015/0242947 A1 | 8/2015 | Wilson et al. |
| 2015/0324828 A1 | 11/2015 | Ouimet |
| 2015/0324884 A1 | 11/2015 | Ouimet |
| 2015/0339672 A1 | 11/2015 | Adjaoute |
| 2015/0379510 A1 | 12/2015 | Smith |
| 2016/0055427 A1 | 2/2016 | Adjaoute |
| 2016/0148227 A1 | 5/2016 | Choe et al. |
| 2016/0180222 A1 | 6/2016 | Sierhuis et al. |
| 2017/0004430 A1 | 1/2017 | Auradkar et al. |
| 2017/0032400 A1 | 2/2017 | Gilmore et al. |
| 2017/0116549 A1 | 4/2017 | Sunshine et al. |
| 2017/0221086 A1 | 8/2017 | Zhou et al. |
| 2017/0236153 A1 | 8/2017 | Ouimet |
| 2017/0249648 A1 | 8/2017 | Garvey et al. |
| 2017/0270582 A1 | 9/2017 | Forss |
| 2017/0337198 A1 | 11/2017 | Saha et al. |
| 2017/0357563 A1 | 12/2017 | Shah |
| 2018/0033059 A1 | 2/2018 | Katsuki et al. |
| 2018/0053114 A1 * | 2/2018 | Adjaoute ............... G06N 20/00 |
| 2018/0060964 A1 | 3/2018 | Arora et al. |
| 2018/0101876 A1 | 4/2018 | Rosenberg et al. |
| 2018/0121988 A1 | 5/2018 | Hiranandani et al. |
| 2018/0225607 A1 | 8/2018 | Girishankar et al. |
| 2018/0293640 A1 | 10/2018 | Krappé |
| 2018/0300337 A1 | 10/2018 | Thomas et al. |
| 2019/0079958 A1 | 3/2019 | Bentley et al. |
| 2019/0084420 A1 | 3/2019 | Kim et al. |
| 2019/0114655 A1 | 4/2019 | Saarenvirta |
| 2019/0114687 A1 | 4/2019 | Krishnamurthy et al. |
| 2019/0130407 A1 | 5/2019 | Adjaoute |
| 2019/0156357 A1 | 5/2019 | Palinginis et al. |
| 2019/0189132 A1 | 6/2019 | Viswanathan |
| 2019/0197441 A1 | 6/2019 | Park et al. |
| 2019/0219993 A1 | 7/2019 | Jin et al. |
| 2019/0220793 A1 | 7/2019 | Saarenvirta |
| 2019/0259033 A1 * | 8/2019 | Reddy ...................... G06N 5/02 |
| 2019/0318035 A1 | 10/2019 | Blanco et al. |
| 2019/0362380 A1 | 11/2019 | Kochar et al. |
| 2021/0133752 A1 * | 5/2021 | Harris ................... G06F 18/217 |
| 2021/0173771 A1 | 6/2021 | Laftchiev et al. |
| 2021/0217409 A1 | 7/2021 | Choi et al. |
| 2021/0279753 A1 | 9/2021 | Saarenvirta |
| 2021/0312488 A1 | 10/2021 | Wick |

FOREIGN PATENT DOCUMENTS

| | | | |
|---|---|---|---|
| GB | 2380000 A | | 3/2003 |
| WO | 2005/089289 A2 | | 9/2005 |
| WO | 2010068551 A1 | | 6/2010 |
| WO | 2013003064 A1 | | 1/2013 |
| WO | WO-2016137443 A1 * | 9/2016 | ............ G06N 5/048 |

OTHER PUBLICATIONS

International Search Report and Written Opinion dated Apr. 14, 2022 in International Patent Application No. PCT/CA2022/050079 (14 pages).

(56) References Cited

OTHER PUBLICATIONS

Saarenvirta, "Evaluation of Turbulence Models for Internal Flows", Thesis for Degree of Master of Applied Science, Dept. of Aerospace Science and Engineering, University of Toronto, 2002, published 2003. (187 pages).
Notices of Allowance and References Cited dated Oct. 17, 2019 in U.S. Appl. No. 15/872,530. (21 pages).
Non-final Office Action and Notice of References Cited dated Feb. 3, 2020 in U.S. Appl. No. 15/795,821 (35 pages).
Final Office Action and Notice of References Cited dated May 14, 2020 in U.S. Appl. No. 15/795,821 (39 pages).
Non-final Office Action, Applicant Initiated Interview Summary, and Notice of References Cited dated Jan. 1, 2021 in U.S. Appl. No. 16/587,960 (46 pages).
Non-final Office Action, Applicant Initiated Interview Summary, and Notice of References Cited dated Jan. 6, 2021 in U.S. Appl. No. 16/834,628 (35 pages).
"Identity Matrix", Wikipedia, Dec. 17, 2017 <https://web.archive.org/web/20171217060011/https://en.wikipedia.org/wiki/Identity_matrix>.
Non-final Office Action and Notice of References Cited dated Apr. 6, 2021 in U.S. Appl. No. 15/795,821 (51 pages).
Final Office Action and Notice of References Cited dated May 12, 2021 in U.S. Appl. No. 16/587,960 (50 pages).
"Autoencoder", Wikipedia, archives org, Jul. 20, 2017 <https://web.archive.org/web/20170720143217/https://en.wikipedia.org/wiki/Autoencoder> (4-5 pages).
Extended European Search Report dated Jul. 16, 2021 in EP Patent Application No. 21160557.1 (9 pages).
Final Office Action and Notice of References Cited dated Dec. 29, 2021 in U.S. Appl. No. 15/795,821 (54 pages).
Non-final Office Action and Notice of References Cited dated Feb. 9, 2022 in U.S. Appl. No. 16/834,628 (58 pages).
Non-final Office Action and Notice of References Cited dated Mar. 3, 2022 in U.S. Appl. No. 16/807,214 (36 pages).
Gün et al., "Assortment planning using data mining algorithms," PICMET '08—2008 Portland International Conference on Management of Engineering & Technology, pp. 2312-2322.
Schwalb et al., "Leveraging in-memory technology for interactive analyses of point-of-sales data," 2014 IEEE 30th International Conference on Data Engineering Workshops, pp. 97-102.
Kopap et al., "Association and Classification Analysis on Retail Case Study," 2013 23rd International Conference on Computer Theory and Applications (ICCTA), pp. 141-149.
Notices of Allowance and References Cited dated Jun. 1, 2022 in U.S. Appl. No. 16/587,960 (16 pages).
Final Office Action and Notice of References Cited dated Jun. 2, 2022 in U.S. Appl. No. 16/834,628 (13 pages).
Notices of Allowance and References Cited dated Sep. 21, 2022 in U.S. Appl. No. 15/795,821 (18 pages).
Notices of Allowance and References Cited dated Feb. 13, 2023 in U.S. Appl. No. 16/834,628 (15 pages).

* cited by examiner

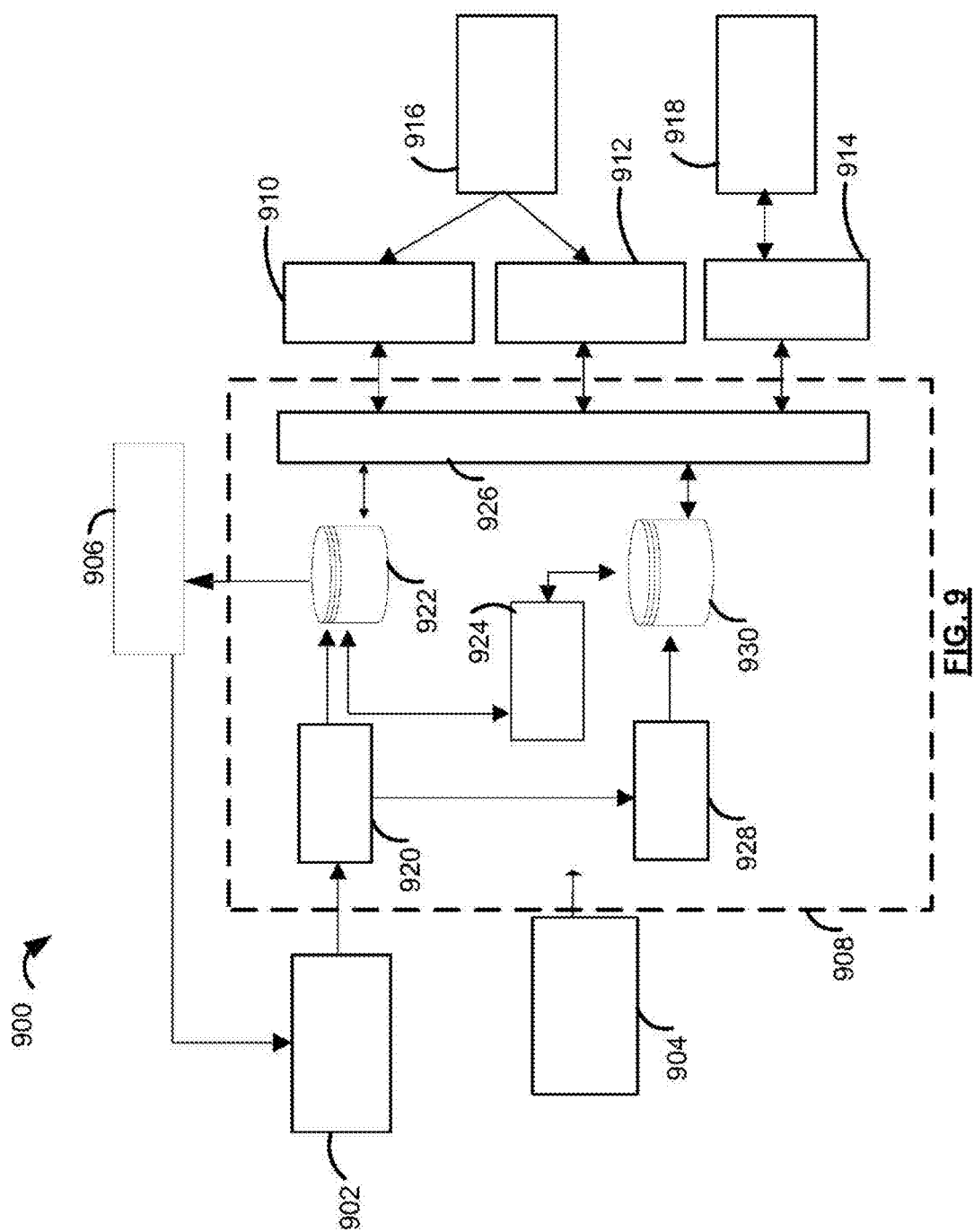

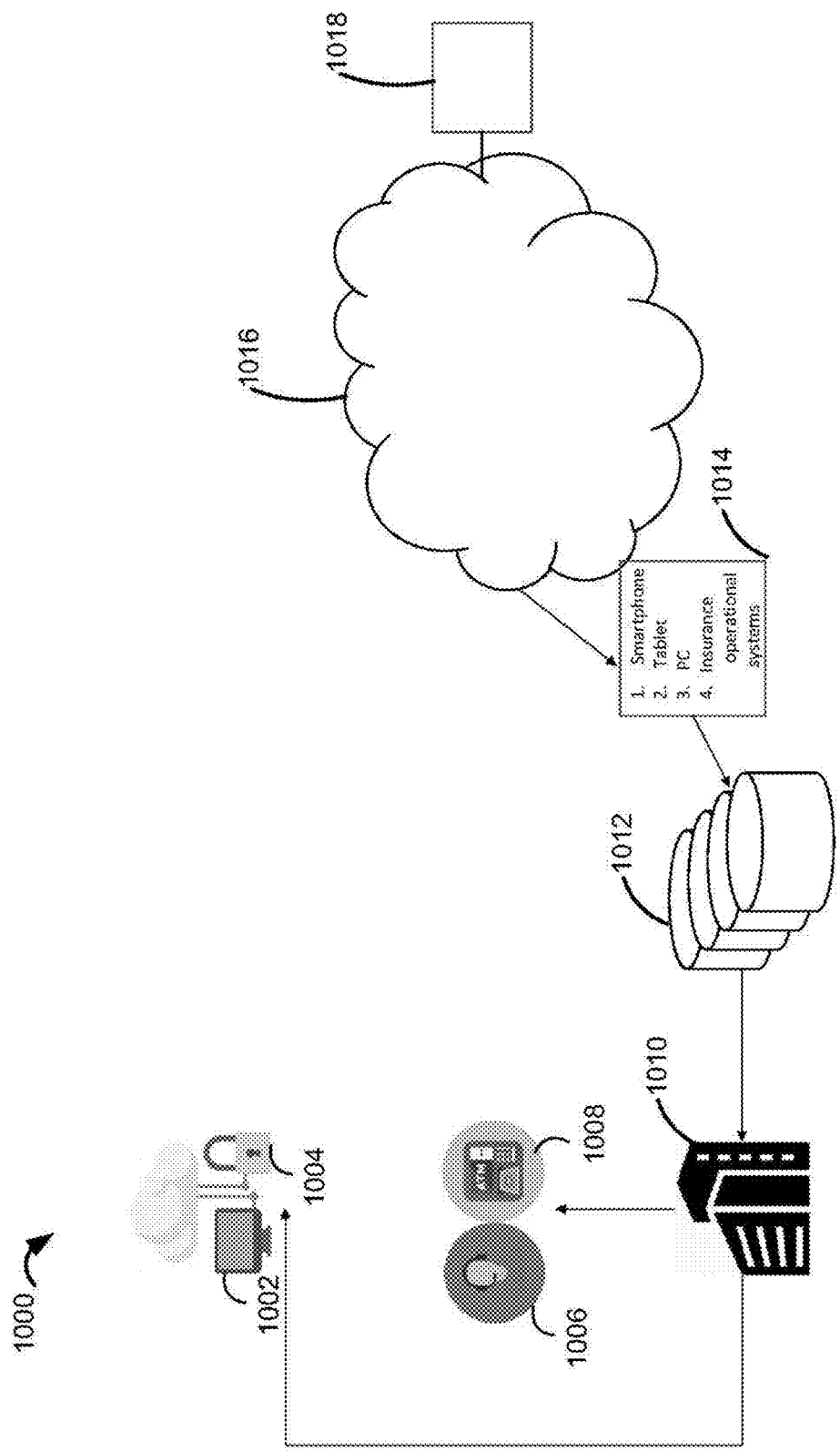

FIG. 16 dental predictive summary details

| PROVIDER_ID | PROVIDER_CD | REGION | AVERAGE PREDICTION | COUNT RECORDS |
|---|---|---|---|---|
| ABCD1234 | | 11 | 0.957 | 195,0000 |
| ABCD1234 | | 11 | 0.957 | 195,0000 |
| ABCD1234 | | 12 | 1.041 | 30,0000 |
| ABCD1234 | | 12 | 1.041 | 30,0000 |
| ABCD1234 | | 16 | 0.982 | 30,0000 |
| ABCD1234 | | 16 | 0.982 | 30,0000 |
| ABCD1234 | | 17 | 1.103 | 1,0000 |
| ABCD1234 | | 17 | 1.103 | 1,0000 |
| ABCD1234 | | 18 | 1.203 | 2,0000 |
| ABCD1234 | | 18 | 1.203 | 2,0000 |
| ABCD1234 | | 19 | 1.110 | 95,0000 |
| ABCD1234 | | 19 | 1.110 | 95,0000 |
| ABCD1234 | | 20 | 2.203 | 2,0000 |
| ABCD1234 | | 20 | 2.203 | 2,0000 |
| ABCD1234 | | 21 | 1.057 | 2,0000 |
| ABCD1234 | | 0 | 1.057 | 2,0000 |

Provider ID: DMD536032  Column Set: All

Get CSV File

Scoring for 2011

Growth (high is suspicious)

Decline (low is suspicious)

Bell (average is suspicious)

Inverted Bell (low and high is suspicious)

| | None | A Few | Some | Many |
|---|---|---|---|---|
| Very Bad | 0 | 0.44 | 0.56 | 0.18 |
| Bad | 1 | 0 | 0 | 0 |
| Somewhat Bad | 0.85 | 0.32 | 0 | 0 |
| Not Bad | 0 | 0 | 0.88 | 0.46 |

FIG. 31

| Fuzzy Rules | A Few Very Bad | Some Bad | Many Somewhat Bad | Many Not Bad |
|---|---|---|---|---|
| A Few Very Bad is a Very Low Score | 0.44 | | | |
| Some Bad is a Low Score | | 0 | | |
| Many somewhat bad is a medium Score | | | 0 | |
| Many not bad is a high score | | | | 0.46 |

FIG. 32

$$A = \begin{pmatrix} a_{11} & a_{12} & \ldots & a_{1m} \\ a_{21} & a_{22} & \ldots & a_{2m} \\ \ldots & \ldots & \ldots & \ldots \\ a_{n1} & a_{n2} & \ldots & a_{nm} \end{pmatrix}_{n \times m} = (a_{ij})_{n \times m}$$

$$B = \begin{pmatrix} B_{11} & B_{12} & \ldots & B_{1p} \\ B_{21} & B_{22} & \ldots & B_{2p} \\ \vdots & \vdots & \ddots & \vdots \\ B_{m1} & B_{m2} & \ldots & B_{mp} \end{pmatrix}$$

| Period | Actual Revenue or Profit or Transactions | Predicted Revenue or Profit or Transactions using Equation 1 | Feature #1 component of the mathematical theory | Feature #2 component of the mathematical theory | ... | Feature #N component of the mathematical theory |
|---|---|---|---|---|---|---|
| 1 | $Y_1$ | $\hat{Y}_1$ | $X_{11}$ | $X_{12}$ | ... | $X_{1N}$ |
| 2 | $Y_2$ | $\hat{Y}_2$ | $X_{21}$ | $X_{22}$ | ... | $X_{2N}$ |
| 3 | $Y_3$ | $\hat{Y}_3$ | $X_{31}$ | $X_{32}$ | ... | $X_{3N}$ |
| ... | ... | ... | ... | ... | ... | ... |
| Z | $Y_Z$ | $\hat{Y}_Z$ | $X_{Z1}$ | $X_{Z2}$ | ... | $X_{ZN}$ |

Period is typically a fiscal week although it could be of shorter or longer duration. There are Z periods of historical data in this example
$Y_i$ represents the actual value of the metric of interest from historical data
$\hat{Y}_i$ represents the predicted value of the metric of interest using the historical data and equation 1
$X_{i1}$ through $X_{iN}$ represents the features and components in the mathematical theory

FIG. 39

| Future Period | Actual revenue or profit or transactions | Predicted revenue or profit or transactions using Equation 1 | Feature #1 component of the mathematical theory | Feature #2 or component of the mathematical theory | ... | Feature #M or component of the mathematical theory | Solution vector component 1 to m |
|---|---|---|---|---|---|---|---|
| 1 | unknown | $\hat{Y}_1$ | $X_{11}$ | $X_{12}$ | ... | $X_{1M}$ | $x_j(1); j=1..m$ |
| 2 | unknown | $\hat{Y}_2$ | $X_{21}$ | $X_{22}$ | ... | $X_{2M}$ | $x_j(2); j=1..m$ |
| 3 | unknown | $\hat{Y}_3$ | $X_{31}$ | $X_{32}$ | ... | $X_{3M}$ | $x_j(3); j=1..m$ |
| ... | ... | ... | ... | ... | ... | ... | ... |
| N | unknown | $\hat{Y}_N$ | $X_{N1}$ | $X_{N2}$ | ... | $X_{NM}$ | $x_j(N); j=1..m$ |

4200

Header

Periods to find optimal control policy

Period is typically a fiscal week although it could be of shorter or longer duration. There are N periods of optimal actions to plan
$\hat{Y}_i$ represents the predicted value of the metric of interest using the historical data and equation 1
$X_{1,1}$ through $X_{2M}$ represents the features and components in the mathematical theory
The $x_j(t); j=1..m$ are the control inputs in equation 1 to be optimized (i.e. price decisions for underwriting, number of fraud investigations/recoveries)

FIG. 40

| Period | Actual Fraud or Claim Loss or Delinquency or Bankruptcy | Predicted Fraud or Claim Loss or Delinquency or Bankruptcy | Feature #1 or component of the mathematical theory | Feature #2 or component of the mathematical theory | ... | Feature #N or component of the mathematical theory |
|---|---|---|---|---|---|---|
| 1 | $Y_1$ | $\hat{Y}_1$ | $X_{11}$ | $X_{12}$ | ... | $X_{1N}$ |
| 2 | $Y_2$ | $\hat{Y}_2$ | $X_{21}$ | $X_{22}$ | ... | $X_{2N}$ |
| 3 | $Y_3$ | $\hat{Y}_3$ | $X_{31}$ | $X_{32}$ | ... | $X_{3N}$ |
| ... | ... | ... | ... | ... | ... | ... |
| Z | $Y_Z$ | $\hat{Y}_Z$ | $X_{Z1}$ | $X_{Z2}$ | ... | $X_{ZN}$ |

Period is typically a fiscal week although it could be of shorter or longer duration. There are Z periods of historical data in this example.
$Y_i$ represents the actual value of the metric of interest from historical data
$\hat{Y}_i$ represents the predicted value of the metric of interest using the historical data and equation 1
$X_{11}$ through $X_{ZN}$ represents the actionable and non-actionable features and components in the mathematical theory

FIG. 43

SYSTEMS AND METHODS FOR OUTLIER DETECTION OF TRANSACTIONS

FIELD

The described embodiments relate to computer systems and more particularly, to systems and methods for identifying outlier transactions.

BACKGROUND

In the art, corporations do not generally use comprehensive multi-faceted methods to identify outlier and/or fraudulent transactions. Fraud is typically identified in several ways: (1) audit of randomly selected transactions; (2) tips from anonymous hotlines to identify individuals who are committing fraud; (3) manual review by human adjudicators/investigators who conduct ad hoc analysis based on use of simple rules or reports; (4) more sophisticated companies use predictive analytics to identify various types of fraud; (5) matching individuals associated with transactions to watch lists containing known fraudsters or criminals; (6) use of outlier detection to identify outlying transactions or individuals; and (7) linking individuals together through personal attributes like addresses, phone numbers, bank accounts etc. to the personal attributes of known fraudsters or criminals.

These fraud identification systems require significant manual interaction by analysts, and produce low quality fraud identification alerts that may include false positives and false negatives. There is a need for improved systems and methods for fraud identification.

In the art, insurance organizations use demographic information, actuarial calculations, and other statistical information in order to determine premiums. There is a need therefore to provide systems and methods for improved premium pricing and insurance underwriting solutions.

SUMMARY

The present invention is directed to a method and system for transaction monitoring for the purpose of fraud identification/detection in a corporate underwriting or adjudication setting (which may include banking lending products, insurance underwriting and adjudication, government assistance underwriting etc.) or other decision making situations where a difference from the norm is a decision making criterion.

According to one embodiment, the present invention comprises a computer system for generating an electronic transaction monitoring or fraud detection or underwriting plan for a corporation, said computer system comprising, a data staging module, said data staging module being configured to input corporate transaction sensory data from one or more computer systems associated with the corporation; a data processing module, said data processing module being configured to pre-process said inputted corporate transaction sensory data; a data warehouse module configured to store said inputted corporate transaction sensory data and said pre-processed corporate transaction sensory data; a state model module configured to generate a corporate state model for modeling operation of the corporation based on said transaction sensory data; a calibration module configured to calibrate said state model module according to one or more control parameters; and an output module for generating an electronic transaction monitoring or fraud detection or underwriting plan for the corporation based on said corporation's state model.

According to another embodiment, the present invention comprises a computer-implemented method for generating an output transaction monitoring or fraud detection or underwriting plan for a corporation, said computer-implemented method comprising, inputting sensory data from a computer system associated with the corporation; determining a plurality of actionable features and a plurality of non-actionable features based on said inputted sensory data; selecting one or more of said features wherein said features are selected according to a relevant period of time; generating a system model for the corporation, wherein said system model is configured to model operating states of the corporation; utilizing said system model to generate a plurality of operating states over multiple periods, wherein each of said operating states comprises a simulated transaction monitoring or fraud detection or underwriting plan for the corporation; applying one or more desired parameters to select one of said simulated corporation transaction monitoring or fraud detection or underwriting plans; selecting one of said simulated corporate transaction monitoring or fraud detection or underwriting plans and generating electronic corporate transaction monitoring or fraud detection or underwriting plans; and outputting said electronic corporate transaction monitoring or fraud detection or underwriting plans to a computer system associated with the corporation.

In a first aspect, there is provided a method for generating an outlier transaction identification model and a selected control policy within an enterprise network comprising a plurality of transaction processing sites and a plurality of enterprise servers: receiving, at a first server of the plurality of enterprise servers, transaction data from the plurality of transaction processing sites, the transaction data comprising at least one selected from the group of an insurance claim, a financial institution transaction, and an insurance claim disposition; determining, at the first server, transformed transaction data based on the transaction data, determining one or more features from the transformed transaction data; determining one or more actionable features from the one or more features; generating an outlier transaction identification model from the one or more actionable features; and selecting a selected control policy for the outlier transaction identification model, wherein the outlier transaction identification model and the selected control policy cooperate with an intelligent agent to determine an outlier transaction identification alert.

In one or more embodiments, the generating the outlier transaction identification model may further comprise: determining an interaction $I_{jk}^{Pr}$ comprising a j×k matrix, each element of the j×k matrix comprising a correlation between a revenue for product j and a fraud detection activity k based on the transformed transaction data; determining an interaction $I_{jk}^{O/H}$ comprising a M×P matrix, each element of the M×P matrix comprising a correlation between an overhead cost for a product M and a fraud detection activity P based on the transformed transaction data; and wherein the outlier transaction identification model may further comprise the interaction $I_{jk}^{Pr}$ and the interaction $I_{jk}^{O/H}$.

In one or more embodiments, the selecting the selected control policy may further comprise: determining a coefficient $C_p$ based on the transformed transaction data; determining a coefficient $\beta_{c(j)}$ based on the transformed transaction data; and wherein the selected control policy may further comprise the coefficient $C_p$ and the coefficient $\beta_{c(j)}$.

In one or more embodiments, the determining, at the intelligent agent, the coefficient $C_p$ may further comprise performing a gradient descent, and the determining, at the intelligent agent, a coefficient $\beta_{c(j)}$ may further comprise performing a gradient descent.

In a second aspect, there is provided a system for generating an outlier transaction identification model and a selected control policy within an enterprise network comprising a plurality of transaction processing sites and a plurality of enterprise servers: a first server in the plurality of enterprise servers, the first server comprising a memory and a processor in communication with the memory, the processor configured to receive transaction data from the plurality of transaction processing sites, the transaction data comprising at least one selected from the group of an insurance claim, a financial institution transaction, and an insurance claim disposition; determine transformed transaction data based on the transaction data, determine one or more features from the transformed transaction data; determine one or more actionable features from the one or more features; generate an outlier transaction identification model from the one or more actionable features; and select a selected control policy for the outlier transaction identification model, wherein the outlier transaction identification model and the selected control policy cooperate with an intelligent agent to determine an outlier transaction identification alert.

In one or more embodiments, the processor may be further configured to generate the outlier transaction identification model by determining an interaction $I_{jk}^{Pr}$ comprising a j×k matrix, each element of the j×k matrix comprising a correlation between a revenue for product j and a fraud detection activity k based on the transformed transaction data; determining an interaction $I_{jk}^{O/H}$ comprising a M×P matrix, each element of the M×P matrix comprising a correlation between an overhead cost for a product M and a fraud detection activity P based on the transformed transaction data; and wherein the outlier transaction identification model may further comprise the interaction $I_{jk}^{Pr}$ and the interaction $I_{jk}^{O/H}$.

In one or more embodiments, the processor may be further configured to select the selected control policy further by: determining a coefficient $C_p$ based on the transformed transaction data; determining a coefficient $\beta_{c(j)}$ based on the transformed transaction data; and wherein the selected control policy further comprises the coefficient $C_p$ and the coefficient $\beta_{c(j)}$.

In one or more embodiments, the processor may be further configured to determine the coefficient $C_p$ by performing a gradient descent, and the determining, at the intelligent agent, a coefficient $\beta_{c(j)}$ may further comprise performing a gradient descent.

In a third aspect, there is provided a method for generating an outlier transaction alert based on an outlier transaction identification model and a selected control policy, comprising: receiving an outlier transaction identification model and a selected control policy; simulating, using an intelligent agent, a plurality of fraud events at a first hierarchy level for two or more future time periods using the outlier transaction identification model and the selected control policy, by, determining, at the intelligent agent, a plurality of fraud detection thresholds; determining, at the intelligent agent, a simulated reward value based on each of the fraud detection thresholds and the plurality of fraud events for the two or more future time periods; selecting, at the intelligent agent, one or more selected fraud detection thresholds in the plurality of fraud detection thresholds, the one or more selected fraud detection thresholds corresponding to a highest simulated reward value over the two or more future time periods; and generating an outlier transaction plan comprising the one or more selected fraud detection thresholds for the two or more future time periods selected from the plurality of fraud detection thresholds; receiving, at the intelligent agent, a candidate transaction; determining, at the intelligent agent, a candidate transaction status by applying the one or more selected fraud detection thresholds; and upon determining the candidate transaction status is an outlier, transmitting an outlier alert based on the candidate transaction and the candidate transaction status.

In one or more embodiments, the method may further comprise comparing the one or more selected fraud detection thresholds to one or more constraints; upon determining that a particular selected fraud detection threshold violates a particular constraint in the one or more constraints, setting the particular selected fraud detection threshold to the particular constraint.

In one or more embodiments, the determining, at the intelligent agent, the candidate transaction status may further comprise performing fuzzy matching of the candidate transaction and the one or more selected fraud detection thresholds.

In one or more embodiments, the determining, at the intelligent agent, the candidate transaction status may further comprise determining, at the intelligent agent, one or more entity statuses corresponding to one or more entities of the candidate transaction; and wherein the candidate transaction status may be based on the one or more entity statuses.

In one or more embodiments, each of the one or more entities may comprise an entity category type.

In one or more embodiments, the determining, at the intelligent agent, the candidate transaction status may further comprise determining, at the intelligent agent, one or more prior entity statuses corresponding to one or more prior entities, each of the one or more prior entity statuses corresponding to each of the one or more entity statuses of the candidate transaction in a prior time period.

In one or more embodiments, the determining, at the intelligent agent, the candidate transaction status may further comprise determining, at the intelligent agent, an entity graph, the entity graph comprising one or more edges and the one or more entities, the one or more edges connecting the one or more entities; detecting, at the intelligent agent, a community comprising one or more matching entities in the one or more entities, and one or more matching edges in the one or more edges; and determining the candidate transaction status based on the community.

In one or more embodiments, the determining, at the intelligent agent, the community may further comprise performing fuzzy matching.

In one or more embodiments, the determining, at the intelligent agent, the candidate transaction status may further comprise applying the one or more selected fraud detection thresholds to the community.

In a fourth aspect there is provided a system for generating an outlier transaction alert based on an outlier transaction identification model and a selected control policy, comprising a first server, the first server comprising a memory and a processor in communication with the memory, the processor configured to receive an outlier transaction identification model and a selected control policy; simulate a plurality of fraud events at a first hierarchy level for two or more future time periods using the outlier transaction identification model and the selected control policy, by, determining a plurality of fraud detection thresholds; determining a simulated reward value based on each of the fraud detection thresholds and the plurality of fraud events for the two or more future time periods; selecting one or more selected fraud detection thresholds in the plurality of fraud detection thresholds, the one or more selected fraud detection thresholds corresponding to a highest simulated reward value over the two or more future time periods; and generate an outlier transaction plan comprising the one or more selected fraud detection thresholds for the two or more future time periods selected from the plurality of fraud detection thresholds; receive a candidate transaction; determine a candidate transaction status by applying the one or more selected fraud detection thresholds; and upon determining the candidate transaction status is an outlier, transmit an outlier alert based on the candidate transaction and the candidate transaction status.

In one or more embodiments, the processor may be further configured to compare the one or more selected fraud detection thresholds to one or more constraints; upon determining that a particular selected fraud detection threshold violates a particular constraint in the one or more constraints, setting the particular selected fraud detection threshold to the particular constraint.

In one or more embodiments, the processor may be further configured to determine the candidate transaction status by performing fuzzy matching of the candidate transaction and the one or more selected fraud detection thresholds.

In one or more embodiments, the processor may be further configured to determine the candidate transaction status by determining one or more entity statuses corresponding to one or more entities of the candidate transaction; and wherein the candidate transaction status may be based on the one or more entity statuses.

In one or more embodiments, each of the one or more entities may comprise an entity category type.

In one or more embodiments, the processor may be further configured to determine the candidate transaction status by determining one or more prior entity statuses corresponding to one or more prior entities, each of the one or more prior entity statuses corresponding to each of the one or more entity statuses of the candidate transaction in a prior time period.

In one or more embodiments, the processor may be further configured to determine the candidate transaction status further by determining an entity graph, the entity graph comprising one or more edges and the one or more entities, the one or more edges connecting the one or more entities; detecting a community comprising one or more matching entities in the one or more entities, and one or more matching edges in the one or more edges; and determining the candidate transaction status based on the community.

In one or more embodiments, the processor may be further configured to determine the community by performing fuzzy matching.

In one or more embodiments, the processor may be further configured to determine the candidate transaction status by applying the one or more selected fraud detection thresholds to the community.

In a fifth aspect, there is provided a method for managing an underwriting system based on an underwriting model and a selected control policy, comprising: receiving an underwriting model and a selected control policy; simulating, using an intelligent agent, a plurality of risk parameters at a first hierarchy level for two or more future time periods using the underwriting model and the selected control policy, by, determining, at the intelligent agent, a plurality of risk thresholds; determining, at the intelligent agent, a simulated reward value based on each of the risk thresholds and the plurality of risk parameters for the two or more future time periods; selecting, at the intelligent agent, one or more selected risk thresholds in the plurality of risk thresholds, the one or more selected risk thresholds corresponding to a highest simulated reward value over the two or more future time periods; and generating an underwriting management plan comprising the one or more selected risk thresholds for the two or more future time periods selected from the plurality of risk thresholds; receiving, at the intelligent agent, a candidate premium request; determining, at the intelligent agent, a candidate premium price by applying the one or more selected risk thresholds; and in response to the premium request, transmitting a candidate premium response based on the candidate premium request and the candidate premium price.

In one or more embodiments, the method may further comprise comparing the one or more selected risk thresholds to one or more constraints; upon determining that a particular selected risk threshold violates a particular constraint in the one or more constraints, setting the particular selected risk threshold to the particular constraint.

In one or more embodiments, the determining, at the intelligent agent, the candidate premium price may further comprise performing fuzzy matching of the candidate premium request and the one or more selected risk thresholds; and wherein the fuzzy matching comprises at least one selected from the group of peer group fuzzification and defuzzification, peer rule fuzzification and defuzzification, peer predictive scoring fuzzification and defuzzification, and community/network fuzzification and defuzzification.

In one or more embodiments, the determining, at the intelligent agent, the candidate premium price may further comprise determining, at the intelligent agent, one or more entity statuses corresponding to one or more entities of the candidate premium request; and wherein the candidate premium price is based on the one or more entity statuses.

In one or more embodiments, each of the one or more entities may comprise an entity category type.

In one or more embodiments, the determining, at the intelligent agent, the candidate premium price may further comprise determining, at the intelligent agent, one or more prior entity statuses corresponding to one or more prior entities, each of the one or more prior entity statuses corresponding to each of the one or more entity statuses of the candidate premium price in a prior time period.

In one or more embodiments, the determining, at the intelligent agent, the candidate premium price may further comprise determining, at the intelligent agent, an entity graph, the entity graph comprising one or more edges and the one or more entities, the one or more edges connecting the one or more entities; detecting, at the intelligent agent, a community comprising one or more matching entities in the one or more entities, and one or more matching edges in the one or more edges; and determining the candidate premium price based on the community.

In one or more embodiments, the determining, at the intelligent agent, the community may further comprise performing fuzzy matching.

In one or more embodiments, the determining, at the intelligent agent, the candidate premium price may further comprise applying the one or more selected risk thresholds to the community.

In a sixth aspect, there is provided an underwriting management system comprising an underwriting model and a selected control policy, comprising: a memory comprising the underwriting model and the selected control policy; a network device; a processor in communication with the memory and the network device, the processor configured to: simulate, using an intelligent agent, a plurality of risk parameters at a first hierarchy level for two or more future time periods using the underwriting model and the selected control policy, by, determine, at the intelligent agent, a plurality of risk thresholds; determine, at the intelligent agent, a simulated reward value based on each of the risk thresholds and the plurality of risk parameters for the two or more future time periods; select, at the intelligent agent, one or more selected risk thresholds in the plurality of risk thresholds, the one or more selected risk thresholds corresponding to a highest simulated reward value over the two or more future time periods; generate an underwriting management plan comprising the one or more selected risk thresholds for the two or more future time periods selected from the plurality of risk thresholds; receive, at the network device, a candidate premium request; determining, at the intelligent agent, a candidate premium price by applying the one or more selected risk thresholds; and in response to the premium request, transmitting a candidate premium response based on the candidate premium request and the candidate premium price using the network device.

In one or more embodiments, the processor may be further configured to: compare the one or more selected risk thresholds to one or more constraints; upon determining that a particular selected risk threshold violates a particular constraint in the one or more constraints, may set the particular selected risk threshold to the particular constraint.

In one or more embodiments, the determining, at the intelligent agent, the candidate premium price may further comprise: performing fuzzy matching of the candidate premium request and the one or more selected risk thresholds; and wherein the fuzzy matching comprises at least one selected from the group of peer group fuzzification and defuzzification, peer rule fuzzification and defuzzification, peer predictive scoring fuzzification and defuzzification, and community/network fuzzification and defuzzification.

In one or more embodiments, the determining, at the intelligent agent, the candidate premium price may further comprise: determining, at the intelligent agent, one or more entity statuses corresponding to one or more entities of the candidate premium request; and wherein the candidate premium price is based on the one or more entity statuses.

In one or more embodiments, each of the one or more entities may comprise an entity category type.

In one or more embodiments, the determining, at the intelligent agent, the candidate premium price may further comprise: determining, at the intelligent agent, one or more prior entity statuses corresponding to one or more prior entities, each of the one or more prior entity statuses corresponding to each of the one or more entity statuses of the candidate premium price in a prior time period.

In one or more embodiments, the determining, at the intelligent agent, the candidate premium price may further comprise: determining, at the intelligent agent, an entity graph, the entity graph comprising one or more edges and the one or more entities, the one or more edges connecting the one or more entities; detecting, at the intelligent agent, a community comprising one or more matching entities in the one or more entities, and one or more matching edges in the one or more edges; and determining the candidate premium price based on the community.

In one or more embodiments, the determining, at the intelligent agent, the community may further comprise performing fuzzy matching.

In one or more embodiments, the determining, at the intelligent agent, the candidate premium price may further comprise: applying the one or more selected risk thresholds to the community.

Other aspects and features of the present invention will become apparent to those ordinarily skilled in the art upon review of the following description of embodiments of the invention in conjunction with the accompanying figures.

BRIEF DESCRIPTION OF THE DRAWINGS

A preferred embodiment of the present invention will now be described in detail with reference to the drawings, in which:

FIG. 9 shows a system diagram of an outlier transaction identification system in accordance with one or more embodiments.

FIG. 10 shows a data flow diagram for the fraud identification system in accordance with one or more embodiments.

FIG. 13 shows a user interface diagram for the outlier transaction identification system in accordance with one or more embodiments.

FIG. 14 shows another user interface diagram for the outlier transaction identification system in accordance with one or more embodiments.

FIG. 15 shows another user interface diagram for the outlier transaction identification system in accordance with one or more embodiments.

FIG. 16 shows another user interface diagram for the outlier transaction identification system in accordance with one or more embodiments.

FIG. 17 shows another user interface diagram for the outlier transaction identification system in accordance with one or more embodiments.

FIGS. 31 and 32 shows an example diagram of the defuzzification used in the intelligent agent in accordance with one or more embodiments.

FIG. 36 shows an example of an interaction matrix in accordance with one or more embodiments.

FIG. 37 shows an interaction matrix diagram in accordance with one or more embodiments.

FIG. 39 shows another table diagram of an example data set configured for using the selected control policy for determining selected control inputs according to one or more embodiments.

FIG. 40 shows another table diagram of an example data set configured for using the selected control policy for determining selected control inputs according to one or more embodiments.

FIG. 43 shows a table diagram of an example data set configured for determining a selected control policy according to one or more embodiments.

Like reference numerals indicate like or corresponding elements or components in the drawings.

DESCRIPTION OF EXEMPLARY EMBODIMENTS

Figure 1:
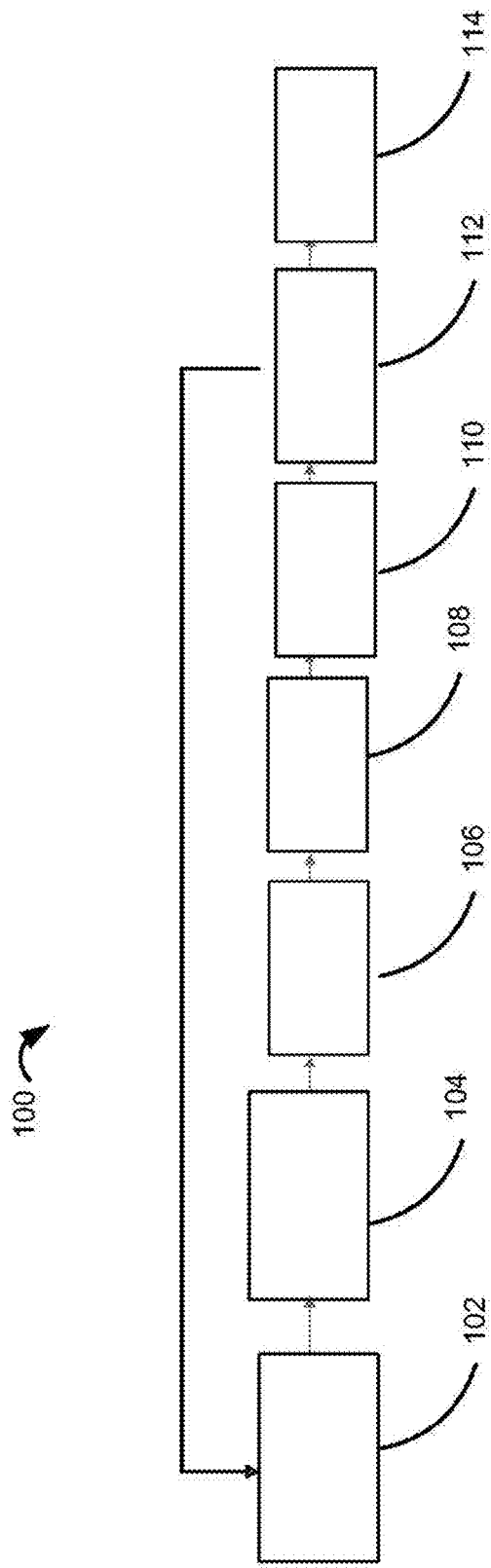
FIG. 1 shows a fraud identification system diagram in accordance with one or more embodiments.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and a combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

The present embodiments may provide systems and methods of fraud identification including a transaction entity hierarchy to conduct fraud detection; peer analysis by comparing the behavior of entities with similar attributes across all levels of the entity hierarchy; may use fuzzy logic methods to "fuzzify" the output of each of the previously mentioned methods creating a common fuzzy space where the output of an analytic method can be compared and evaluated on a common basis; may combine the results of each of the methods using fuzzy logic to "de-fuzzify" the results to create a comprehensive fraud score at all levels of the transaction entity hierarchy; may use temporal changes in the entity hierarchy comprehensive fraud scores as decision making logic for adjudication/investigation; may consider the interaction of fraud detection outcomes on overall corporate revenue resulting from the transactions of the product/service being investigated or other non-related products/services; may consider the interaction of fraud detection outcomes on the overall corporate overhead costs including but not limited to customer service, fraud investigations, technology costs; and may choose the level of transaction of monitory/fraud detection to maximize corporate profitability.

The present embodiments refer to fraud detection and transaction monitoring, but it is also understood that the embodiments may further be used for insurance underwriting.

Reference is made to FIG. 1, which shows a fraud identification system diagram 100. As shown in FIG. 1, the transaction monitoring or fraud identification system 100 comprises an organization 102, one or more consumer touchpoints 104, and a computing and processing facility 108. The computing and processing facility 108 may receive or input transaction data 106 from the one or more consumer touchpoints 104 of the one or more corporations 102. The corporations may have traditional physical consumer touchpoints 104 through which consumers transact such as check-out counters, self-serve counters, or point of sale devices in addition to online touchpoints. The transaction data 106 may be collected from physical and online touchpoints 104 and may include customer data, transaction data, adjudication data, underwriting data and payments. As will be described in more detail below, the computing and processing facility 108 may comprise computer and/or processors implemented in hardware and/or software configured to process the transaction data and generate transaction monitoring and fraud identification, and other reports such as revenue/margins or performance results measurements. In an alternate embodiment, the fraud identification system 100 may be a closed loop control, where the monitoring of transactions provides feedback to the one or more corporations 102. The processing facility 108 may execute an intelligent agent for recommending fraud adjudication and providing pricing information, and the feedback loop may permit selection of control inputs. The processing facility 108 may determine underwriting parameters, fraud alerts 110 (also referred to herein as outlier alerts), and other information. The closed control loop may be configured to provide a feedback loop which is utilized to select control inputs and/or the transaction monitoring or fraud identification, as described in more detail below.

The processing facility 108 may send the fraud alerts and other parameters to a fraud detection interface 112, which may allow users to access the determined fraud alerts 110, transaction monitoring information, and the underwriting parameters. The user may act on the information in the fraud detection interface 112. The information provided to the user via fraud detection interface 112 may include control inputs, including control inputs for an intelligent agent. The user of fraud detection interface 112 may further configure automatic fraud detection processes as described herein.

In another embodiment, the fraud detection interface 112 may have an Application Programming Interface (API) that the fraud detection system 100 may use to directly apply the information, control inputs, and other configuration features to a fraud detection plan.

Figure 2:
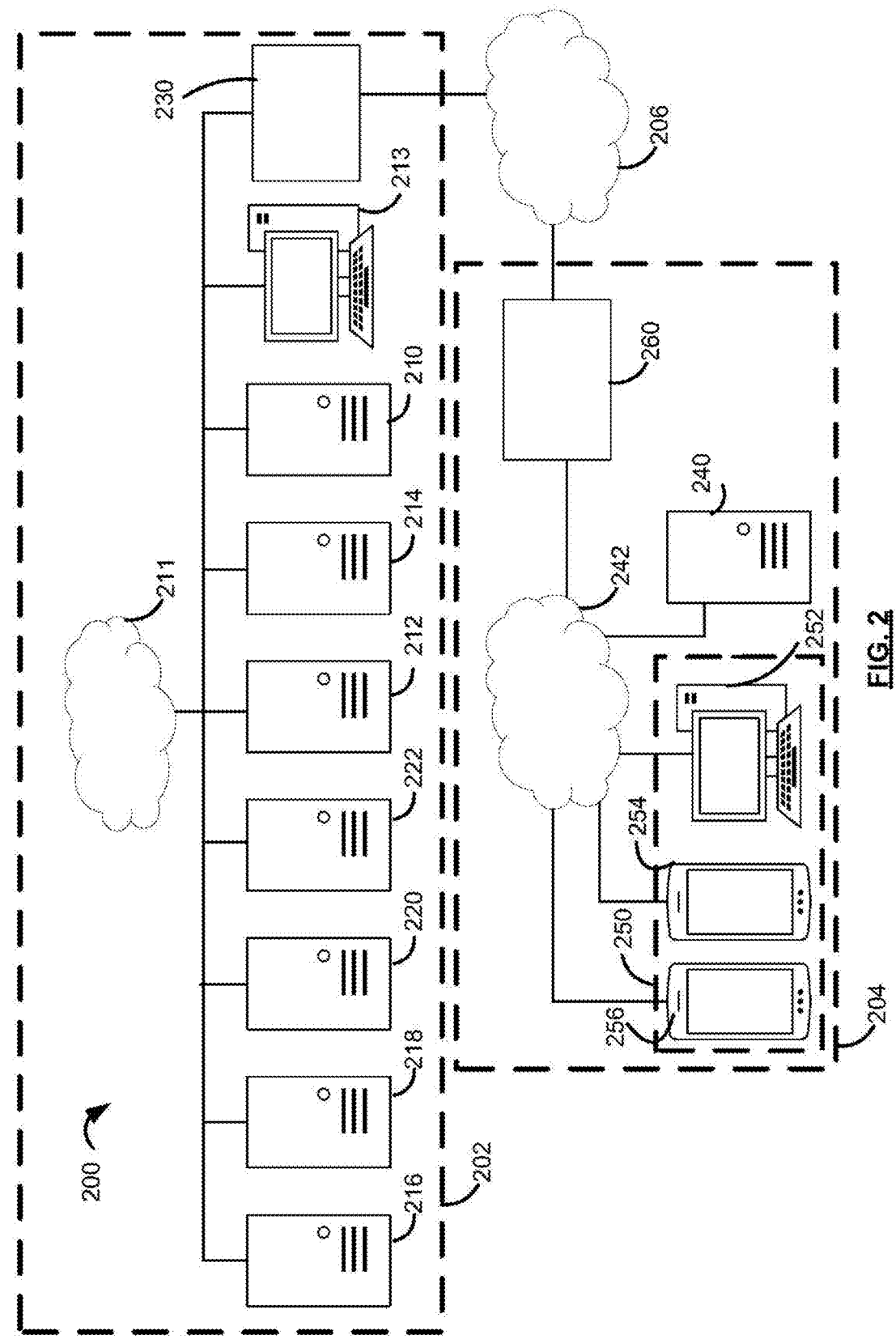
FIG. 2 shows a computer system architecture diagram for the fraud identification system of FIG. 1 in accordance with one or more embodiments.

Reference is next made to FIG. 2, which shows a computer system architecture diagram for the fraud identification system 200. The system 200 comprises fraud detection (including transaction monitoring or fraud detection or underwriting planning computer system) 202 and a corporate computer system 204.

The fraud detection system 202 comprises a control server 210, a data warehouse server 212, a web server 214, an ETL ("Extract, Transform, Load") server 216, a reporting server 218, one or more computational servers 220 and a metadata server 222. The servers and devices of the fraud detection system 202 may be coupled through a network 211, or another communication mechanism, for example, an Ethernet network.

Network 211 may be any network or network components capable of carrying data including Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

The fraud detection system 202 may further be coupled to the network 206 via firewall 230.

The control server 210, data warehouse server 212, web server 214, ETL server 216, reporting server 218, one or more computational servers 220 and a metadata server 222 may be commercial off-the-shelf servers, may be virtual servers or containers, or may run on a cloud provider such as Amazon® Web Services (AWS®). These servers may be implemented separately on their own server (virtual, physical or container), or the functionality of two or more servers may be combined and provided by the server (virtual, physical or container). Each of the servers may comprise computer hardware and stored program code/software to perform the processes and functions associated with core computer system functions, and the processes and operations according to embodiments herein.

In an alternate embodiment, the control server 210, the data warehouse server 212, the web server 214, the ETL server 216, the reporting server 218, the one or more computational servers 220 and the metadata server 222 may reside at the corporate system 204, and this may be referred to as a "locally" hosted fraud detection system.

The control server 210 includes an administrative console (not shown) for accessing and configuring the control server 210. The control server 210 may be configured to execute processes and functions associated with an intelligent agent, as described in more detail below.

Figure 4:
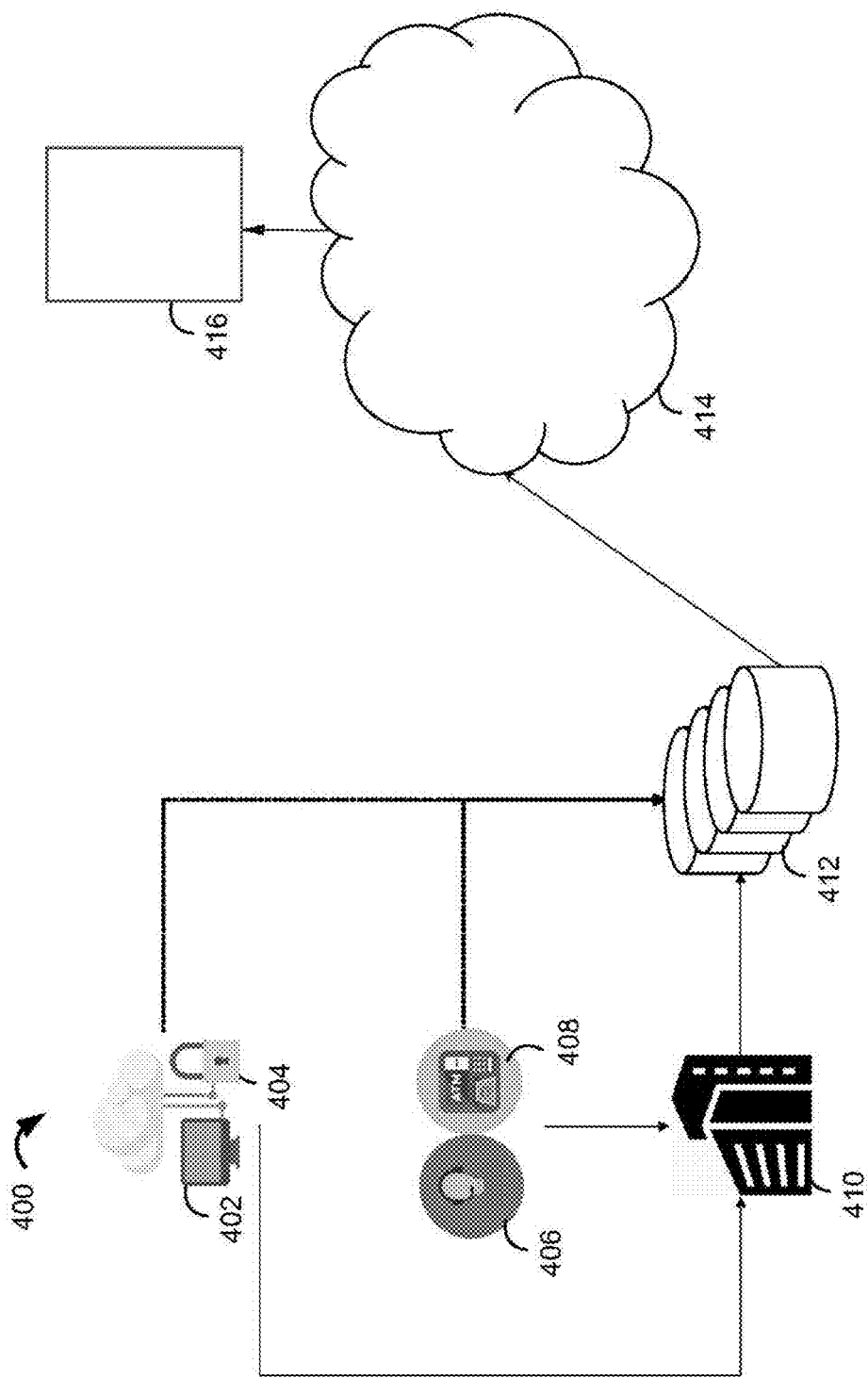
FIG. 4 shows a data flow diagram for the fraud identification system in accordance with one or more embodiments.

The data warehouse server 212 may be configured to store raw and processed data, i.e. comprising data 106 obtained from the touchpoints 104. The data warehouse server 212 may provide a long-term memory or component for the intelligent agent 400 (FIG. 4). The data warehouse server 212 may have a database, and the database may be a Structured Query Language (SQL) database such as PostgreSQL or MySQL or a not only SQL (NoSQL) database such as MongoDB.

The web server 214, may be configured to deliver an underwriting plan, a fraud detection plan, or a plurality of fraud detection alerts generated by one or more methods or systems herein, to the corporate system 204, and for example, to one or more of the user devices 250. The fraud detection plan, or the underwriting plan, or the fraud detection alerts may be transmitted through the network 211, firewall 230 and network 206 to the corporate system 204. The web server 214 may be, for example, Apache® Tomcat, or Microsoft® IIS® servers.

The ETL server 216 may be one or more servers, (i.e. a cluster of servers) configured to execute data processing jobs or operations associated with data obtained from the corporate environment (see e.g. 106 in FIG. 1). The output generated by the ETL server 216 may populate a long-term memory component 514 in the intelligent agent 500 (see FIG. 5) and a state measurement component 530 in the intelligent agent 500 (see FIG. 5). The ETL Server 216 may be a server or cluster of servers that receives and processes data from the one or more customer touchpoints. The ETL server 216 may populate the long-term memory component and the state measurement component.

Figure 5:
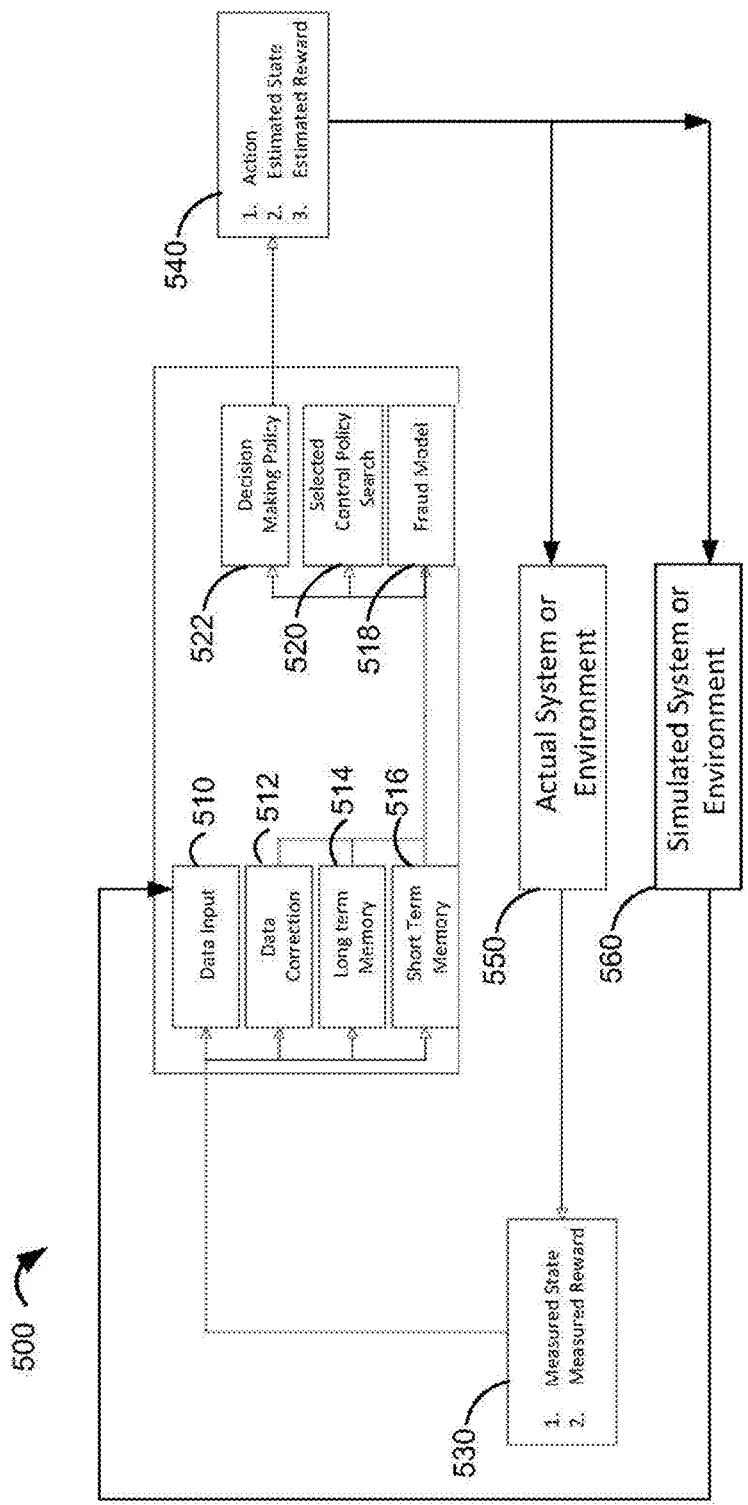
FIG. 5 shows an intelligent agent diagram for the fraud identification system of FIG. 1 in accordance with one or more embodiments.

The reporting server 218 may be configured to execute a process or operations to display one or more of the group of report data on corporate operations, state information including a new state and/or reward that may occur in the corporate environment based on the state measurement component 530 (see FIG. 5). The reporting server 218 may utilize data that has been received and processed by the ETL server 216 and processed and received from the ETL server 216.

The one or more computational servers 220 may be configured to execute processes to perform analysis of the data and determine an electronic fraud detection model, or an underwriting model (see 518 in FIG. 5), to determine a selected control policy for corporate operations (see 522 in FIG. 5). The one or more computational servers 220 may be further configured to apply the selected control policy (see 540 in FIG. 5) to the fraud detection model or the underwriting model. The one or more computational servers 220 may also be configured to store or process a control policy in short term memory (see 516 in FIG. 5).

The metadata server 222 may be configured to store configuration data that is used by the control server 210 to execute processes and functions associated with the operation of the intelligent agent 400.

Network 206 may be any network or network components capable of carrying data including the Internet, Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

The corporate system 204 includes corporate operational systems 240 coupled and one or more operational servers 240 and one or more user devices 250 such as, for example, a user laptop or desktop computer 252, user tablets (e.g. Apple Pads) 254, and/or smart phones and other mobile devices 256.

The operational systems 240 and the one or more user devices 250 are connected via a corporate network 242 and the internet 206 to fraud detection and underwriting system 202. The network connection may further include a firewall 260 connected to network 206. The one or more user devices 250 may be used by an end user to access a software application (not shown) running on web server 214 at fraud detection system 202 in order to request and/or receive fraud reports or alerts from the fraud detection system 202 as disclosed herein. In an alternate embodiment, a user may send a candidate premium request to the underwriting system 202, and receive premium pricing information in a candidate premium response from the underwriting system 202.

The one or more corporate operational servers 240 may include one or more enterprise applications for inventory management, transaction management, store management, insurance claims management, etc. The one or more corporate operational servers 240 may include one or more enterprise software applications supporting transactions at corporate touch points such as a point-of-sale device or a kiosk, which may be through a payment processor coupled via the network 206.

Network 242 may be any network or network components capable of carrying data including Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

The fraud detection system 202 may be coupled to the corporate system 204 through the network 206. As also shown in FIG. 2, the fraud detection system 202 may interface to the network 206 through a VPN (Virtual Private Network) Firewall 230, and similarly the corporate system 204 may connect to the network 206 through a client VPN firewall 260.

Figure 3:
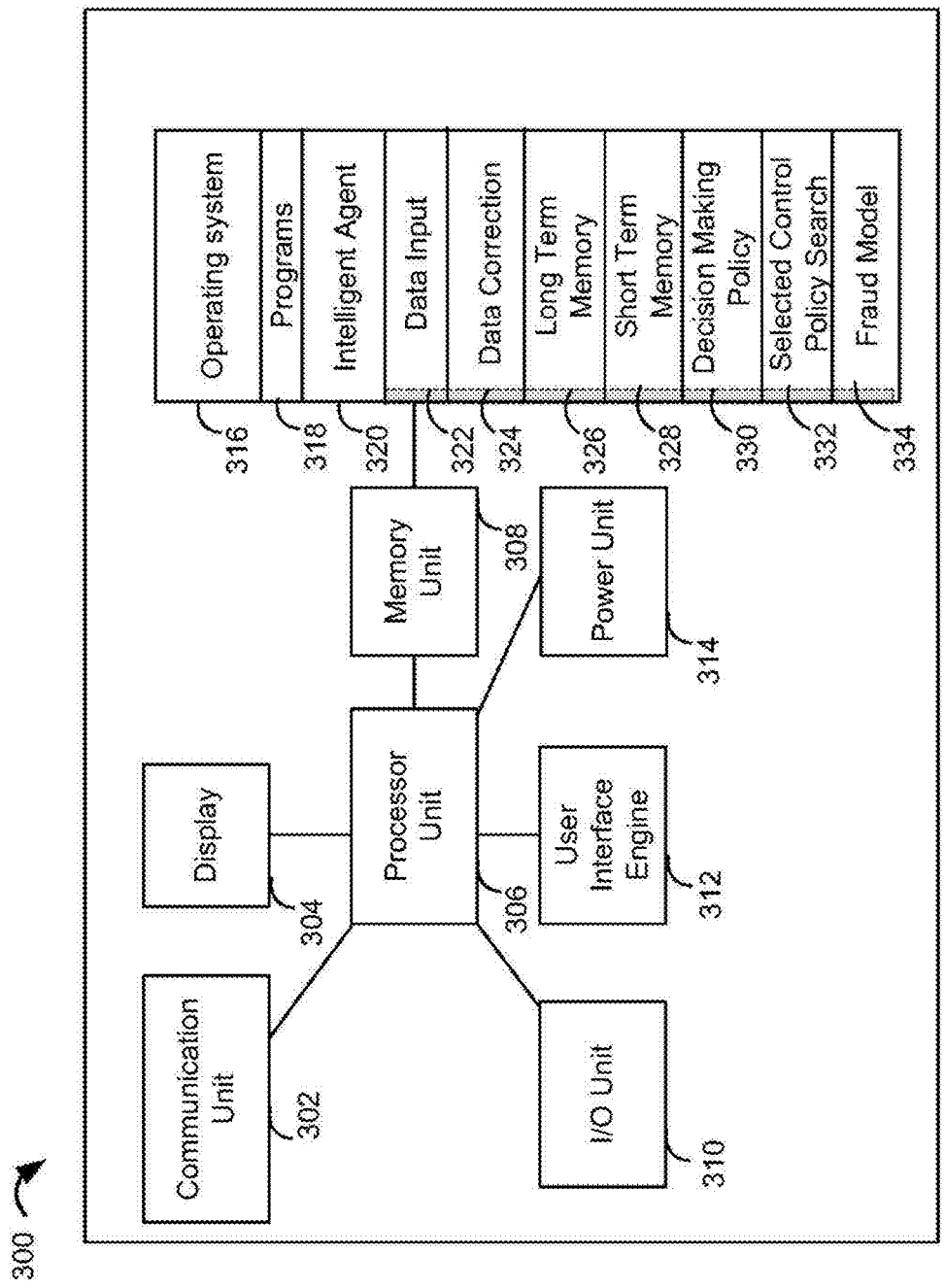
FIG. 3 shows a device diagram for an intelligent agent in accordance with one or more embodiments.

Reference is next made to FIG. 3, which shows a block diagram 300 of the control server according to one or more embodiments. As noted above, the control server 300 may communicate with the servers of the fraud detection system 202 (FIG. 2).

The control server 300 includes one or more of a communication unit 302, a display 304, a processor unit 306, a memory unit 308, I/O unit 310, a user interface engine 312, and a power unit 314.

The communication unit 302 can include wired or wireless connection capabilities. The communication unit 302 can include a wired connection such as an Ethernet connection. The communication unit 302 can include a radio that communicates using CDMA, GSM, GPRS or Bluetooth protocol according to standards such as IEEE 802.11a, 802.11b, 802.11g, or 802.11n. The communication unit 302 can be used by the control server 300 to communicate with other devices or computers.

The display 304 may be an LED or LCD based display.

The processor unit 306 controls the operation of the control server 300. The processor unit 306 can be any processor that can provide sufficient processing power depending on the configuration, purposes and requirements of the control server as is known by those skilled in the art. For example, the processor unit 306 may be a high performance general processor such as an Intel® Xeon®. In alternative embodiments, the processor unit 306 can include more than one processor in a multiprocessor configuration.

The processor unit 306 can also execute a user interface (UI) engine 312 that is used to generate various UIs, some examples of which are shown and described herein, such as interfaces shown in FIGS. 13, 14, 15, 16, 17, 18 and 19. The generated user interfaces may be transmitted from the corporate planning system 202 via web server 214 (see FIG. 2).

The memory unit 308 comprises software code for implementing an operating system 316, programs 318, and an intelligent agent 320.

The memory unit 308 can include RAM, ROM, one or more hard drives, one or more flash drives or some other data storage elements such as disk drives, etc. The memory unit 308 may be used to store an operating system 316 and programs 318 as is commonly known by those skilled in the art.

The I/O unit 310 can include at least one of a mouse, a keyboard, a touch screen, a thumbwheel, a track-pad, a track-ball, a card-reader, voice recognition software and the like again depending on the particular implementation of the server 300. In some cases, some of these components can be integrated with one another.

The user interface engine 312 is configured to generate interfaces for users to view and edit the configuration of the intelligent agent, one or more interfaces to view and edit a generated fraud detection plan or underwriting plan interfaces, one or more interfaces to review fraud detection alerts, and other user interfaces of the fraud detection system 202 (see FIG. 2). The various interfaces generated by the user interface engine 312 may be displayed to the user on display 304, or may be transmitted to the user via web server 214 (see FIG. 2).

The power unit 314 can be any power source that provides power to the control server 300 such as a power adaptor.

The operating system 316 may provide various basic operational processes for the control server 300. For example, the operating system 316 may be a Microsoft® Windows® Server operating system, a Unix or Linux based operating system, or another operating system.

The programs 318 include various user programs so that a user can interact with the control server 300 to perform various functions such as, but not limited to, requesting fraud detection plans or underwriting plans, configuring the fraud detection system, viewing fraud alerts, etc.

The intelligent agent 320 may have one or more of the group of a data input 322, a data correction 324, a long term memory 326, a short term memory 328, a decision making policy 330, a selected control policy search 332, and a fraud model 334. The intelligent agent 320 may implement one or more methods described herein to generate a fraud detection plan or underwriting plan and/or a plurality of fraud alerts. The fraud detection plan may comprise various details for an automated fraud detection process, fraud policies for the corporation, etc. The underwriting plan may comprise various details for an underwriting organization, including risk levels, actuarial information, etc. The fraud detection and/or underwriting plans may be for a particular corporate sub-organization, a particular geographic area associated with multiple parts of the corporate organization, a particular organizational zone having two or more parts of the corporate organization, or another portion of a corporate business. Similarly, the fraud alerts may be for a particular retail store or business group, a particular geographic area associated with multiple parts of the corporate organization, etc. The fraud detection plan and the underwriting plan may include details such as product identifiers, organization group identifiers, a group of product identifiers, a date range (including a start date and an end date). The fraud detection or underwriting plan may be generated in a web portal that is made available to users. The fraud detection or underwriting plan may be generated periodically and delivered to users via email as an attachment. The attachment may be a Portable Document File (PDF), an Excel® file, or another file format as is known.

The data input 322 may be configured to receive the corporate data using the communication unit 302, i.e. from one or more organizations or business units of the corporate organization. The received data may be received and parsed by the data input 322, and may be processed using the data correction 324. The received data may be received from the one or more organizations or business units as is known, for example by File-Transfer-Protocol using flat files, Excel® files, Comma Separated Value (CSV) files, or other data interchange formats as is known. The format of the received data may be standardized, or may be an agreed upon format.

Referring next to FIG. 4, a data flow diagram 400 is shown for corporate data collection from corporate entities 410 that is received by the fraud detection system 416, and used for example by the data input 322 (see FIG. 3). The data flow 400 shows the generation of data at touchpoints such as a website 402, a call center 406, a point-of-sale device 408, or other touchpoints and corporate devices (not shown). The website 402 may offer sales and service to customers and clients of the corporate organization 410. The call center 406 may provide customer service, claims information and processing, and other support services. The corporate point-of-sale devices 408 may send point-of-sale data to data center 412, or using a cloud-based transaction processing system. The corporate data from the website 402 or the point-of-sale devices 408 may be stored at a database 412. The collected corporate data in the database 412 may be packaged and transmitted in real-time and/or as batch data extracts to the fraud detection system 202 (see FIG. 2).

The collected corporate data in the database 412 may be encrypted for transmission over network 414 to fraud detection system 416, for example, by the firewall at the fraud detection system 202 (see FIG. 2) and the firewall at the corporate system 204 (see FIG. 2).

Referring back to FIG. 3, the data input 322 may be configured to receive, and the data correction 324 may be configured to process the corporate data from the corporate environment on a periodic basis, for example, in near real-time, intra-daily, daily, intra-weekly or weekly.

The data input 322 may be configured to execute data warehousing operations in the collection, correction and/or management of corporate data inputs. The corporate data may be stored in the long-term memory 326, i.e. for a data warehouse, and in the short-term memory 328, i.e. for data mart(s), or recent control actions and/or control action candidates, as described in more detail below.

Referring back to FIG. 4, in one embodiment the data transmitted from the corporate system to the fraud detection system may comprise:

(1) Transaction data for several years (for example insurance claims, bank transactions, insurance underwriting, bank loan underwriting, insurance claim disposition, insurance underwriting disposition, bank loan underwriting disposition)
    Transaction identifier
    Sequence Number
    Customer Identifier
    Date
    Time
    Product identifier
    Touchpoint identifier
    Transaction details
    Disposition details (2) Entity (customer, adjudicator, 3rd party, healthcare provider, transactor, IP address, phone, address, bank account etc.) identifier for same date range as transactions
    (a) Entity Identifier
    Entity type
    Entity attributes (3) Product Master
    Product Identifier
    Product Description
    Product Attributes (4) Product Hierarchy
    Multi-level hierarchy identifiers
    Product Identifier (5) Touchpoint Master
    Touch Identifier
    Touchpoint type
    Touchpoint Attributes
    Touchpoint Longitude/Latitude
    Touchpoint IP address (6) Time
    Date
    Calendar Week (ISO)
    Calendar Month (ISO)
    Calendar Year
    Fiscal Week
    Fiscal Month
    Fiscal Year Reference is next made to FIG. 5 which shows the intelligent agent 500 according to one or more embodiments. The intelligent agent module 500 may be run at the control server 210 (FIG. 2) in the fraud detection system 202 (FIG. 2), or where locally-hosted, at the corporate system 204 (see FIG. 2). The intelligent agent 500 corresponds to the intelligent agent 320 in FIG. 3. The intelligent agent state is defined by time series data inputted and processed by the transaction monitoring or fraud detection or underwriting planning system 100, and where the time series data comprises data typically collected by a corporation in real-time from its computer and operational systems.

The intelligent agent 500 may have one or more of the group of a data input 510 corresponding to data input 322 (see FIG. 3), a data correction 512 corresponding to data correction 324 (see FIG. 3), a long term memory 514 corresponding to long term memory 326 (see FIG. 3), a short term memory 516 corresponding to short term memory 328 (see FIG. 3), a decision making policy 522 corresponding to decision making policy 330 (see FIG. 3), a selected control policy search 520 corresponding to a selected control policy search 332 (see FIG. 3), and a fraud model 518 corresponding to fraud model 334 (see FIG. 3).

The intelligent agent 500 may receive at the data input 510 (corresponding to data input 322 in FIG. 3) a simulated system state and a simulated system reward from a simulated system 560 that may be stored in short term memory 516. The intelligent agent 500 may receive at the data input 510 a measured system state and a measured system reward from an actual system 550 that may be stored in short term memory 516. The measured state and reward 550 may be from an actual corporate system, and may include corporate data as measured from the corporate organization. The intelligent agent 500 may receive at a data input 510 corporate data that may be stored in the long term memory 514 or the short term memory 516. The intelligent agent 500 may generate as output a fraud plan 540 or a plurality of fraud alerts that may include an estimated state and an estimated reward. The intelligent agent 500 may be further configured to apply the action output to the actual corporate system or environment as indicated by reference 550. The intelligent agent 500 may be configured with a simulated environment 560. The simulation environment 560 may be configured to apply the action plan 540 to a simulated system or environment 560, and the response of the simulated system or environment may be inputted by the data input component 510 and processed by the intelligent agent 500.

The intelligent agent 500 may be configured to input the data from the corporate environment on a periodic basis, for example, in near real-time, intra-daily, daily, intra-weekly or weekly.

The system state may be defined by time series corporate data received and processed by the fraud detection system 202 (see FIG. 2), and where the time series corporate data comprises data typically collected by a corporate organization in real-time from its computer and operational systems.

The intelligence agent 500 may be configured to operate in two environments or modes: an actual or operational control loop 550 and a simulated control loop 560. The actual control loop 550 operates in an actual corporate environment and inputs/processes measured corporate data.

The simulated control loop 560, on the other hand, is configured to operate in a simulated environment where the estimated state and estimated rewards or benefits are determined and used as a proxy for actual measurements. The simulation may determine a vector of product price points for determining the effect of a plurality of pricing decisions. The intelligent agent 500 may be further configured to use a simulated control loop and an actual control loop simultaneously, and actual measurements may be used to correct the simulated state at a regular interval, for example, every N simulations, where N is a user configurable integer.

The intelligent agent 500 may generate a fraud detection plan 540 that may have an action output. The action output of the fraud detection plan 540 may include an estimated state for the corporate environment and/or an estimated reward for the corporate environment. In addition to the fraud detection plan 540, the intelligent agent may generate one or more fraud alerts. The fraud detection plan 540 may be transmitted to a corporate organization for implementation at 550. The fraud detection plan may be transmitted to corporate system 204, including to operational systems 240 (see FIG. 2). The operational system 240 (see FIG. 2) may implement the fraud detection plan 540, manually by a user, or automatically, to affect product price changes at the corporation.

The intelligent agent module 500 may be configured to receive or measure measured state parameters and/or measured reward parameters of the corporate system or environment in response to the application of the fraud detection plan at 530.

The simulation control loop 560 may be configured to apply the fraud detection plan 540 to a simulated system or environment 560, and the response of the simulated system or environment may be received by the data input component 510 and processed by the intelligent agent module 500.

The data correction 512 corresponds to data correction 322 in FIG. 3, and may be configured to correct or adjust the data inputs for "measurement noise". In simulated control loop operation, the data correction 512 may be configured to correct the simulated state of the environment based on a measured state and/or measured reward.

The long-term memory component 514 corresponds to the long term memory 326 in FIG. 3, and is configured to store corporate data for use by the intelligent agent 500 having a longer term frequency response and/or historical control actions. The long-term memory component 514 may provide functionality and store data for use in the transaction monitoring or fraud detection or underwriting planning process having a longer term frequency response and/or historical control actions The short-term memory component 516 corresponds to the short term memory 328 in FIG. 3, and is configured to provide functionality and store data for the corporate system planning process having a shorter term frequency response and/or recent control actions. The short-term memory component 516 is configured to provide functionality and store data for the fraud detection system planning process having a shorter term frequency response and/or recent control actions.

The fraud detection model 518 corresponds to the fraud model 334 in FIG. 3, and is configured to execute a fraud detection system planning process as described herein.

The selected control policy search component 520 corresponds to the selected control policy search 332 in FIG. 3 and may be configured to utilize the current state of the corporate environment in the short term memory 328 and the historical state of the corporate environment in the long term memory 326 to generate a selected control policy and/or fraud detection plan 540 and/or one or more fraud alerts that changes long-term reward or goals for the corporate organization and which maintains stable control in the intelligent agent module 500. Stable control may refer to the generation of fraud detection plans that do not have significant policy or pricing oscillations from one period to the next. The stable control may be determined by applying a hysteresis function to the pricing decisions in the electronic fraud detection plan. Thus, stable control may produce fraud detection decisions in the electronic fraud plan that do not change drastically, and may be more predictable from one pricing period to the next.

The decision making policy 522 is configured to utilize the output of the selected control policy 520 to search and select a stable next action which can be executed by the corporate system 204 (see FIG. 2). The next stable action may include one or more control inputs for a fraud detection process, one or more fraud alerts, etc. The search and selection of the next stable action may be determined based on the current state of the long-term memory component 514 and/or the short-term memory component 516.

Figure 6:
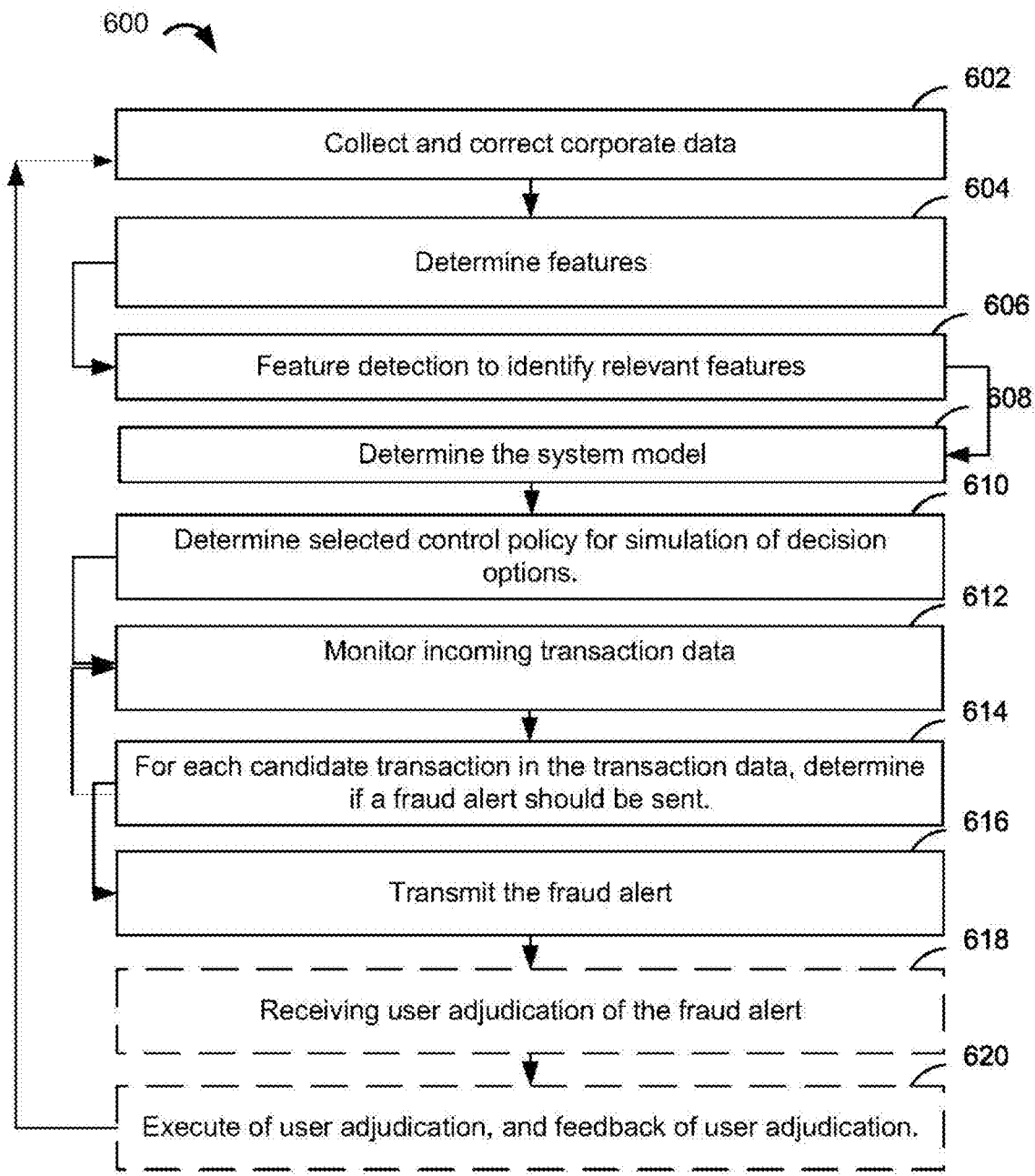
FIG. 6 shows a process flow diagram for fraud identification in accordance with one or more embodiments.

Reference is next made to FIG. 6, which shows a process flow diagram 600 for fraud identification in accordance with one or more embodiments for execution by the intelligent agent 500 (see FIG. 5).

At 602, corporate data is collected and corrected. The data may be collected and corrected at the data input component 510 in the intelligent agent 500 (see FIG. 5). Collecting and correcting data input may comprise executing data management data flows; executing holiday adjustments and de-trends, as described in more detail below.

Figure 24:
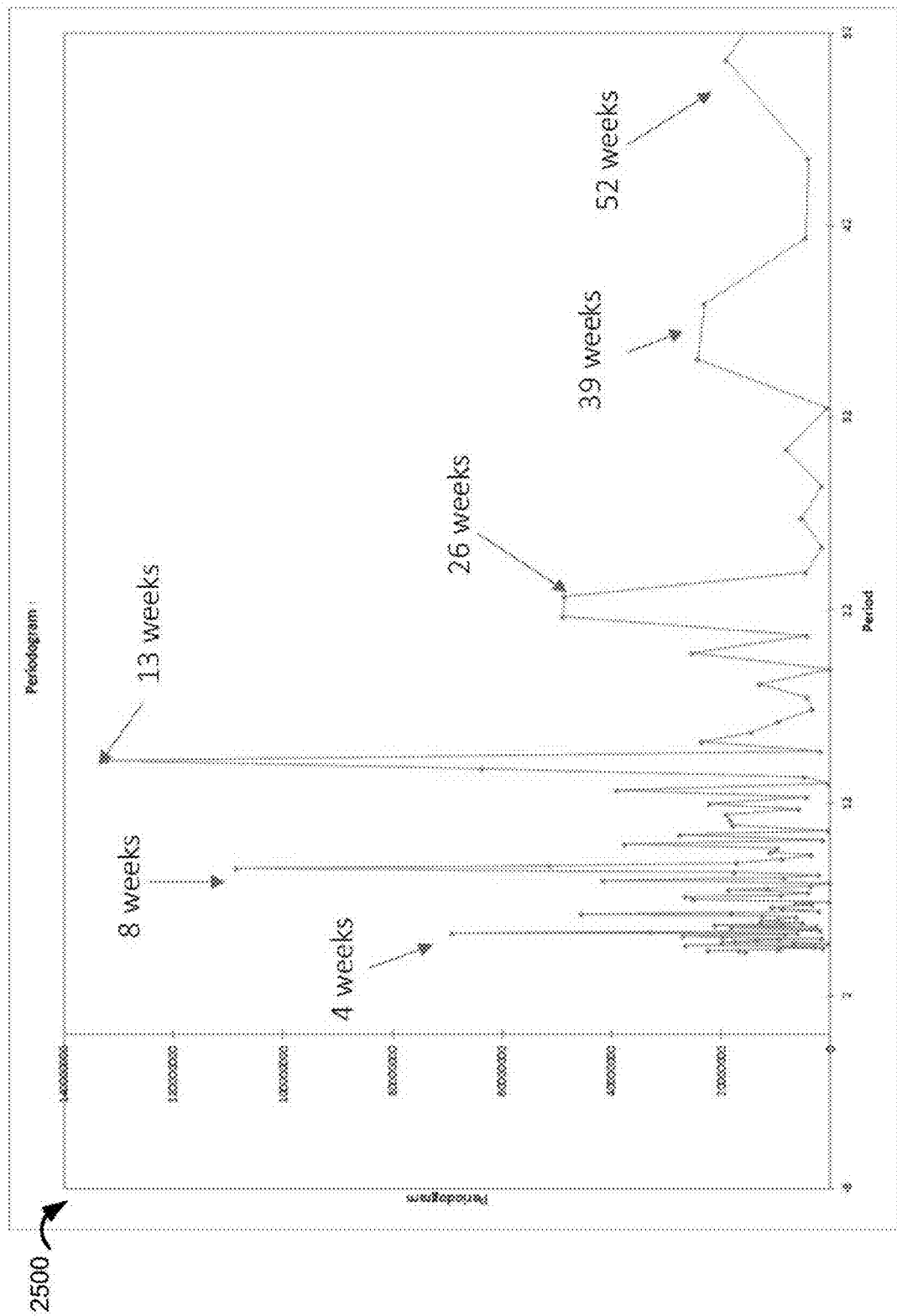
FIG. 24 shows a power spectrum diagram of corporate data in accordance with one or more embodiments.

Reference is made to FIG. 24, which shows a revenue time series diagram 2400 in accordance with one or more embodiments. The graph diagram 2400 may show corporate transaction time series year over year for an exemplary corporate organization, or a product of the corporate organization. In particular, the diagram 2400 shows how corporate transactions may vary year over year. It will be appreciated that the variation from a baseline may be affected by fraud detection and underwriting activity, including their impacts on revenue and related costs. There may further be seasonal affects that may cause particular periods to vary significantly in transaction metrics. The revenue diagram 2400 may show a vertical axis of gross revenue, and a horizontal axis of calendar week number (i.e. the number of weeks through the year). In particular, the graph diagram 2400 may show how corporate revenue may have variances year over year.

Fraud detection and underwriting activity may include differing product mix, different thresholds for fraud detection, etc. The fraud detection and underwriting activity may have significant effects on a corporate organization, including increases in overhead costs, increased or decreased customer interactions, and other trends.

There may be important periods in corporate revenue, typically within an 8 week, a 13 week, a 26 week and 52 week period. These important periods may reflect a variety of human time cycles, including seasonality, weather cycle effects, product lifecycles, holiday adjustments, etc.

Referring next to FIG. 24, there is shown a power spectrum diagram 2500 of revenue in accordance with one or more embodiments. The transformed corporate data, including a power spectrum diagram (or a periodogram) 2500 may show a representation of corporate time series data showing cyclical trend data. The power spectrum diagram (or a periodogram) 2500 has a vertical axis of amplitude and a horizontal axis of frequency. For example, there may be particular high revenue time periods such as near the holidays in December, near March break, etc.

In one embodiment, the data correction 512 (see FIG. 5) may perform signal analysis on the corporate data. The corporate data may include corporate time series data, including, for example, one or more transactions with provided time indices. The signal analysis may include mathematical transformations of the time series corporate data, for example, a Fourier Transform analysis may be performed on corporate data to generate transformed corporate data. The transformed corporate data may include the original corporate data, along with the generated data from the signal analysis. The signal analysis may generate a power spectrum showing the amount of "energy" in the time series at various frequencies. The notion of "energy" in the corporate context may be used given corporate time series data, which may reveal cyclic trends, seasonal activity, and other effects in the corporate revenue data and history, i.e. time cycles that may affect current revenue. As shown in FIG. 24, the corporate data for the corporation may have peaks at 13 weeks, 26 weeks and 52 weeks, and a significant energy peak at 8 weeks.

Figure 25:
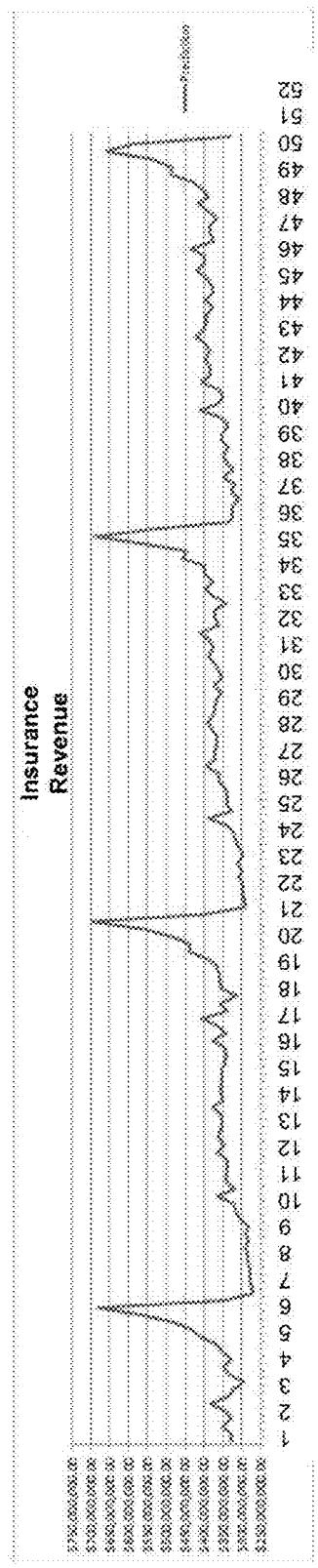
FIG. 25 shows a transformed corporate time series diagram with weekly level of time aggregation in accordance with one or more embodiments.

Referring next to FIG. 25, there is shown transformed corporate time series diagram 2600 with weekly level of time aggregation. The time series diagram 2600 may show a vertical axis of gross revenue, and a horizontal axis of calendar week number (i.e. the number of weeks through the year). In one or more embodiments, the corporate time series data may be transformed to generate stationary time series data by using comparable corporate revenue to minimize the year over year trend, i.e. remove gross or aberrant trends in the data. If a strong trend exists then further de-trending may be performed using a first order difference i.e. $d_t=S_t-S_{t-1}$ where $d_t$ is the difference at time t and $S_t$ is the comparable company revenue at time t, where the time scale may be related to the key power spectrum peaks. In the case where first order de-trending is used, further determinations using corporate revenue may instead use $d_t$.

In one embodiment, the transaction monitoring or fraud detection or underwriting planning process includes a holiday adjustment function or process.

Figure 26:
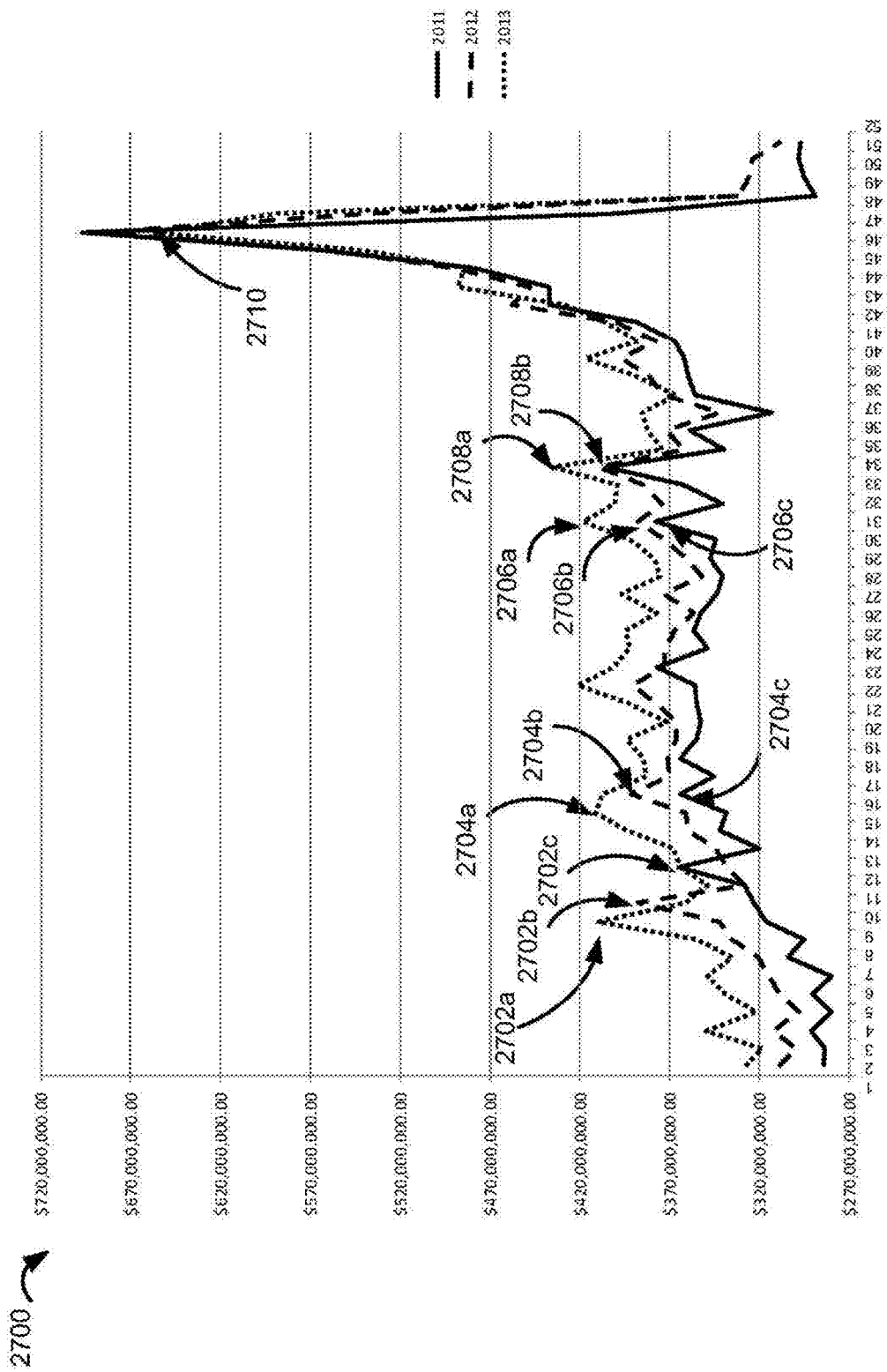
FIG. 26 shows a holiday adjustment diagram for the year over year time series diagram in accordance with one or more embodiments.
Figure 27A:
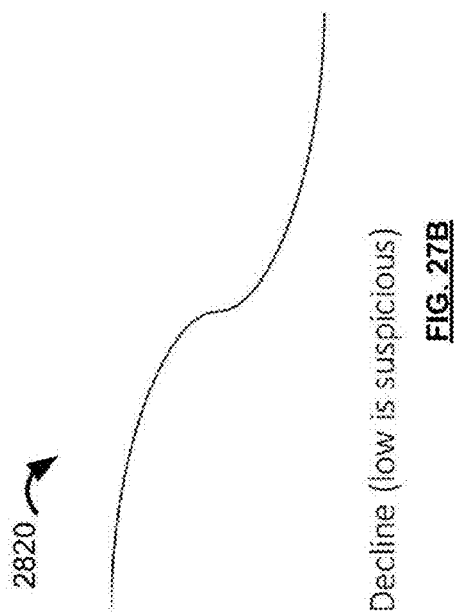
FIGS. 27A, 27B, 27C and 27D show fuzzy logic membership curve diagrams used by the intelligent agent in accordance with one or more embodiments.
Figure 27B:
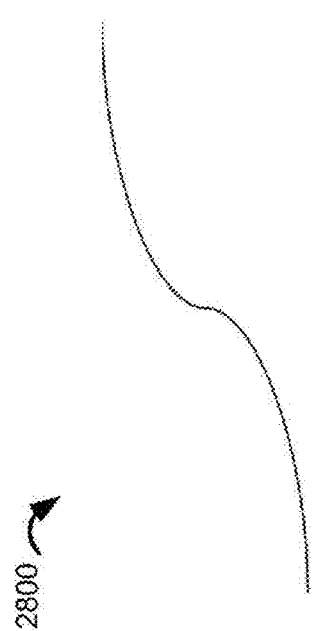
Figure 27C:
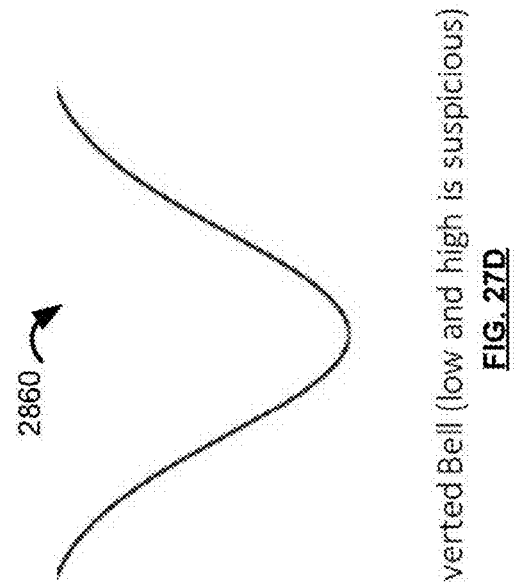
Figure 27D:
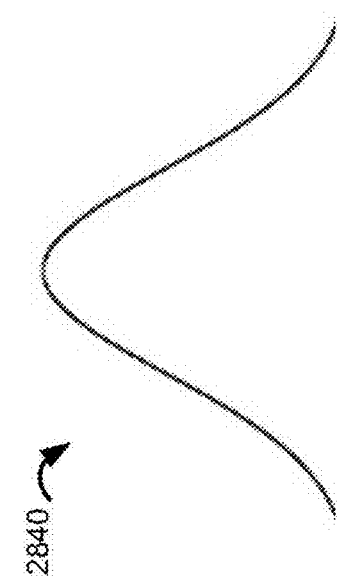

Referring next to FIG. 26, there is shown a holiday adjustment diagram 2700 for the year over year time series diagram in accordance with one or more embodiments. The corporate revenue diagram 2700 may show a vertical axis of gross revenue, and a horizontal axis of calendar week number (i.e. the number of weeks through the year). In one or more embodiments, the corporate data may be corrected by the sensor correction 512 (see FIG. 5), for example for holiday adjustment. The corporate revenue diagram 2700 may show a vertical axis of gross corporate revenue, and a horizontal axis of calendar week number (i.e. the number of weeks through the year). The corporate revenue diagram 2700 shows example year over year corporate revenue, including the alignment and misalignment of several holidays. For example, Easter may vary in date between March 22 and April 25, and Easter 2702a in 2013, Easter 2702b in 2014, and Easter 2702c in 2015 may move or shift and the revenue peak associated with the holiday may not be aligned. Victoria Day in Canada is celebrated on the last Monday preceding May 25, and Victoria Day 2704a in 2013, Victoria Day 2704b in 2014, and Victoria Day 2704c in 2015 may also not be aligned. Similarly, Labour Day 2706 is celebrated on the first Monday in September (and therefore varies), Canadian Thanksgiving 2708 is celebrated on the second Monday in October (and therefore varies), and Christmas 2710 is always celebrated on the 25$^{th}$ of December (and is therefore generally aligned in the revenue data).

Holidays on fixed dates, i.e. December 25, may move or shift 2 days per year. Holidays such as Victoria Day, Labour Day and Thanksgiving may move as they are not fixed dates. The Easter holiday may move as much as a month from year to year. Accordingly, a holiday adjustment may be performed on the corporate data in order to generate a holiday adjusted calendar. The holiday adjusted calendar may include aligning holiday revenue peaks year over year. Alignment of major and minor holiday peaks and key corporate annual revenue events may be performed to determine transformed corporate data including a power spectrum of the corporate revenue time series.

Referring back to FIG. 6, at 604 features are determined.

In one embodiment, the process may comprise performing functions for calculating fraud detection/underwriting and revenue interaction, fraud detection/underwriting overhead interaction, comparable baselines, power spectra and/or standard analytic files for actionable features and non-actionable features used in predictive modelling fraud/risk indicators and may be used in the fraud model 518 of FIG. 5, as described in further detail below.

Referring to FIG. 36, there is shown an example affinity matrix diagram 3800 in accordance with one or more embodiments. The interaction $$I_{jk}^{Pr}$$

between fraud detection/underwriting and revenue may be represented as a j×k matrix as shown in the matrix diagram 3800 (j and k replaced by N and M). For example, a corporate organization may send a letter to an insured person on an insurance policy, or to a claimant. In this example, the corporate organization may require to know the interactive effects of such an interaction as sending the letter, in case, for example, they may call a call center to request further information. The interactive effects may further include determining outliers in the interactive effects.

Figure 38:
FIG. 38 shows a table diagram of an example data set configured for determining a selected control policy according to one or more embodiments.

The N×M matrix may represent the interaction between the revenue of product/service N and the level of fraud detection/underwriting for product/service M, and each entry provides a floating point measure between −1 and 1 indicating the strength of the interaction. The interaction matrix entries may be calculated by conducting correlation and auto-correlation analysis using the power spectra of interest between revenue for product j and fraud detection/underwriting activity for product k. This correlation and auto-correlation analysis is conducted using standard methods to one familiar in the art. See FIG. 38 for an example data set 4000 for conducting correlation analysis.

Referring to FIG. 37, there is shown another matrix diagram 3900 in accordance with one or more embodiments. The interaction $I_{jk}^{O/H}$ between fraud detection/underwriting and revenue may be represented as a j×k matrix (j and k replaced by M and P). The M×P matrix may represent the interaction between the overhead costs (labour, technology, tec.) for product/service M and the level of fraud detection/underwriting for product/service P, and each entry provides a floating point measure between −1 and 1 indicating the strength of the interaction. The interaction matrix entries may be calculated by conducting correlation and auto-correlation analysis using the power spectra of interest between overhead costs for product j and fraud detection/underwriting activity for product k. This correlation and auto-correlation analysis may be conducted as known. See FIG. 38 for an exemplary data set 4000 for conducting correlation analysis.

Figure 34:
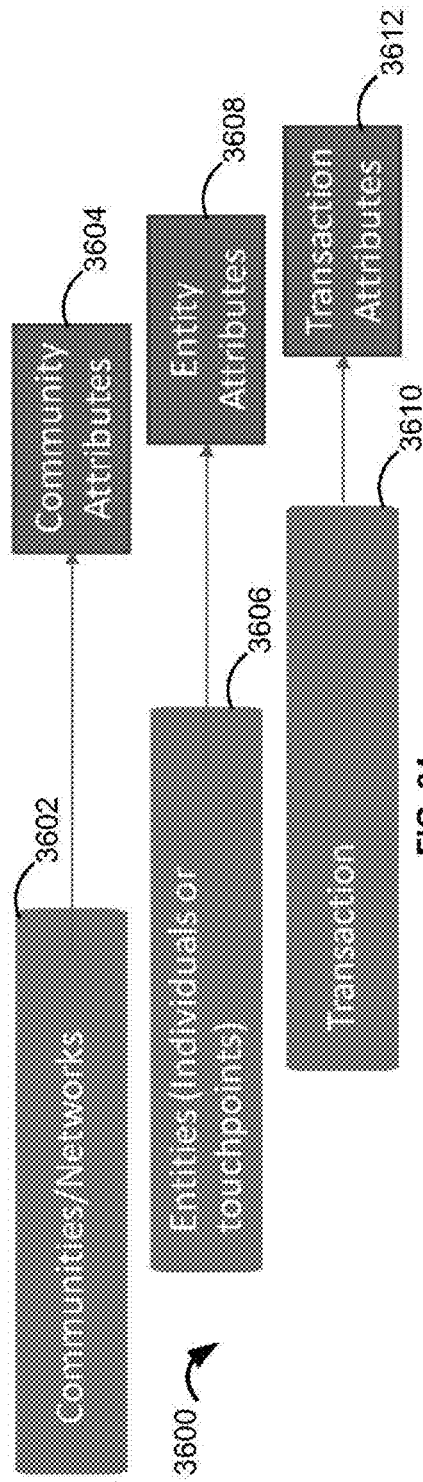
FIG. 34 shows a transaction entity hierarchy diagram in accordance with one or more embodiments.

Referring next to FIG. 34, a transaction entity hierarchy diagram 3600 is shown. The transaction entity hierarchy 3600 may comprise a bottom-up hierarchy from the transaction itself 3610 and attributes about the transaction 3612, entities associated with the transaction 3606 (transactors, 3$^{rd}$ parties, health card providers, adjustors, IP addresses, phone numbers, addresses, bank account numbers, companies etc.) and attributes about each of the entities 3608, and Communities/Networks 3602 derived from the entities and transactions using the entity attributes and transaction attributes to link entities and transactions into communities or network of entities as well as attributes about the communities/networks 3604. The attributes of each hierarchy level (see FIG. 40 for an exemplary entity attribute set 4200) may also be used to define peer groups for each entity level based on a clustering or segmentation of the entities using entity attributes with methods as known.

Reference is made back to FIG. 6. At 606 feature detection may be performed to identify relevant features. The process may comprise selecting relevant actionable features and non-actionable features.

According to an embodiment, the feature detection comprises a process for reducing features to those features that are relevant for the current period being processed. In one embodiment, the feature detection process may comprise linear correlation on the features versus the metric being selected (e.g. revenue, gross margin, transactions, fraud type, fraud recovery, false positive etc.). The process may further select the most linearly correlated features followed by removal of redundant features that are correlated to each other. In another embodiment, principal components analysis may be performed to form a linear basis of the dimensionality of the number of features followed by correlation of the components versus the metric being selected. In another embodiment, least absolute shrinkage and selection operator (LASSO) regularized regression may be used to select relevant features that may be predictive of the metric being selected. In another embodiment, a Deep Neural Network Auto Encoder may be trained so that the input feature layer matches an identical output layer, the innermost layer of the network representing a non-linear reduced feature set to be correlated to the metric being selected.

Referring back to FIG. 6, at 608 a system model is generated for the corporation. In one embodiment, the transaction monitoring or fraud detection or underwriting planning process may be configured with a plurality of processes or functional components to execute the processing and calculating operations in order to determine revenue, transactions, profit and other corporate metric derivable from transaction data, as described in more detail below.

The model generation process may comprise the execution of Equation (1) by a computer or computers operating under stored program control in order to generate a fraud detection model. As will be described in more detail below, Equation (1) may comprise a mathematical formulation which is executed to model a corporate environment and simulate corporate transaction, fraud detection or underwriting metrics, for instance, year-over-year revenue, margins and/or transactions as a function of year-over-year transaction monitoring, fraud detection or underwriting difference. Several years of detailed historical data may be leveraged to minimize specific external effects on a balance of averages over the years.

According to an embodiment, Equation (1) takes the following form:

$$\hat{s}(t) = \sum_{i=1}^{N} \left[ \sum_{mo=1}^{n_m} \left\{ \sum_{ps=1}^{n_{ps}} \left( \sum_{p=1}^{n} f_p(a(t_{ps}), b(Fr, t_{ps})) + \left[ \sum_{j=1}^{m} \left\{ \sum_{k=1}^{m} (\alpha_{c(j)}(Pr(t)_j - (Pr'(t_{ps}))_j) * I_{jk}^{Pr} * R_{Pr(k)} + \beta_{c(j)}(Cl(t)_j - Cl'(t_{ps})_j) + \gamma_{c(j)} * I_{jk}^{O/H} * R_{Cl(k)} * P) * (Fr(t)_j - Fr'(t_{ps})_j) \right\} \right] \right)_{ps} \right\}_{mo} \right]$$

where $\hat{s}$=total gross profit for the period in question (i.e. time t)

Feature values components may be for time $t_{ps}$ the relevant power spectrum peaks which are auto-correlated to the time t.

N=number of weeks for the historical data used.

$n_{ps}$=number of power spectrum peaks used.

$n_m$=number of sub-segments (i.e. geographic region, risk segments, product type).

n=number of terms in the predictive model (i.e. number of coefficients).

m=the number of elements of the product hierarchy level used in the equation.

$Fr_j$=the number of fraudulent claims or transaction adjudications or underwritings being avoided or appropriately priced in the time period in question where the fraudulent claims or transaction adjudication or underwritings can be represented by entity level associated with the transaction (transaction itself, transactor, third party, adjustor, underwriter, network etc.) whose elements are identified by index j. This is an integer.

$Fr'_j$=the number of fraudulent claims avoided in a prior period of interest for entity level value j. This is an integer.

$Pr_j$=the insurance premium or transaction revenue to be collected in the period of interest for entity level value j.

$Pr'_j$=the insurance premium or transaction revenue collected in a prior period of interest for entity level value j.

$Cl_j$=the forecasted claim losses or transaction losses or underwriting pricing inaccuracies net of subrogation or other recoveries to be paid in the period of interest for entity level value j.

$Cl'_j$=the actual claim losses or transaction losses or losses due to underwriting pricing inaccuracies paid out net of subrogation or other recoveries in a prior period of interest for entity level value j.

$f_p(a,b(x_p))$=linear or non-linear model to forecast claim loss or transaction loss or underwriting inaccuracies used to set price or premiums with features calculated at prior periods of interest, with a=Non-actionable features (these variables aren't dependent on Fr)

b(Fr)=actionable features (depend on the solution vector Fr)

In linear form, $$f_p(a, b(Fr)) = C_0 + C_1 a_1 + C_2 a_2 + \ldots + C_r a_r +$$
$$C_{r+1} b_1 + C_{r+2} b_2 + \ldots + C_n b_{n-1-r}; \text{ where } r = (1, n)$$
(Equation 5)

$C_p$=coefficients (that will be calibrated)
r=number of non-actionable features in the model
n−r=number of actionable features in the model
$I_{jk}^{Pr}$=interaction matrix between entity level j with entity level k which captures the interaction between increased fraud detection and potential revenue loss or gain by segment.
$I_{jk}^{O/H}$=interaction matrix between entity level j with entity level k which captures the interaction between increased fraud detection and impacts on overhead loss or gain by segment.
P=O/H costs including (call-center calls from entity level j+cost of investigations/adjudication for entity level j+cost of technology to investigate entity level j)
$R_{Pr(k)}$, $R_{Cl(k)}$=resultant binary of item k . . . the coefficient is a function of k, the number of coefficients is less than or equal to k $$R_{Pr(k)}, R_{Cl(k)} = \begin{cases} 0 & \text{if } [(x]_k - x'_k) = 0 \\ 0 < Cpr \text{ or } Ccl < 1 & \text{otherwise} \end{cases}$$

the constant Ccl and Cpr to be Calibrated
$\alpha_{c(j)}$, $\beta_{c(j)}$, and $\gamma_{c(j)}$=unknown model coefficients to be calibrated . . . the coefficient is a function of j, the number of coefficients is less than or equal to k At 610, a selected control policy for simulation of decision options is determined. The process for determining the selected control policy 610 for, e.g. transaction monitoring, fraud detection, or underwriting planning may be used to simulate decision options for the corporation. The process may comprise defining or using the selected policy derived from the corporate state model in order to simulate future occurrences and generate a sequence (e.g. long term) of transaction monitoring, fraud detection, or underwriting targets which can maximize long term reward or return for the corporation.

To search for the selected policy, the transaction monitoring or fraud detection or underwriting system planning process may be configured to assemble and execute Equation (1) for all historical periods available where all features and the metric of interest are known. In one or more embodiments, Equation (1) is configured using weekly values of the interactions for product categories although any period size and product hierarchy level may be used. It will be appreciated that for determining the selected policy, the solution vector $Fr(t)_j$ or control inputs may be based on known historical data. An example data set is depicted in FIG. 43. In another embodiment, the summations in Equation (1) may be expanded to form a data set structure 2500 which is used for searching for the selected control policy, as depicted in FIG. 43.

Referring next to FIG. 43, there is shown a table diagram 4500 of an example data set configured for determining a selected control policy according to one or more embodiments. The data set 4500 may be based on a Z period 4502, and the period may typically comprise a fiscal week, but may be selected to have a shorter or a longer duration. As shown, the data set 4500 includes an "Actual fraud or claim loss" column 4504, where Yi may represent the actual value of the metric of interest and taken from historical data, and a "Predicted Fraud or Claim Loss" column 4506, where $\hat{Y}_i$ may represent the predicted value of the metric of interest based on execution of Equation (1) with historical data. The remaining columns 4508, 4510, and 4512 in the data set 4500, may comprise the resultant features generated through the execution of Equation (1), where $X_{11}$, to $X_{ZN}$ represent the features or components for Equation (1).

In one embodiment, the known historical data may be used to identify the floating point coefficients $C_p$ in the equation $f_p(a,b(x_p))$ and also the coefficients $\beta_{c(j)}$ by minimizing $|s-\hat{s}|$ where s is the known value of the metric of interest from historical data and s is the value of the metric calculated from the above mathematical theory. It will be appreciated that the above equation is linear in the coefficients $C_p$ and $\beta_{c(j)}$ and can be determined using an iterative optimizations algorithm such as gradient descent or other methods as are known. Other examples of the iterative optimization algorithm may include but are not limited to, simulated annealing, Markov random fields, particle swarm optimization, and genetic algorithms.

The equation and coefficient values which minimize $|s-\hat{s}|$ may form the selected control policy which can be used to choose the control input vector $Fr(t)_j$ the level of transaction monitoring or fraud detection underwriting drive pricing in a given period for each product or product hierarchy level.

Referring back to FIG. 6, at 610 decision options are simulated using the detailed control policy. This may include simulating selected levels of transaction monitoring or fraud detection or underwriting decision making for the corporation. In one embodiment of the invention, the transaction monitoring or fraud detection or underwriting system may execute Equation (1) utilizing selected policy determinations as follows in order to simulate planning options for the corporation.

In this embodiment, Equation (1) may be used with selected coefficients $C_p$ and $\beta_{c(j)}$ that minimize $|s-\hat{s}|$ over historical time periods in order to forecast the future performance of the desired metric. The selected sequence of actions $Fr(t)_j$ may be the one that maximizes the reward $\hat{s}(t)$ over a sequence of times t. The selected sequence of actions may include decisions such as whether a claim may be paid, whether a transaction may be determined to be an outlier, whether a policy should be underwritten. The selected sequence may further include control points for decision making by the corporate organization. For example, the selected actions may comprise actuarial tables for insurance pricing, etc. The maximum reward may be a sequence of actions that minimizes fraud, or maximizes some other revenue metric. The levels of transaction monitoring or fraud detection or underwriting in solution vector $Fr(t)_j$ may be subject to minimum and maximum constraints on the range of allowable investments to be considered. The constraints may be expressed in Equation (2) as a series of constraints of the form:

$$Fr_{min\,l} < Ft(t)_l < Fr_{max\,l} \quad \text{Equation (2)}$$

where $Fr(t)_l$ may be the level of transaction monitoring or fraud detection or underwriting for product or product category l which is constrained to be between $Fr_{min\,l}$ and $Fr_{max\,l}$. The minimum and maximum level of investment or target may be based on the available corporate budgets that must be allocated for all initiatives. The constraints can be unique to each product or product category. Utilizing the sequence of solution vectors for a period of time $Fr(t)_j$ to $Fr(t_N)_j$ a fraud detection plan or targets for transaction monitoring or fraud detection or underwriting generated for periods $t_1$ to $t_N$ may be determined.

An example data set 4200 suitable for simulation using the selected control policy to define control inputs is shown in FIG. 40. In one embodiment, simulation of Equation (1) with constraints of Equation (2) and the data set 4200, a genetic algorithm or particle swarm may be used in order to simulate the future and choose a selected control strategy. It will be appreciated that genetic algorithms are a form of reinforcement learning that introduces a combined element of exploitation (using long term and short term known history) and search (using a random searching capability to learn new actions not taken in the past).

Referring back to FIG. 6, at 612 monitoring of incoming transaction (or underwriting) data may be performed by executing the transaction monitoring or fraud detection or underwriting decision sequence $Fr(t)_j$ to $Fr(t_N)_j$. This may include executing consecutive sequences $Fr(t)_j$ to $Fr(t+1)_j$ indicated by reference 614 and generating alerts for those entities that exceed a threshold. In one embodiment, alerts may be transmitted to client systems 616. Steps 612 and 614 may be iterated through for all the sequences. Users may adjudicate the alerted transactions 618 and the results of the adjudication are captured and fed back 620 to the intelligent agent via a feedback loop.

As described herein, the fraud detection plan may be determined based on the execution of Equation (1) subject to the constraints of Equation (2). In one embodiment, the transaction monitoring or fraud detection or underwriting plan is integrated into the corporation's computer systems, for instance, the operational computer systems configured for transaction processing and adjudication. This integration may be made by way of an API with corporate operational systems.

Referring next to FIG. 10 there is shown data flow diagram 1000 for the fraud identification system in accordance with one or more embodiments. The fraud detection plan, including one or more actions, may be transmitted to the corporate computer center 1010. In one embodiment, the output plan may be gamified and executed on the corporation's computer system 1010, for instance at adjudication 618 in FIG. 6. The fraud detection plan generated by the transaction monitoring or fraud detection or underwriting planning system may be gamified to encourage users of the corporation to drive a performance measure. This gamification may be used to reinforce the intelligent agent to operate an automated adjudication engine configured to execute decisions based on thresholding or to trade off alternative decisions using the metric to determine the better of two alternatives. The alert processing may be collapsed into two measures, such as a rank and an index.

The results of the execution of the fraud detection plan by the corporate computer system may be captured in the client planning and transactional systems 240 (see e.g. FIG. 2). In one embodiment, the captured data may be fed back to the data input 510 in the intelligent agent 500 (FIG. 5) in a feedback loop.

Figure 12:
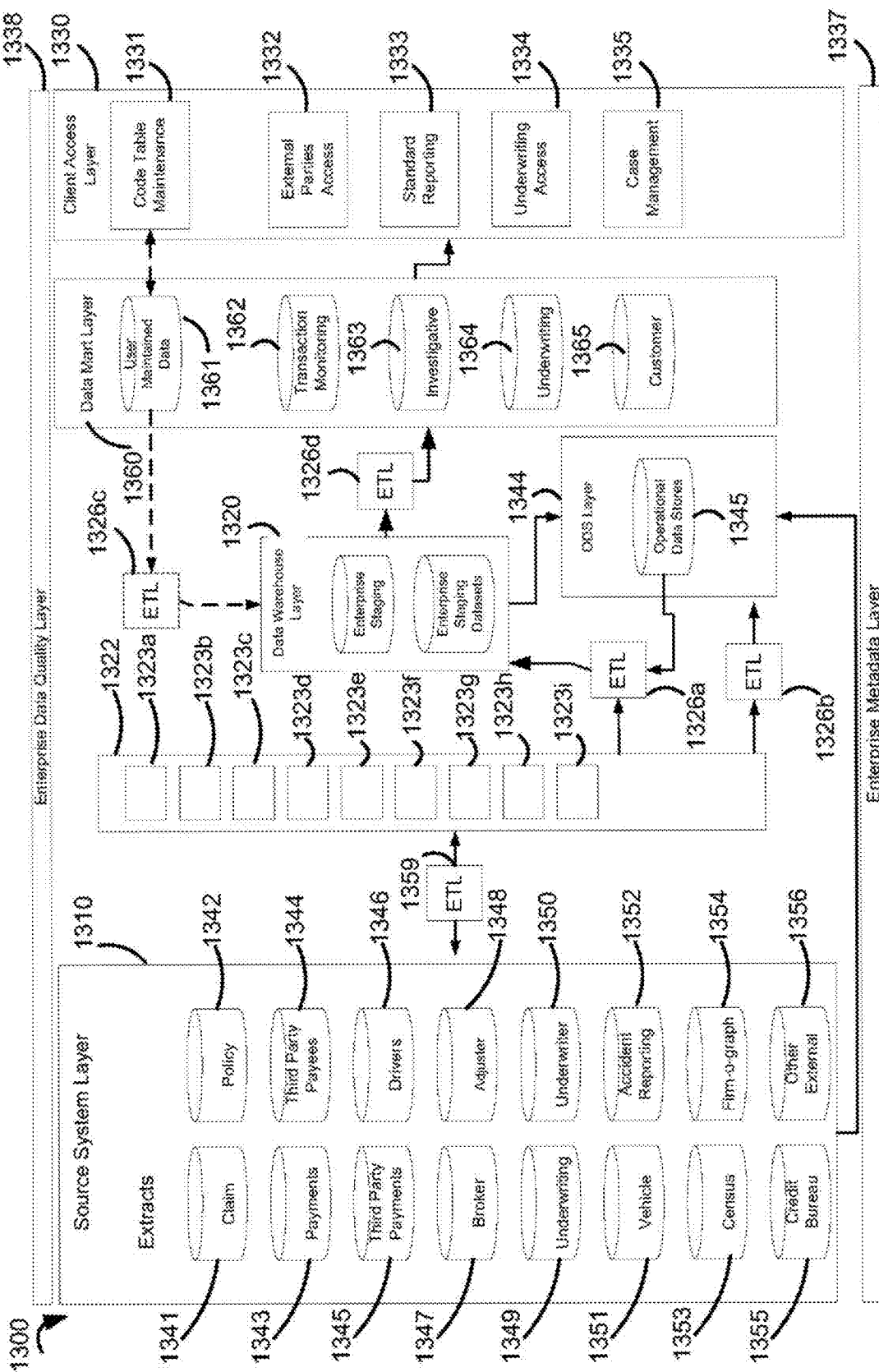
FIG. 12 shows another data warehouse architecture diagram for the outlier transaction identification system in accordance with one or more embodiments.

Referring next to FIG. 12, there is shown a data warehouse architecture 1300 for the fraud detection system 100 according to one or more embodiments.

The data warehouse architecture 1300 may comprise a source system layer 1310, and a client access layer 1330. According to one or more embodiments, the data warehouse layer may comprise a staging layer 1322, a data warehouse layer (i.e. enterprise level) 1320 and a data mart layer 1360. The data warehouse layer 1320 may also include an operational data stores (ODS) layer 1344. The data warehouse architecture 1300 may further comprise an enterprise data quality layer 1338 and an enterprise metadata layer 1337.

The client staging layer 1322 may comprise real-time or batch data associated with the corporate systems, for example, various aspects of insurance data including but not limited to insurance policy data, insurance claim data, etc. The corporate data may comprise a claim database 1341, a policy database 1342, a payments database 1343, a third party payee database 1344, a third party payments database 1345, a driver database 1346, a broker database 1347, an adjuster database 1348, an underwriting database 1349, an underwriter database 1350, a vehicle database 1351, an accident reporting database 1352, a census database 1353, a firm-o-graph database 1354, a credit bureau database 1355 and an external database 1356. As shown, an ETL module 1359 may be used to extract or transfer data from the corporate database(s) to the staging layer 1322. In one or more embodiments, the staging layer 1322 may be configured for a single extract 1323 per data source, indicated individually by references 1323*a*, 1323*b* . . . 1323*i*. Data may be selected from the staging layer 1322 and transferred to the data warehouse layer 1324 using an ETL module 1326*a*. In one or more embodiments, the data warehouse layer 1324 may comprise a claim database 1341 and may also include an archived log of insurance claims or transaction data. As described above, data from the data warehouse 1320 may be processed to generate fraud detection, underwriting, or monitoring information. The data mart layer 1360 may be configured to receive the output generated from the data warehouse layer 1320 via an ETL module 1326*d*. In one or more embodiments, the data mart layer 1360 comprises a user maintained database 1361, a transaction monitoring database 1362, an investigative database 1363, an underwriting database 1364, and a customer database 1365.

As shown in FIG. 12, the operational data stores layer 1344 may receive data from the staging layer 1322 through an ETL module 1326*b*, and may be configured to provide one or more of the following functions: batch scoring; real-time scoring; batch reporting; and/or near-time reporting.

The client access layer 1330 may be configured to provide access to the data mart layer 1360. In one or more embodiments, the client access layer 1330 may comprise a web portal, a code table maintenance module 1331, an external parties access module 1332, a standard reporting module 1333, underwriting access 1334 and a case management module 1335.

Referring next to FIG. 9, shown is a high level data architecture drawing 900 for the fraud detection system 100 of FIG. 1. The data platform architecture 900 includes a regular data extraction 902, a network operations team 904, corporate operational systems 906, corporate data system 908, client workflow software 910, fraud detection system workflow software 912, reporting software 914, client users 916 and reporting users 918. The network operations team 904 may configure the data architecture 900 to perform Extract Transform and Load operations for the corporate data. The client users 916 may use client workflow software 910 and fraud detection system workflow software 912 in order to receive fraud detection alerts, underwriting plans, and fraud detection plans from the corporate data system 908. The reporting users 918 may use the fraud detection system workflow software 912 and reporting software 914.

The corporate data system 908 may include an ETL component 920, one or more analytic databases 922, a data staging (i.e. Enterprise Data Warehouse or EDW) component 928, a computational platform 924, a data Application Programming Interface (API) service 926 and one or more reporting databases 930.

In one or more embodiments, the computational platform 924 may comprise a parallel computing architecture implemented in computer hardware and software and including MPI's (Message Passing Interfaces). The computational platform 924 may comprise one or more GPU's (Graphical Processing Units) configured to provide parallel computer processing functions. In one or more embodiments, the intelligent agent module 500, as described above with reference to FIG. 5, may be configured to run on the computational platform 924.

Referring to FIG. 9, the data system 908 may be configured with an input interface at the ETL component 920, and an output API service 926. The input interface 920 may be configured to provide an interface for receiving "corporate data" from the corporate operational systems, i.e. the corporate system 204 (see FIG. 2A). The corporate data may be received as regular data extract 902 at a regular interval. The output interface 926 may be coupled to the client operational systems of a corporate organization, for example, the corporate operational computer system 240 (see FIG. 2A). The output port 926 may be configured to output the fraud alerts, fraud detection plan, or underwriting plan generated by the intelligent agent module 500 (see FIG. 5).

As shown in FIG. 9, the ETL module 920 may receive a data extraction 902 from one or more of the client operational systems. The ETL component 920 may be configured to receive corporate data and information from the client, for example, on a near real-time, daily or weekly basis. The ETL module 920 may be configured to provide pre-processing of the extracted corporate data, which may then be routed to the data staging (Enterprise Data Warehouse) module 928. ETL data flow according to one or more embodiments will be described in more detail below with reference to FIG. 11. The enterprise data warehouse component 928 may comprise a repository for storing data from a number of sources. A data warehouse according to one or more embodiments will be described in more detail below with reference to FIG. 12. The data extracted from the client operational systems may also comprise feedback data and/or results (for example, as described above for the intelligent agent module 500—see e.g. FIG. 5). According to one or more embodiments, the ETL module 920 may be configured to route this data to the analytic database 922.

According to one or more embodiments, the data flow architecture 900 includes a web service indicated by reference 926. The web service 926 may further be configured to provide a web-based interface for users and/or administrators. According to one or more embodiments, the web service 926 may be configured to provide a web-based interface, i.e. available to a user in a browser such Google Chrome or Safari, and may comprise a reporting system interface 914, a workflow software interface 912 and a client workflow software interface 910. The reporting system interface 914 may be configured to provide management reporting functions, business intelligence reporting functions and/or financial planning reporting functions.

Alerts, adjudication decisions and pricing decisions may be transmitted to client operational systems 906 using an API, a web service, or workflow software.

Figure 11:
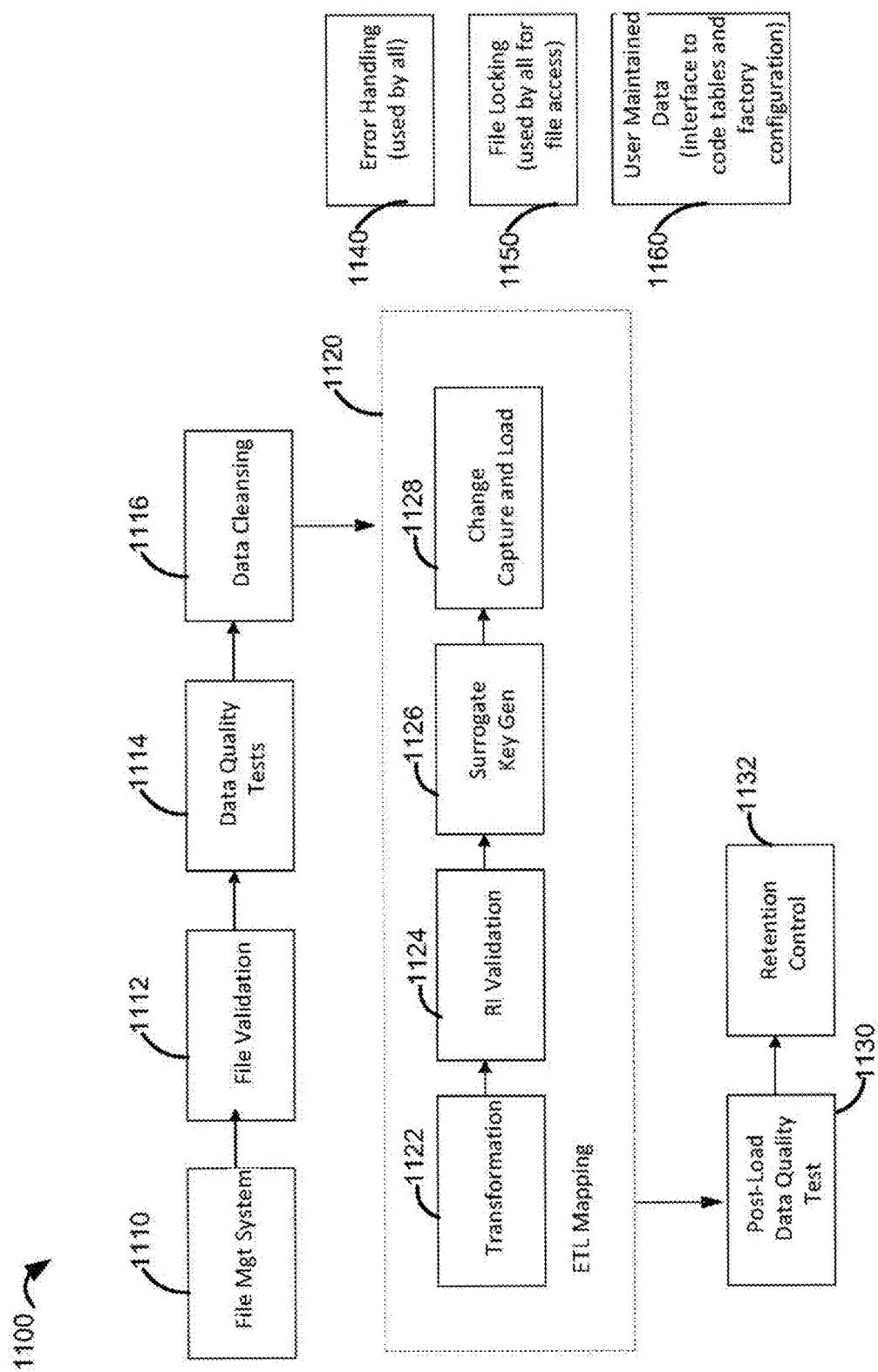
FIG. 11 shows another process flow diagram for an outlier transaction identification system for an ETL (Extract, Transform, Load) process in accordance with one or more embodiments.

Referring next to FIG. 11, there is an Extract, Transform, Load (ETL) data flow 1100 for the fraud detection system. The data flow 1100 may be for the ETL module 920 and the data system 910 of FIG. 9. The data flow process 1100 may comprise a file management module or function 1110, a file validation module or function 1112, a data quality testing module or function 1114, a data cleansing module or function 1116, an ETL mapping module 1120. The data flow process 1100 may include a post-load data quality testing module 1130 and a retention control module 1132.

The file management component 1110 may be configured to operate under stored program control on a computer and execute the following functions:
 build an expected source files list
 compare files received to the expected source files list
 verify that files have been received (optionally)
 alert operators if files are missing or received in error
 log (operational metadata) when files arrive and the associated processing status
 implement file acceptance logic In one or more embodiments, the file management module 1110 (and the file validation module 1112 and the data quality testing module 1114) may be configured to accept one file per day per source file type. Multiple files of the same type received from a source within a defined time frame may be rejected if a file has already been accepted and received. Files received with a future date or a date more than X days in the past will be rejected where x is stored in the metadata (e.g. 16 days from current).

The file validation module 1112 may be configured to operate under stored program control on a computer and execute the following validation functions:
 the existence of mandatory fields and segments (e.g. headers and trailers)
 internal structural file integrity checks (e.g. file record counts matching header record count value)
 absence of extraneous data
 comparison of file row counts to the value stored in the trailer record
 data type checking by column
 validate the specified record count against the actual received record count
 validate source system code
 validate the source system table
 checksum if the source file has an external to firewall origination.
 compare file name, date and time with the extract date and time in the header record to ensure data content matches file name.
 compare the header and trailer records for extract date, time and system.

The data quality testing module 1114 may be configured to operate under stored program control on a computer and execute the following testing functions:
 perform file quality checks that identify files that are accepted for downstream ETL processing; identify files that are rejected based on thresholds stored in the Entity table of the metadata.
 perform Row/Column quality checks which will identify data rows within files that are:
  accepted for downstream ETL processing
  rejected and will not be forwarded for downstream processing. Once a row has been identified as a rejected row, it will be:
  written out to a rejected row file
  logged in metadata at a summary level identified with a warning indicator in the operational metadata logs; the warning identified data rows will remain in the data file so that downstream data cleansing will provide a pre-described response to the warning condition the post-load data quality tests 1130 may include:

domain checking—for the data content of a column against a list of known values for the column. (e.g. The valid values for a product status are A—Active, I—Inactive, or T—Temporary) if any value isn't in the domain then an exception condition is created range checking that the data content of a column falls within a given range of values specified by a maximum, minimum or both The data cleansing module 1112 may be configured to operate under stored program control on a computer and using the test results from the data quality testing module 1114 to execute the following functions:

perform Row Warning processing replace row attributes identified in the data quality testing with business supplied replacement values perform Data Standardization attribute updates (e.g. customer comes from more than 1 source system and both systems have a customer status code; for enterprise consistency only a single standard code will exist in the EDW data formatting (e.g. date in consistent form)

produce data cleansing operational metadata number and type of substitutions number and type of data standardizations In one or more embodiments, rejected files may be re-introduced into the processing stream if they have been approved for processing by the users.

As shown in FIG. 11, the ETL Mapping module 1120 may comprise a transformation module or function 1122, a RI validation module or function 1124, a surrogate key generation module or function 1126 and a change capture and load module or function 1128.

The transformation module 1122 may be configured to operate under stored program control on a computer to execute the following data transformation functions:

application of all defined business transformation rules for the given input files transformation of the validated source files into load-ready files for each defined filter criteria, apply the condition to the validated source file, preserve the rows filtered out and log the count The surrogate key generation module 1126 may be configured to operate under stored program control on a computer and execute the following functions:

permanently assign a surrogate key value to an entity for each distinct natural key provided for that entity to enable multiple ETL processes to use the same processing logic for surrogate key generation, by using the file locking common component just as a file would be locked for each distinct logical entity, this process will maintain a separate cross-reference table in the EDW database that will record the relationships between natural and surrogate key values The change capture and load module 1128 may be configured to operate under stored program control on a computer and execute the following functions:

compare transformed input data to existing data in Slowly Changing Dimension (SCD) Type 2 target tables rows that are unchanged between the target table and source extract will not be modified insert new rows preserve history, the old row will be updated to set the expiry date to the extract date −1 rows that have been deleted from source system will not be physically deleted from the EDW table. To preserve history, these rows will be updated to set the expiry date to the extract date −1

The output from the ETL mapping module 1120 may then be processed by the post-load data quality testing module 1130 and the retention control module 1132.

The retention control module 1132 may be configured to operate under stored program control on a computer to execute the following functions:

export fact type data only from the EDW database to files that are stored in the archiving directory when data in the table has expired dates greater than the retention period specified for the table copy files from the archive directories to tape, confirming the copy and removing the files from the archiving directories The data flow process 1100 may further comprise an error handling module or function 1140, a file locking module or function 1150 and a user maintained database interface 1160. The modules may comprise functions that can be called or invoked by the other modules in the data flow process 1100.

The error handling or exception processing module 1140 may be configured to operate under stored program control on a computer and execute the following functions:

facilitate exception logging for all EDW processing minimize the hard coding effort by using operational metadata to drive the exception process; this minimizes code maintenance efforts provide a standardized recovery process for all file transformations provide simple notification functionality provide a consistent interface for exception handling The exception processing module 1140 may include three standardized component interfaces configured to perform the following tasks:

exception logging file recovery exception notification

The file locking module 1150 may be configured to operate under stored program control on a computer and execute the following functions:

facilitate the exclusive use of a given file resource for serial file updating facilitate shared and consistent file read usage establish consistent queuing of file lock requests integrate with a common component for exception and error handling the two process flows within this component are the file locking request process and the file locking release process The user maintained database interface 1160 may be configured to provide the following functionality:

a user interface to permit users controlled access to maintain select metadata a user interface to permit users to review rejection processing logs source data for EDW and ETL processing from the User Maintained Data database data flow between the EDW and the User Maintained Database by separate ETL processes.

Figure 41:
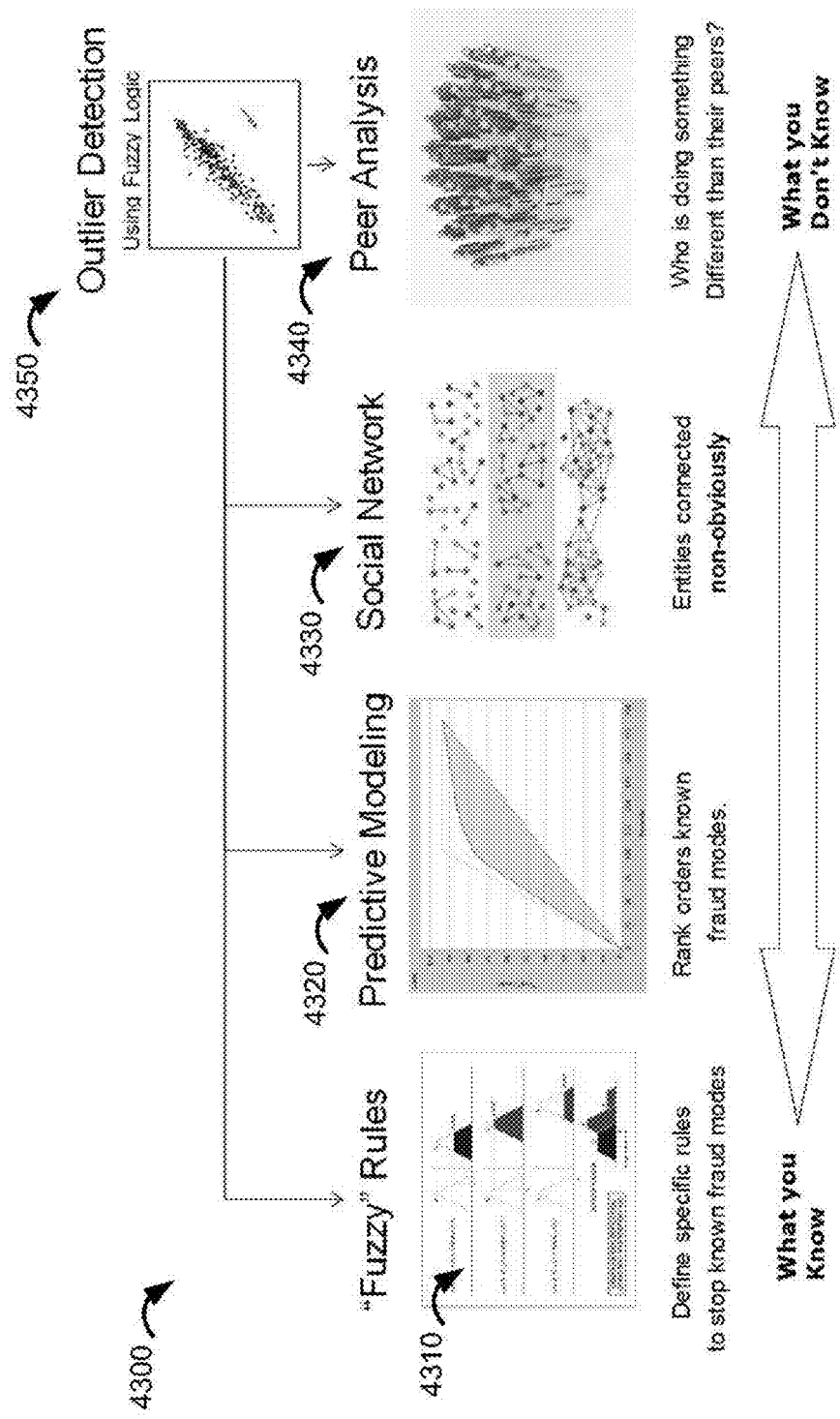
FIG. 41 shows a process flow diagram for outlier detection and peer analysis according to one or more embodiments.

Referring next to FIG. 41, there is shown a process flow diagram 4300 for outlier detection and peer analysis according to one or more embodiments. The process flow diagram 4300 may be used by the fraud detection system to make transaction monitoring or fraud detection or underwriting decisions. In one embodiment, the process flow 4300 may be performed at 612 of FIG. 6. Fuzzy Rules 4310 and Predictive Modeling 4320 may be two techniques used by the fraud detection system to detect when historical fraud or delinquency/bankruptcy has occurred to permit pattern detection and predictive modeling to be executed for future fraud detection. Community detection in Social Networks 4320 and Peer Analysis 4340 may further be performed to expand the pattern matching and predictive modelling, by identifying outliers. Fuzzy logic 4350 based outlier detection may further be applied to the output of each to the other techniques.

Figure 42:
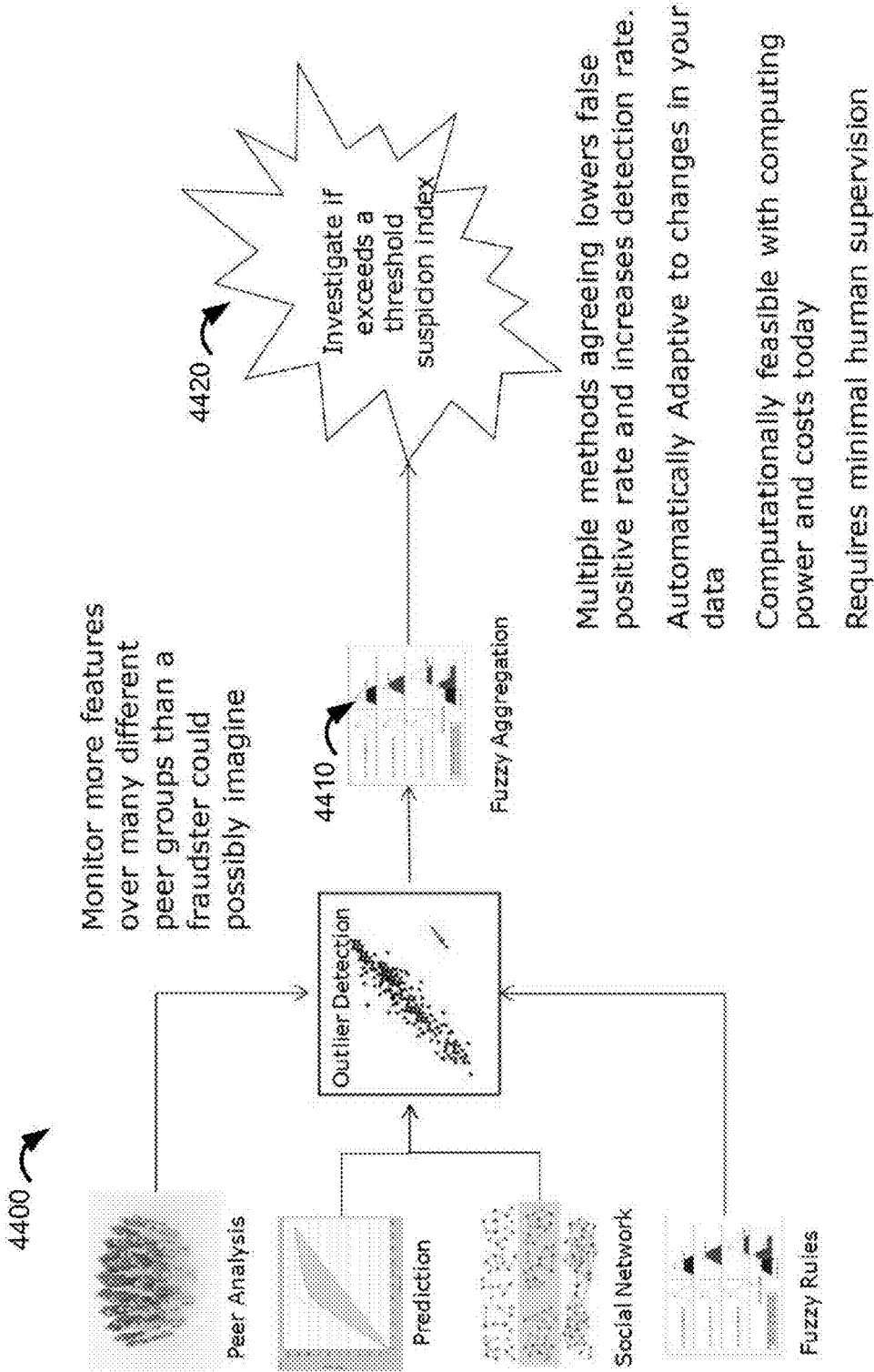
FIG. 42 shows another process flow diagram for monitoring candidate transactions according to one or more embodiments.

Referring next to FIG. 42, there is shown another process flow diagram 4400 for monitoring candidate transactions according to one or more embodiments. The process flow may use the output of the pattern detection techniques (such as those from FIG. 41) by combining their outputs using fuzzy aggregation function 4410 to generate a single measure referred to as the suspicion index. At 4420, a function is described that identifies when alerts should be generated, and when further investigation is required if the suspicion index (or gamified output) exceeds a threshold.

Referring next to FIG. 43, there is shown a table diagram 4500 of an example data set configured for determining a selected control policy according to one or more embodiments. One record in this data set may be related one to one to each claim or transaction or underwriting fact. Decision trees may be used to build rules for each type of historically identified fraud where each type of fraud may be represented in a separate data set of the same format example data set 4500 (with fraud metrics 4504). The accuracy of the rules may be determined by measuring the difference between the predicted fraud metric referenced by 4506 and the actual fraud metric 4504. The features 4508 to 4512 may represent elements of the fraud detection model used in Equation (1) and may form antecedents of the decision rules. The method of building decision trees is known in the art, and this method may be executed by control server 210 of FIG. 2 and the computation server farm 220 of FIG. 2. Each of the determined rules may be defined probabilistically by control server 210 of FIG. 2 and may be executed on the computational server farm 220 of FIG. 2. The execution of the rules may proceed by assigning a score for each antecedent that is met based either on the absolute correlation of the antecedent to the fraud metric of data set 4500 or based on fraction attainment of a numeric threshold. In this manner, the rules may generate a continuous score based on the number of antecedents that a claim or transaction or underwriting fact meets. These may be referred to as "fuzzy rules" where a rule output may be any value greater than or equal to zero. An example of a probabilistic rule may be as follows: IF Procedure Code LIKE '42%' AND WITHIN 1 YEAR OF SERVICE AND COUNT >8 AND SAME PATIENT Procedure Code LIKE '42%' AND WITHIN 1 YEAR OF SERVICE=0.7
COUNT 6-8=+0.25
COUNT 9=0.3
COUNT 10-15=0.5
COUNT=1

In this example rule, antecedent values may be scored based on correlation to rule outcomes. In this example, for fraud detection, an alert may not be generated based on a hard threshold, but instead each transaction or claim may have rules applied and the resulting outcomes ranked.

Referring next to FIG. 43, the data set 4500 may be used to determine predictive models using features 4508, 4510 to 4512 to predict actual fraud metrics referenced by 4504. The same data set format may be used to develop predictive models for each fraud type. The predictive modeling method may be one as known in the art, and this method may be configured by control server 210 of FIG. 2 and executed on the computation server farm 220 of FIG. 2.

Figure 20:
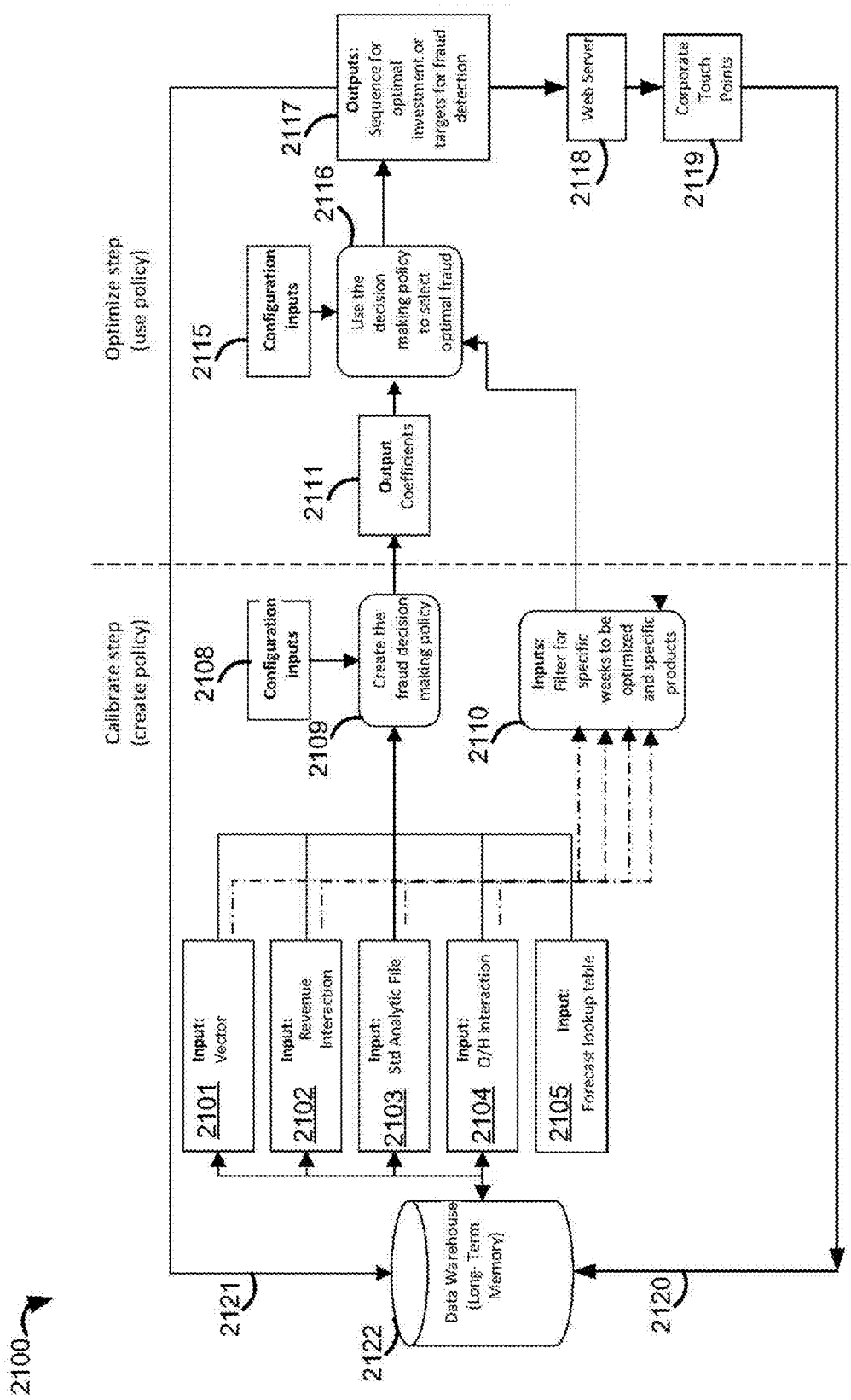
FIG. 20 shows a process flow diagram for an intelligent agent in accordance with one or more embodiments.

Reference is next made to FIG. 20, which shows a process flow diagram 2100 for an intelligent agent in accordance with one or more embodiments. As shown, the control process 2100 may be executed by the intelligent agent as described above and comprises generating a model or simulated model of the corporation or corporate adjudication environment used as a transaction monitoring or fraud detection or underwriting decision policy as indicated by reference 2109. The transaction monitoring or fraud detection or underwriting decision policy function 2109 may receive a vector input 2101, a revenue interaction input 2102, an analytic file input 2103, an overhead interaction 2105 and a configuration data input 2108, generated for example as described above. For instance, the control server may configure the data input 2103 to execute steps 606 and 608 (FIG. 6) to determine the coefficients for Equation (1) with the constraints of Equation (2) as described above. The transaction monitoring or fraud detection or underwriting decision policy function 2109 may also receive as an input an analytics file, as shown in FIG. 39. The transaction monitoring or fraud detection or underwriting state model function 2109 may be executed, including for example, executing Equation (1) as described above, and generates a decision making policy for transaction monitoring or fraud detection or underwriting also described above and indicated by reference 2111. At 2116, a function is executed to use the decision making policy based on constraints/configuration data 2115, for example, the control server solves Equation (1) using a genetic algorithm to determine the solution vector $Fr(t)_j$ as described above for steps 612 and 614 in FIG. 6. The vector input 2101, a revenue interaction input 2102, a standard analytic file input 2103, and an overhead interaction 2104 may be filtered by function 2110 for the specific weeks and products whose transaction monitoring or fraud detection or underwriting targets are being simulated. The output 2117 generated by the decision making policy function 2116 may comprise a sequence of selected investment or targets for weekly/periodic transaction monitoring or fraud detection or underwriting (or alternatively, may be provided in near real time), and may be stored in data warehouse 2122, for example to the long term memory 504 in FIG. 5.

As described above, the selected investments or targets for weekly/periodic transaction monitoring (including near real-time monitoring) or fraud detection or underwriting plan 2117 comprises 614 and 616 (FIG. 6) which generates or provides an output such as an alert to the web server 214 (FIG. 2) for the corporate or client infrastructure 250 (FIG. 2). The selected actions plan 2117 is accessible by a client system via a web server 2118. The results of executing and/or applying the selected action plan by the corporation may be applied to a corporate touch points function 2119 which is configured to generate input(s) for a feedback loop 2120 as described above.

Figure 21:
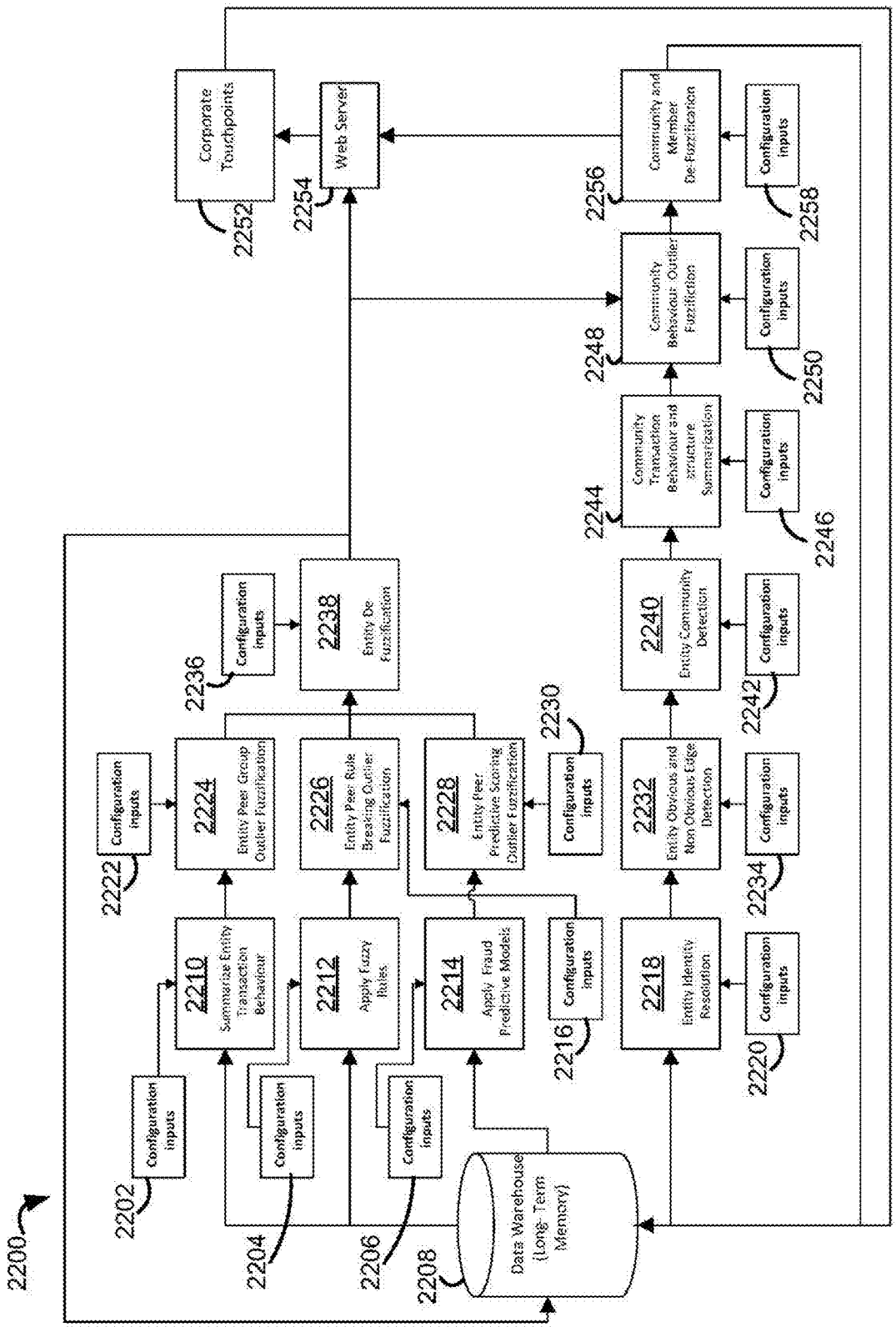
FIG. 21 shows another fraud identification process flow for the intelligent agent in accordance with one or more embodiments.

Reference is next made to FIG. 21, which shows another fraud identification process flow 2200 for the intelligent agent in accordance with one or more embodiments. The process flow 2200 shows in more detail the process or control flow for the intelligent agent 500 (FIG. 5) specifically for process steps 614 (FIG. 6) according to an embodiment of the present invention. Executing the transaction monitoring or fraud detection or underwriting plan $Fr(t)_j$ from Equation (1) may begin with process steps 2210 summarizing entity transaction behavior, 2212 applying Fuzzy rules, and 2214 applying predictive models where each process step may use transaction or claim or underwriting data input to the intelligent agent 510 of FIG. 5, processed through long term memory 514 of FIG. 5, and extracted from the data warehouse 2208. The control server 210 of FIG. 2 may use the configuration input files 2202, 2204 and 2206 to configure and execute the process steps 2210, 2212 and 2214 on the computation server farm 220 of FIG. 2. The output of process step 2210 may be an analytic file summarized to the entity level 3606 of FIG. 34 with columns per reference 4108, 4110, 4112 of FIG. 39, 2212 may be a set of rule scores per transaction or claim or underwriting record and 2214 may be predictive modeling floating point scores per transaction or claim or underwriting record as known. The outputs scores are aggregated to the entity level 3606 of FIG. 34 and may be used by functions 2224 Entity Peer group outlier fuzzification, 2226 Entity Peer Rule Breaking Outlier Fuzzification and 2228 Entity Peer Predictive Scoring Outlier Fuzzification using configuration inputs 2222, and 2230 configured by the control server 210 of FIG. 2 and executed on the computational farm 220 of FIG. 2.

By reference to FIGS. 27A, 27B, 27C and 27D, the fuzzification process steps 2224, 2226 and 2228 may use fuzzy membership curves of type growth 2800, Decline 2820, Bell 2840 and Inverted bell 2860 to translate a specific metric value belonging to an entity to a membership score between 0 and 1 where 0 indicates not suspicious/not risky and 1 indicates very suspicious/risky. The curves may be an implementation of fuzzy linguistic rules, for example as follows:

If a specific entity has an attribute value which is very different than all of its peer entities then it is very suspicious.
If a specific entity has an attribute value which is somewhat different than all of its peer entities then it is moderately suspicious.
If a specific entity has an attribute value which is a little different than all of its peer entities then it is a little suspicious.
If a specific entity has an attribute value which is not different than all of its peer entities then it is not suspicious.

These fuzzy linguistic rules may be used to determine where the membership/suspicion/risk score is the consequent of the rule. The specific membership curves of FIGS. 27A, 27B, 27C and 27D may be mathematical functions defined by three values: left, mid and right which are constructed from linear combinations of the modes of the statistical histogram such as min, mean, mode, max, standard deviation etc. As such the curves may automatically adjust themselves as new data is captured as input 510 of FIG. 5.

Figure 28:
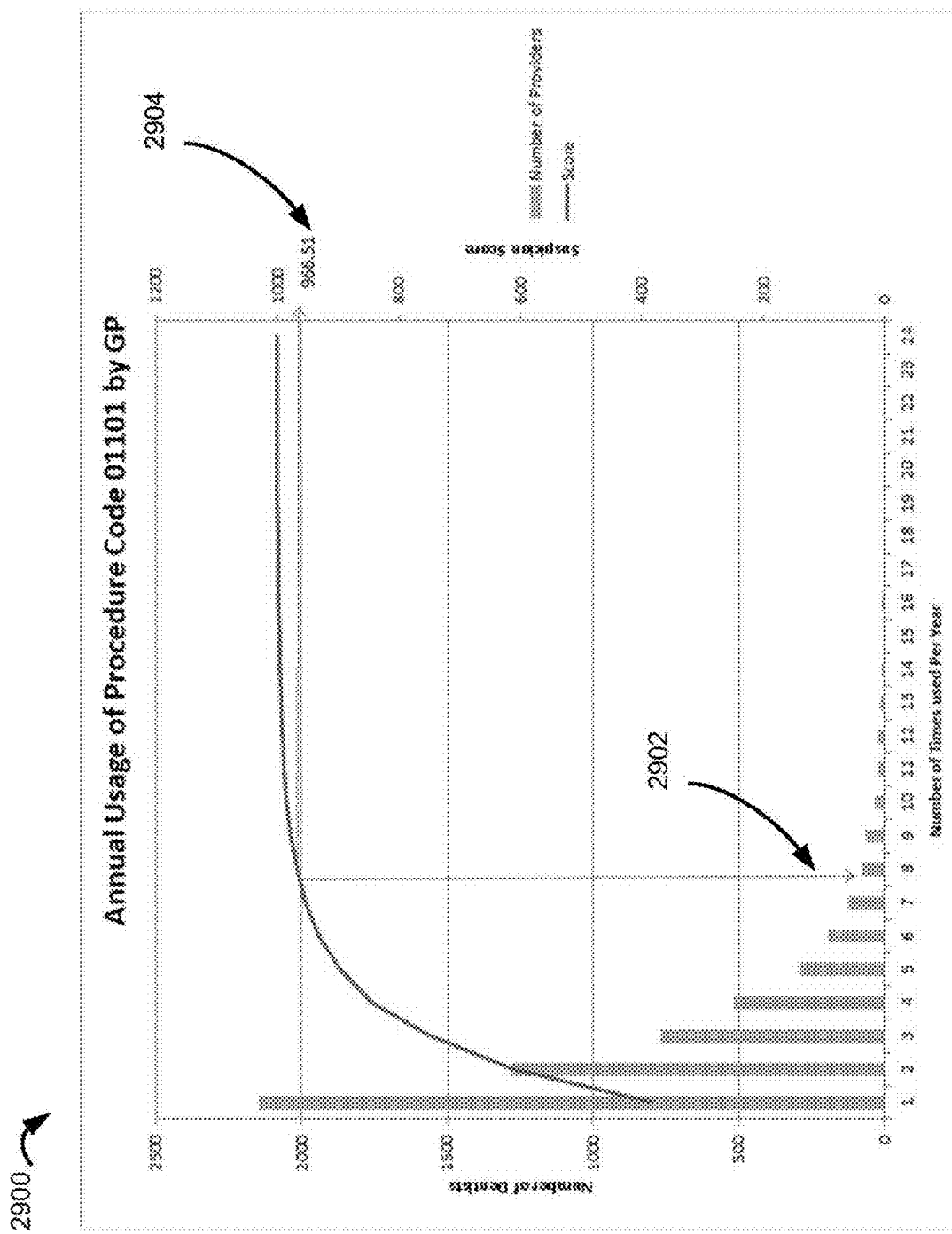
FIG. 28 shows a percentile based fuzzy logic membership curve diagram used in the intelligent agent in accordance with one or more embodiments.

FIG. 28 shows a percentile based fuzzy logic membership curve diagram 2900 used in the intelligent agent in accordance with one or more embodiments. The curve diagram 2900 may provide an example of how a metric value 2902 may be mapped to a growth curve to produce a fuzzy output by reference to 2904.

Referring back to FIG. 21, the function 2238 Entity De-fuzzification may use the fuzzified output from 2224, 2226 and 2228 (with all output values mapped to a common membership probability [0,1]) along with configuration input 2236 to de-fuzzify and combine all entity fuzzy values and return crisp suspicion or risk indicators used by reference 4420 of FIG. 42.

De-fuzzification rules may include, for example:
If an entity has a few metrics with (little, moderate, high) suspicion then do not investigate
If an entity has many metrics with little suspicion, then investigate
If an entity has some metrics with moderate suspicion, then investigate
If an entity has a few metrics with high suspicion, then investigate.

The linguistic terms "a few", "many", "some", "little", "moderate", "high", may be mathematically characterized.

Figure 29A:
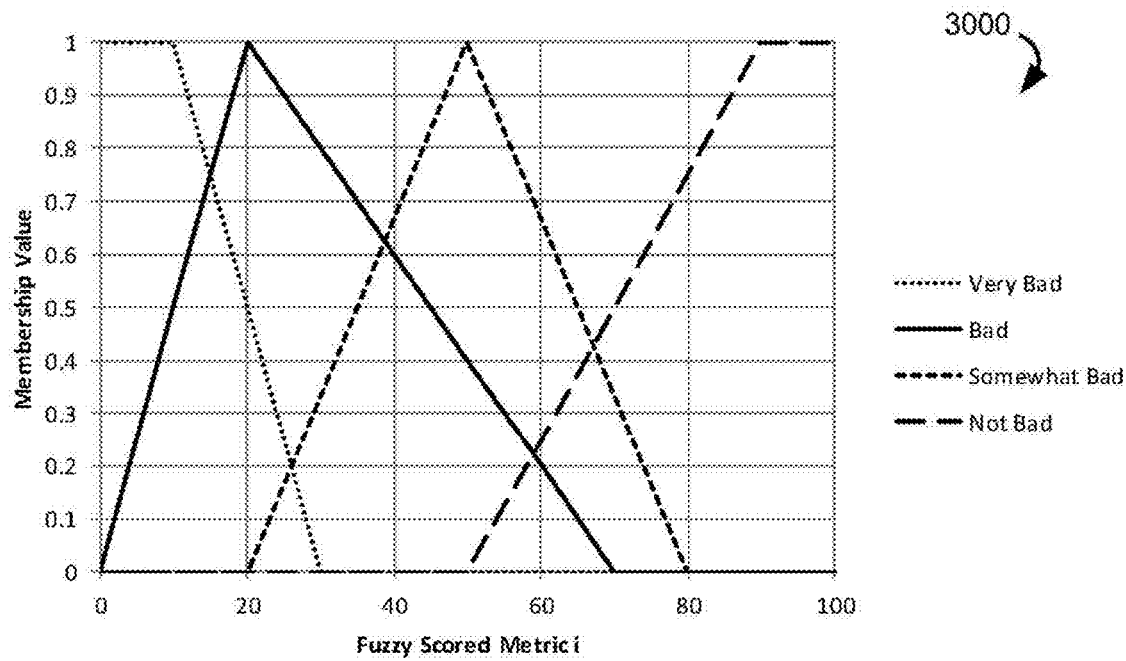
FIG. 29A shows a linguistic fuzzy membership curve diagram for scoring used in the intelligent agent in accordance with one or more embodiments.
Figure 29B:
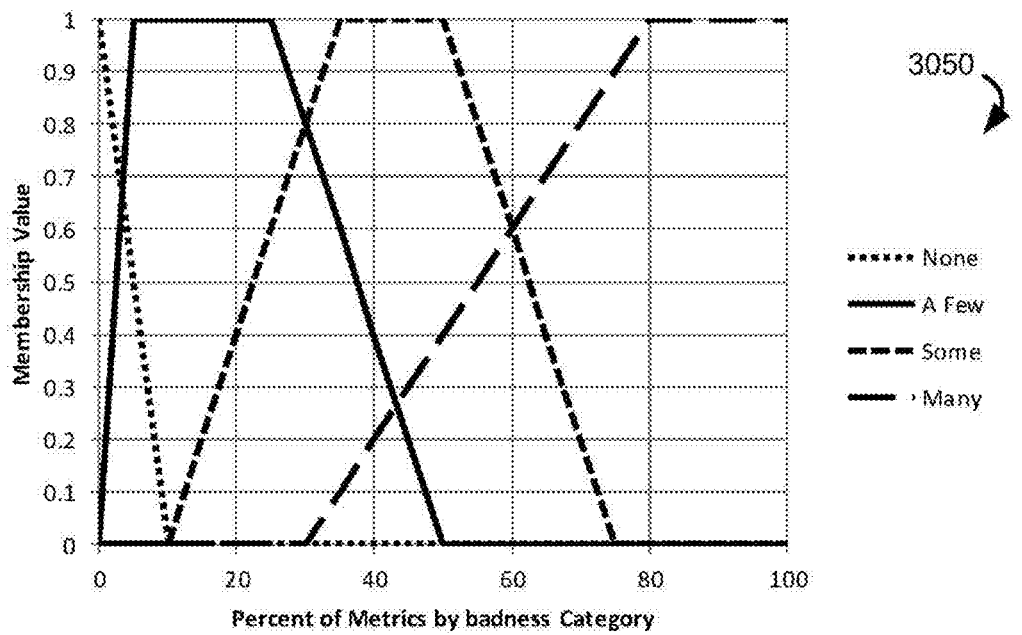
FIG. 29B shows another linguistic fuzzy membership curve diagram for counting used in the intelligent agent in accordance with one or more embodiments.
Figure 30:
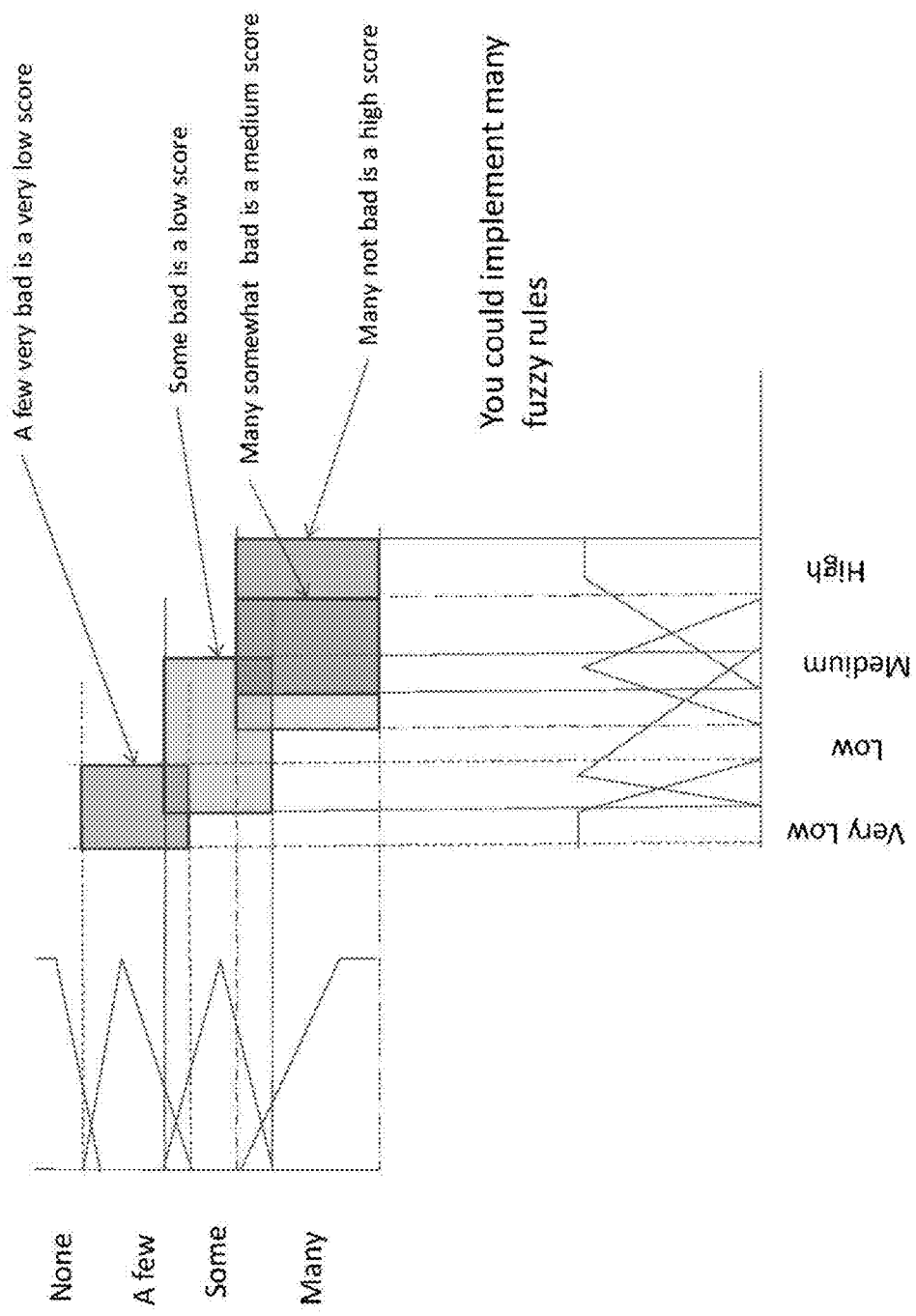
FIG. 30 shows an example of how linguistic scoring and counting membership functions together with a set of fuzzy logic rules applied in the intelligent agent in accordance with one or more embodiments.

Referring next to FIGS. 29A and 29B together, there is shown a linguistic fuzzy membership curve diagram 3000 for scoring used in the intelligent agent in accordance with one or more embodiments, and another linguistic fuzzy membership curve diagram 3050 for counting used in the intelligent agent in accordance with one or more embodiments.

Linguistic membership curves in curve diagram 3000 may be used to map the membership values for the degree of suspicion of each entity metric to the membership of fuzzy suspicion/risk.

Figure 33:
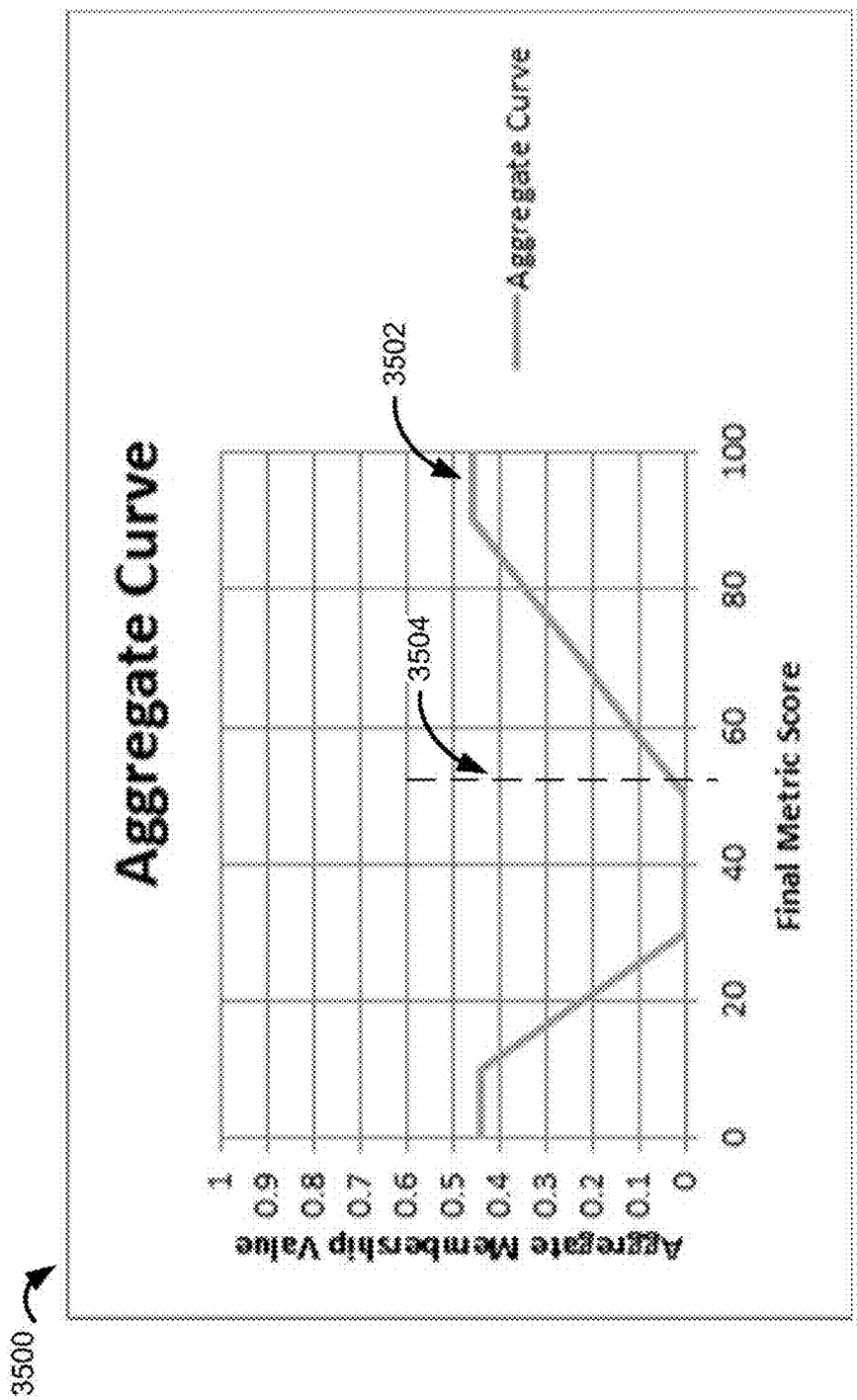
FIG. 33 shows an aggregate curve in accordance with one or more embodiments.

Linguistic membership curves in curve diagram 3050 may be used to map the crisp percentage of values within each linguistic suspicion membership to the membership of fuzzy counts. The de-fuzzification rules above may be implemented as in FIG. 29 where the linguistic rules of FIGS. 29A and 29B are linearly combined to form a range of applicability of each rule. This may result in a matrix of fuzzy rule output by reference to 3200 of FIG. 31 which may be used to construct the fuzzy rules when multiplying the table of values by the second stage linguistic curves of FIG. 29B by results of aggregate curve 3500 (see FIG. 33). The final step of de-fuzzification (reducing all fuzzified values to a crisp output) applies one of several methods to the aggregate curve 3500 of FIG. 33 where a maximum height 3502 of the area represents the weighted average of the areas, and where an area centroid 3504 represents the centroid of the area. De-fuzzification may be performed using any of the methods known in the art including (but not limited to) adaptive integration, basic defuzzification distributions, bisector of area, constraint decision defuzzification, center of area, center of gravity, extended center of area, extended quality method, fuzzy clustering defuzzification, fuzzy mean, first of maximum, generalized level set defuzzification, indexed center of gravity, influence value, last of maximum, mean of maxima, middle of maximum, quality method, random choice of maximum, semi-linear defuzzification, weighted fuzzy mean, or another defuzzification method as known in the art. The crisp output may be calculated for each entity level 3606 of FIG. 34. This output may be delivered to the web server 2254.

At 2218, entity obvious and non-obvious edge detection may be applied to entity level 3602 of FIG. 34 using its attributes 3604 and configuration inputs 2220. Edges may be links between different entities, non-obvious edges may be links like addresses, phone numbers, names, bank accounts etc. that are the same/similar between entities that should not share those common attributes. Obvious edges may be shared attributes between entities that should be the same.

Transactions between entities may be obvious edges. Edge detection may be done using industry standard matching techniques familiar to those in the art. Using edge detection output from 2218 and configuration inputs 2234, the next function 2232 entity identity resolution may identify the unique entities, and may eliminate all duplicates caused for suspicious or non-suspicious reasons. Suspicious duplicate entities may be identified. Entity resolution may be done using industry standard methods to one familiar in the art. The edges from function 2218 and resolved entities from 2232 as well as configuration inputs 2242 may be used to detect communities of linked entities 2240. The communities output from 2240 and configuration inputs 2242 may be used to summarize the entity structure of the community as well as aggregate summarized entity behaviour from function 2210 to the community level. The structure and behavior may be represented as columns 4108, 4110 to 4112 of FIG. 39 where each row in the data set may represent a community. The community metrics may be fuzzified using function 2248 with configuration input 2250 and entity de-fuzzified risk/suspicion output 2238 and de-fuzzified using function 2256 and configuration input 2258 as described herein, and may apply de-fuzzification to networks instead of entities with the crisp output of the function 2256 being delivered to the web server 2254.

The output from both entity level 3606 and communities level 3602 (see FIG. 34) may be delivered via the web server 2254 to customer touchpoints 2252, which may be touchpoints 250 of FIG. 2. The output from 2238 and 2256 may also be saved to the long-term memory 514 (see FIG. 4), data warehouse server 212 (see FIG. 2), and/or data warehouse 2208. The client operational action may be taken based on user input provided from a user based on output at 2252, and the operational action may be provided as to the intelligent agent data input 510 of FIG. 5 and stored in long term memory 514 of FIG. 5, data warehouse server 212 of FIG. 2, and/or data warehouse 2208.

Figure 22:
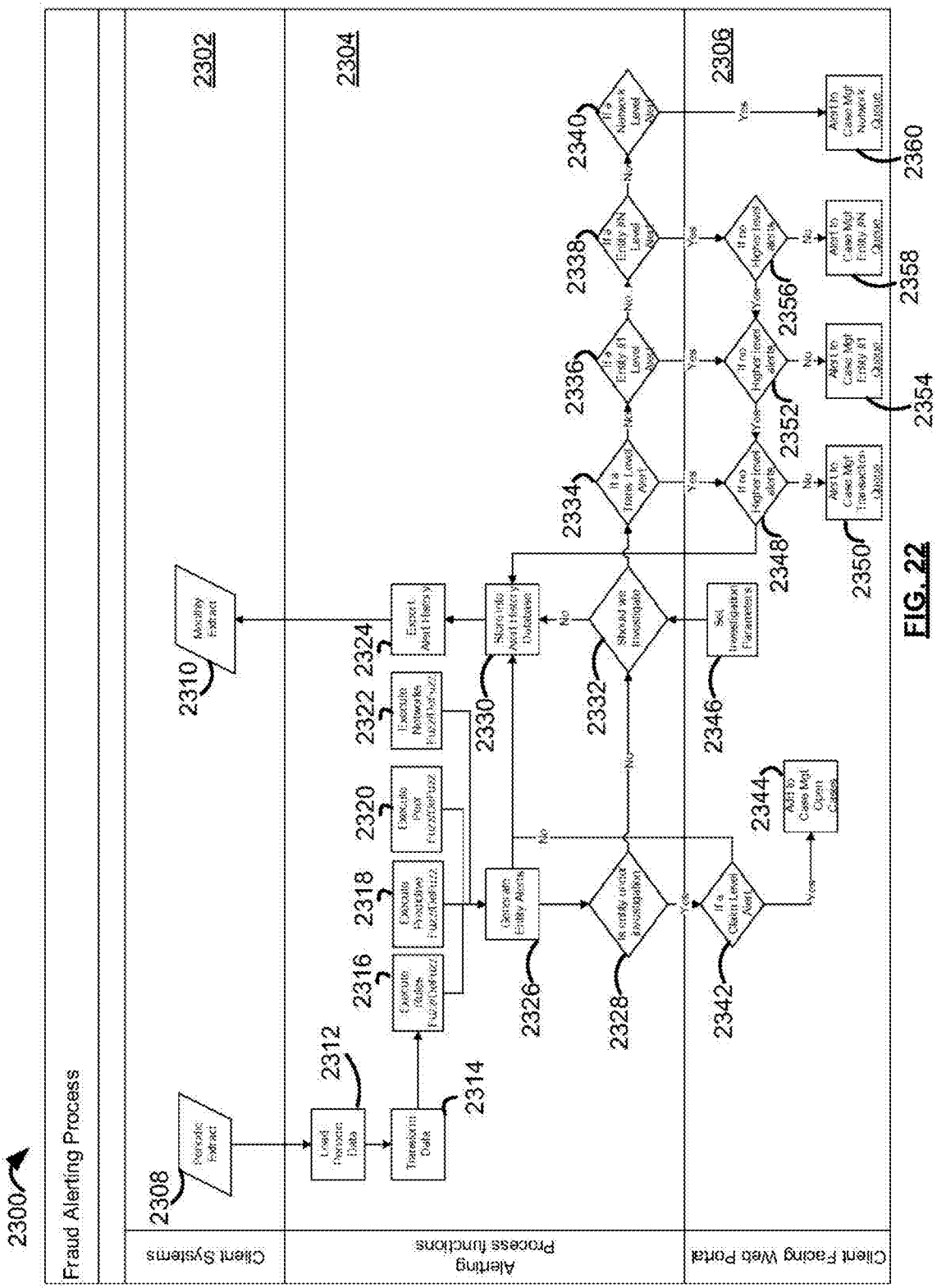
FIG. 22 shows a fraud identification and alerting process flow for the intelligent agent in accordance with one or more embodiments.
Figure 23:
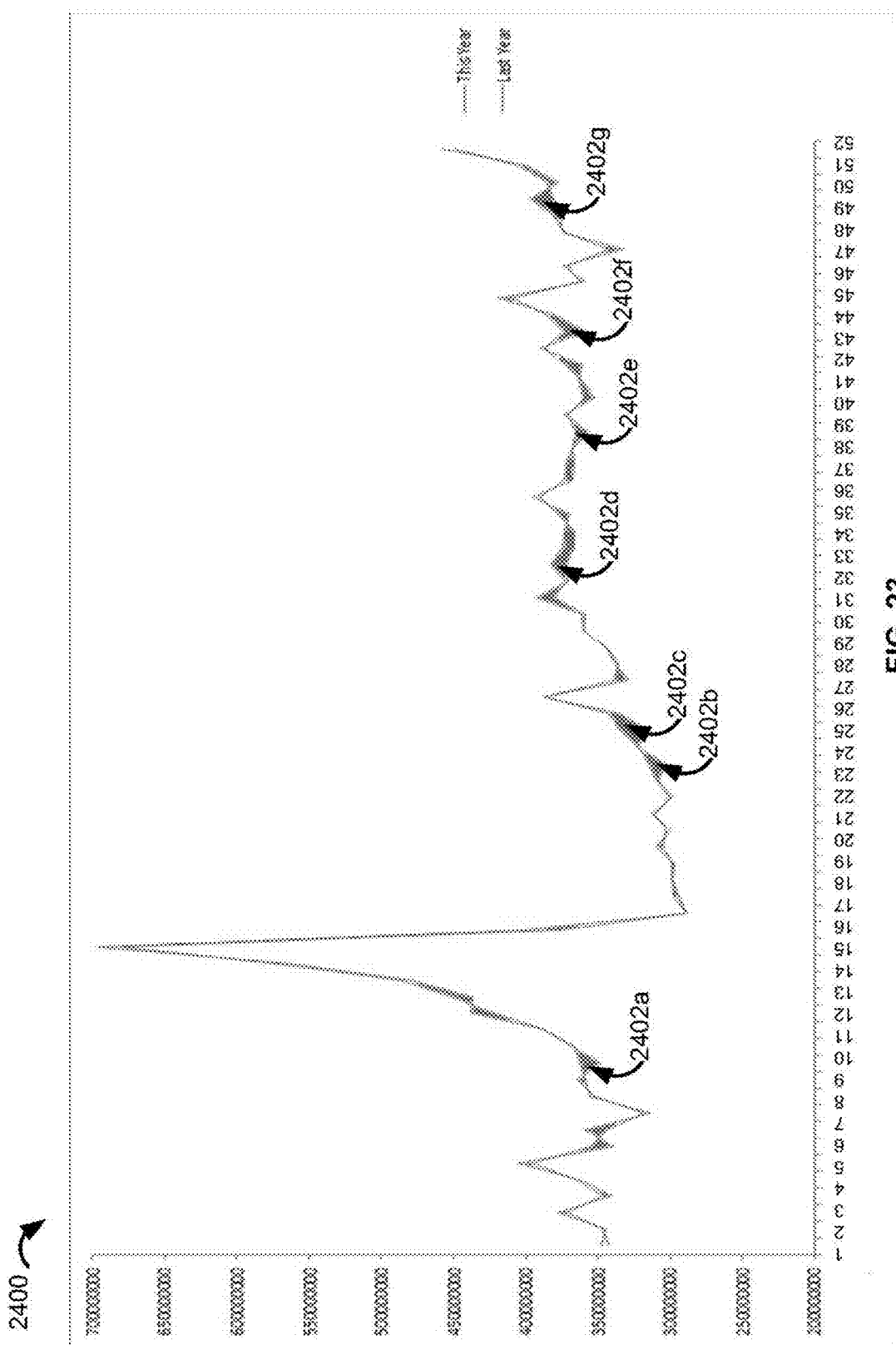
FIG. 23 shows a corporate time series diagram in accordance with one or more embodiments.

Referring next to FIG. 22, there is shown a fraud identification and alerting process flow 2300 for the intelligent agent in accordance with one or more embodiments. The process flow of FIG. 22 may provide scoring of historical and incoming periodic transactions/claims/underwriting facts (including near real time transactions/claims/underwriting facts) and associated entities that may be captured through the intelligent agent data inputs 510 (see e.g. FIG. 5).

New incoming transactions/claims/underwriting facts 2308 are processed by function 2312. The newly incoming transactions/claims/underwriting facts 2308 may be received periodically, including in near real-time, daily, weekly, biweekly, etc. At 2314, data correction 512 of FIG. 5, further processing may occur to the incoming data to correct anomalous input. The process flow 2200 of FIG. 21 may be represented by 2316, 2318, 2320, 2322.

Referring to FIG. 21 and FIG. 22 together, at 2316 the entity peer rule breaking outlier fuzzification 2226 and defuzzification 2238 may be received. At 2318, the entity peer predictive scoring outlier fuzzification 2228 and defuzzification 2238 may be received. At 2320, the entity peer group outlier fuzzification 2224 and defuzzification 2238 may be received. At 2322, the community/network fuzzification/defuzzification 2232, 2240, 2244, 2248, 2256 may be received.

Referring back to FIG. 22, the output of the entity scoring may be received at 2326, and the scoring of the current output may be compared with the scoring of past input in order to identify entities whose scoring has crossed a threshold in the recent period but not in the prior period. The scoring may include transaction scoring in the case of fraud detection. The scoring may include underwriting scoring in the case of a premium request. Transaction/claim/underwriting records may also be scored using fuzzy rules and predictive analytics at 2326, which may generate alerts for the transactions or insurance claims where the score exceeds a threshold. The alert history from 2326 may also be stored into the long term memory by function 2330. If the entity is already under investigation/adjudication 2328 and the alert is at the transaction/claim/underwriting level then the record may simply be added to the entity case being investigated/adjudicated. If the alert is for an entity already under investigation, it is simply stored into long term memory 2330. If the entity alerted from 2326 is not under investigation at 2328 then the alert may be passed to the investigation decision engine which uses configuration parameters 2346 which may be solutions $Fr(t)_j$ to Equation (1) subject to Equation (2) which may form the transaction monitoring or fraud detection or underwriting plan. If the alert passes the threshold for investigation 4420 of FIG. 42 then the alert may be filtered by type 2334 for transaction level alert, 2336 and 2338 for entity type alerts (1 to N) or 2340 for a network alert. Transaction and entity alerts may be processed to evaluate if there is a high transaction entity hierarchy FIG. 34 alert which already exists. If there is no existing higher level alert then the alert record may be passed to the appropriate case management queue 2350, 2354, 2358 and/or 2360 which may exist on the web server 214 of FIG. 2 and passed to corporate touchpoint 250 for client action. If a higher transaction entity hierarchy level alert exists, the alert may be passed to the next level for the same test ultimately to be saved to long term memory if existing related alerts are being processed.

In an embodiment where an underwriting is being performed, a candidate premium request may be made for a candidate.

Figure 35:
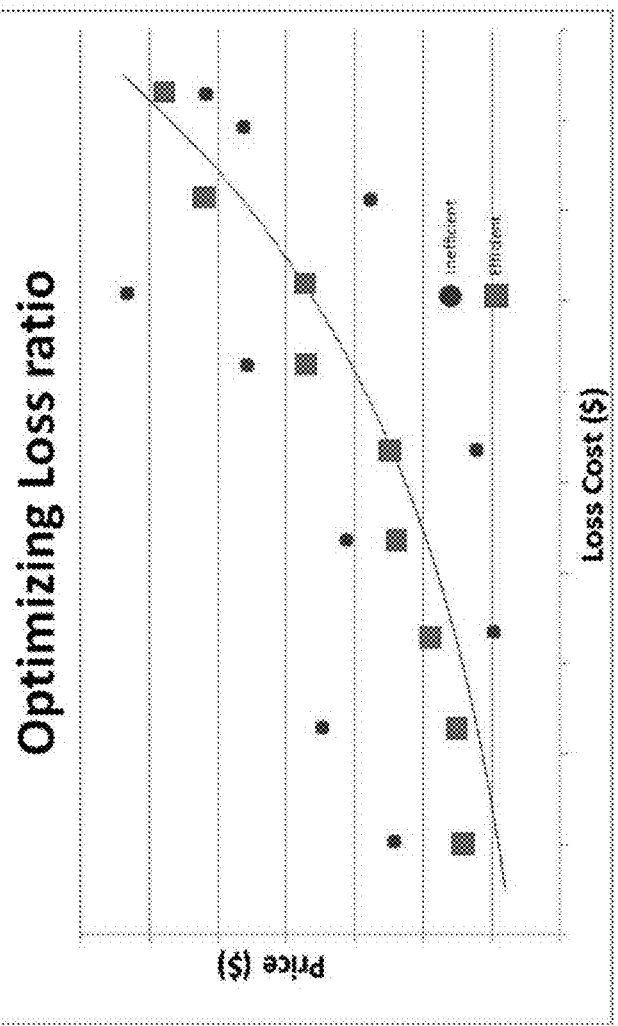
FIG. 35 shows an example graph diagram of risk rating revenue vs loss curve in accordance with one or more embodiments.

Referring to FIG. 35, there is shown an example graph diagram 3700 of risk rating revenue vs loss curve in accordance with one or more embodiments. The revenue/loss cost line may be indicated as a curve generally indicating a preferred premium pricing to fraud loss. It is desirable to have efficient premium selection for insured persons selected in order to cover the average risk of fraud loss based on such a policy.

Referring to FIGS. 21 and 22, the method for premium price determination may function generally the same as above in the case of the underwriting request where a candidate premium request is received.

At 2326, entity scoring may be received. Based on peer predictive scoring 2228 and 2238, peer group scoring 2224 and 2238, and rule scoring 2226 and 2238, a premium risk score may be determined for a candidate premium request.

In one embodiment, the response to the candidate premium request may require manual intervention by a human underwriter.

Figure 13:
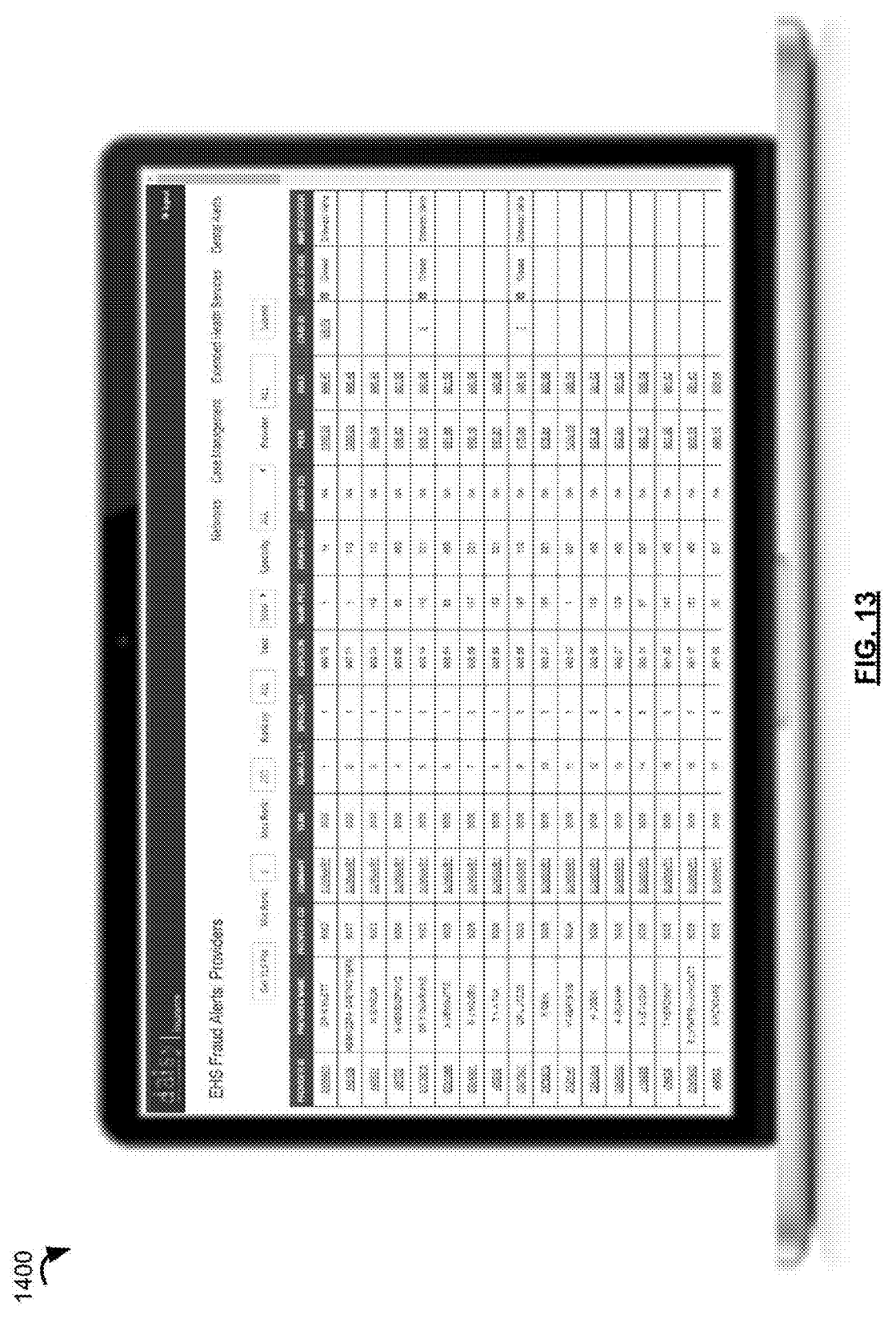

Reference is next made to FIG. 13, which shows a user interface diagram 1400 for the outlier transaction identification system in accordance with one or more embodiments. The user interface 1400 shows a screen shot of a web portal according to an embodiment of the present invention. The web portal 1400 may be configured to provide web-based, i.e. browser-based, access to the transaction monitoring, fraud alerts, fraud detection, and/or underwriting plan generated for the corporation as described herein.

In one embodiment, the web portal 1400 may be configured to generate and display periodic (real-time/intra-daily/ daily/weekly etc.) alerts based on the output transaction monitoring, fraud detection, and or underwriting plan for the corporation. The periodic alerts may include alerts generated in real time. The web page may be configured to provide a historical view of scored entities and transactions. The web page may be configured to provide a case management view showing recent and existing alerted transactions/claims/ underwriting facts.

Figure 14:
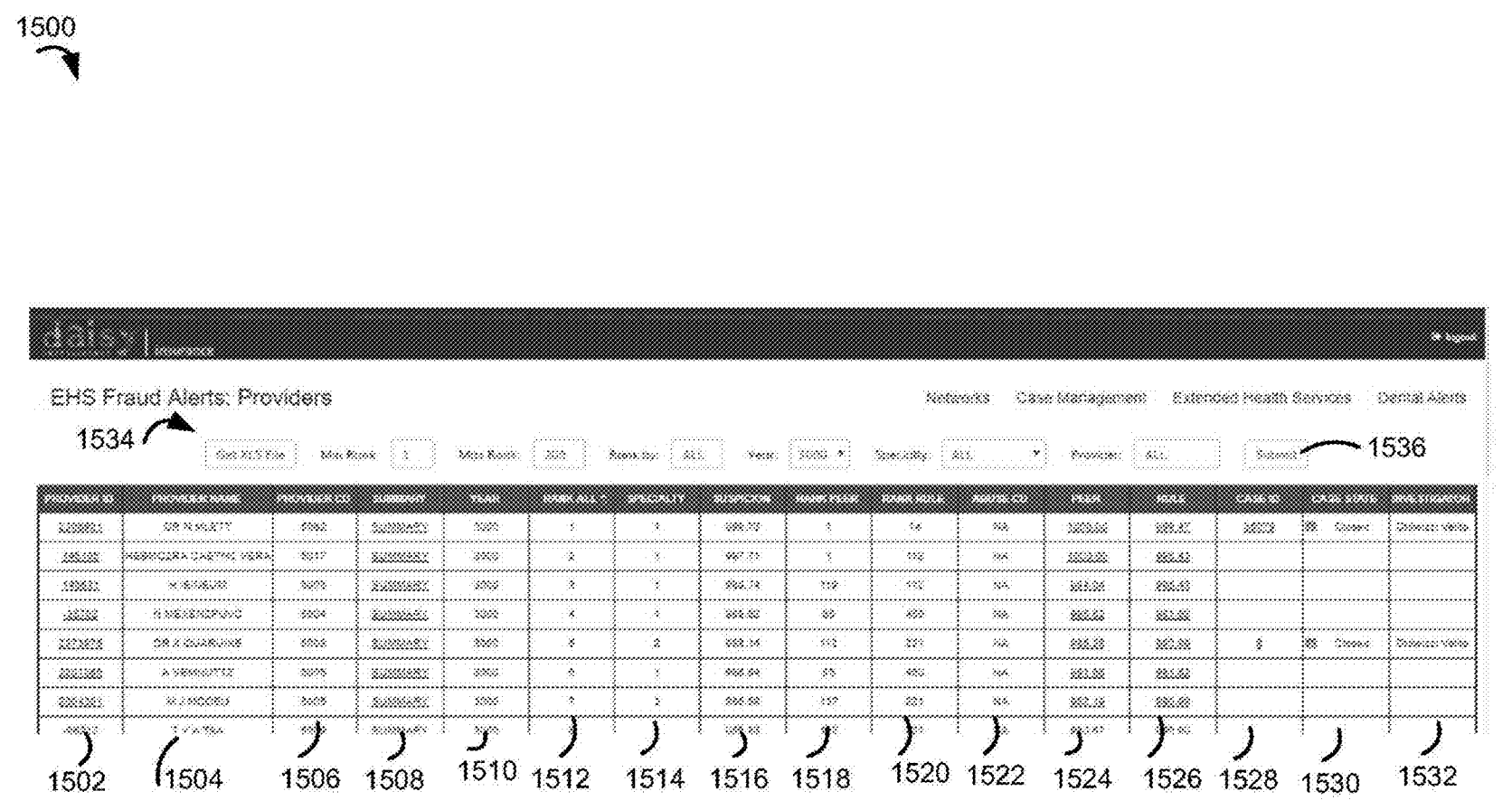

Referring next to FIG. 14, there is shown a user interface diagram 1500 for the outlier transaction identification system in accordance with one or more embodiments. The user interface 1500 may show a plurality of columns, including a provider identifier 1502, a provider name 1504, a provider code 1506, a summary 1508, a year 1510, a global rank 1512, a specialty 1514, a suspicion index 1516, a peer rank 1518, a rule rank 1520, an abuse code 1522, a peer 1524, a rule 1526, a case identifier 1528, a case state 1530, and a case investigator 1532.

The peer 1524 may refer to a detected peer group, community group, as disclosed herein in FIG. 34. The other data, including rule 1526, suspicion index 1516, global rank 1512, peer rank 1518, rule rank 1520 may refer to the determined fraud scores using the peer identification, fuzzification, and outlier detection as described herein.

The listing of detected fraud events may be displayed in diagram 1500. The fraud events in 1500 may also correspond to fraud alerts sent separately to the corporate organization. A user of the user interface 1500 may click on a fraud event to see further detail about the fraud event. A user of the user interface 1500 may filter the fraud events by selecting a filter selection 1534 and selecting submit 1536. The user of interface 1500 may manage and review fraud alerts.

Figure 15:
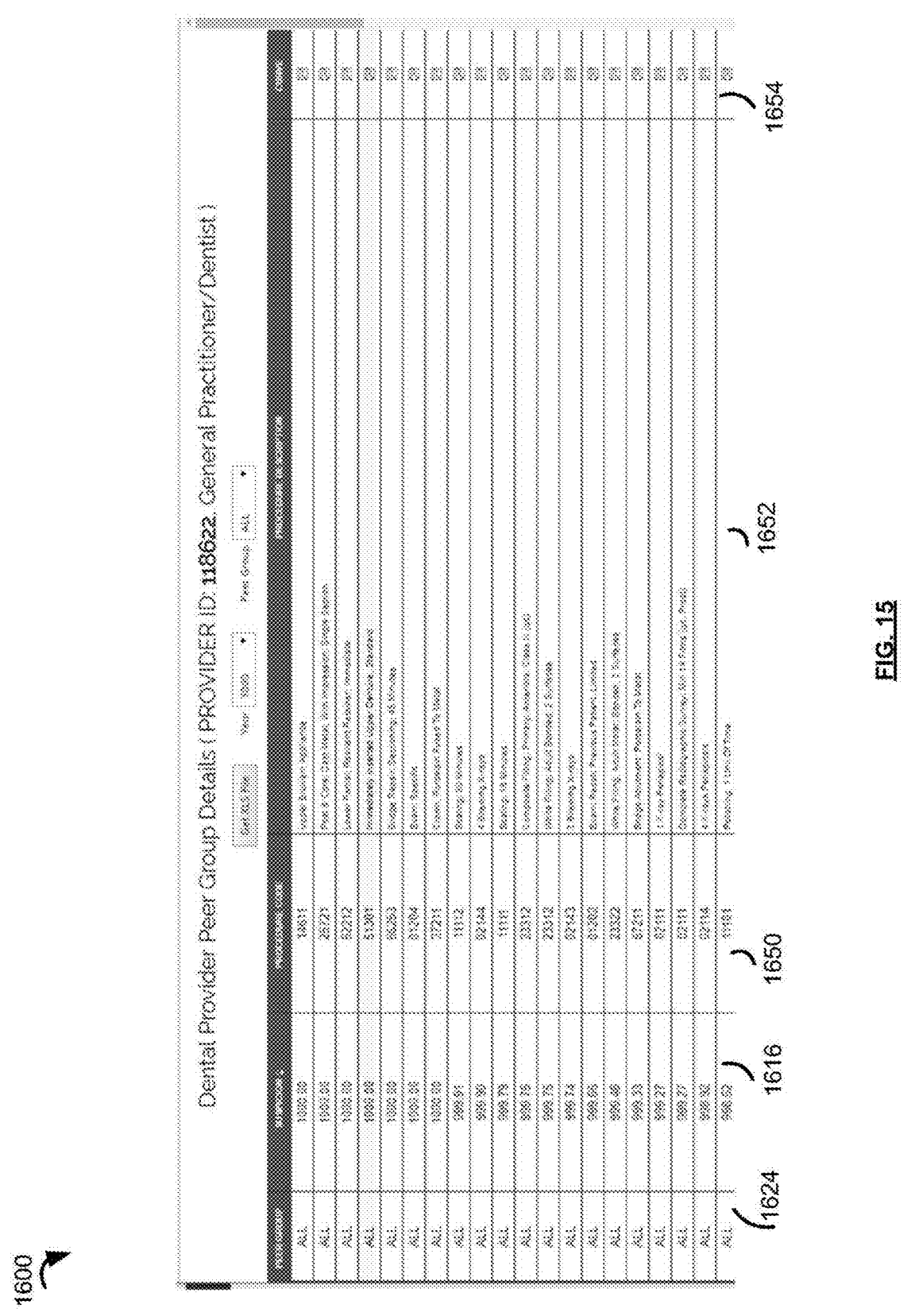

Referring next to FIG. 15, there is shown another user interface diagram 1600 for the outlier transaction identification system in accordance with one or more embodiments. The user interface 1600 may show detected fraud events for a determined peer group. The columns in the user interface 1600 may include peer group 1624, suspicion index 1616, procedure code 1650, procedure description 1652, and curve 1654.

The curve 1654 may describe the fuzzified curve. The user at interface 1600 may use the interface to review and manage detected fraud alarms for a dental clinic.

Figure 16:
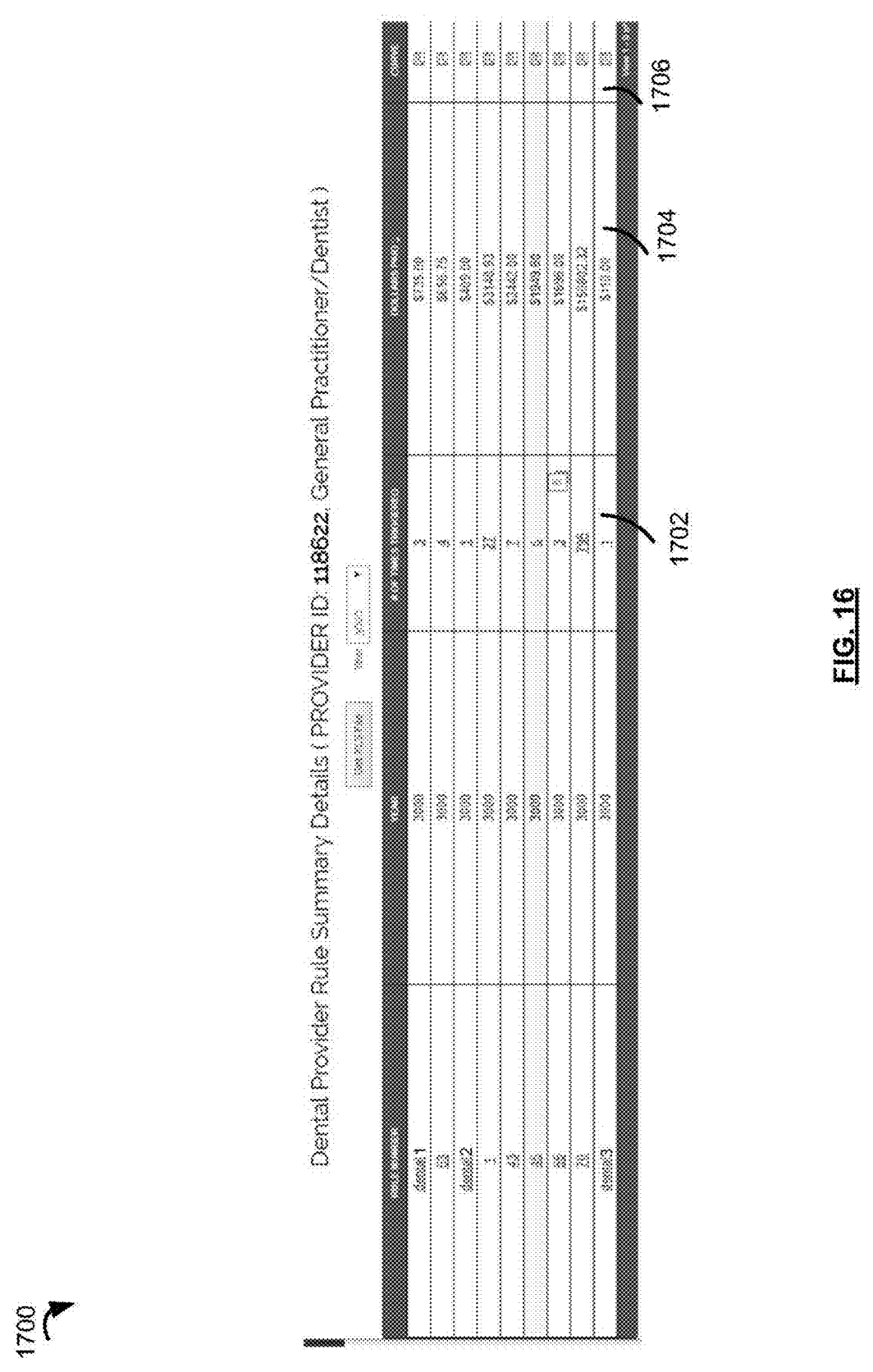

Referring next to FIG. 16, there is shown another user interface diagram 1700 for the outlier transaction identification system in accordance with one or more embodiments. The user interface 1700 shows a plurality of rules created in order to detect fraud events, fraud transactions, and fraud alerts. The user interface 1700 may allow a user to review the rules that have been created, and see the number of times the rules have been triggered 1702, along with the value of transactions 1704 for which the rules have been triggered, and the curve 1706.

Referring next to FIG. 17, there is shown another user interface diagram 1800 for the outlier transaction identification system in accordance with one or more embodiments. The user interface 1800 shows the predicted fraud events for each provider, including fraud alerts. Herein, fraud alerts may also be referred to as outlier alerts. The providers may each be listed including provider identification, provider code, region code, the average fraud prediction of events, and a count of the number of fraud events or alerts associated with the provider.

Figure 18:
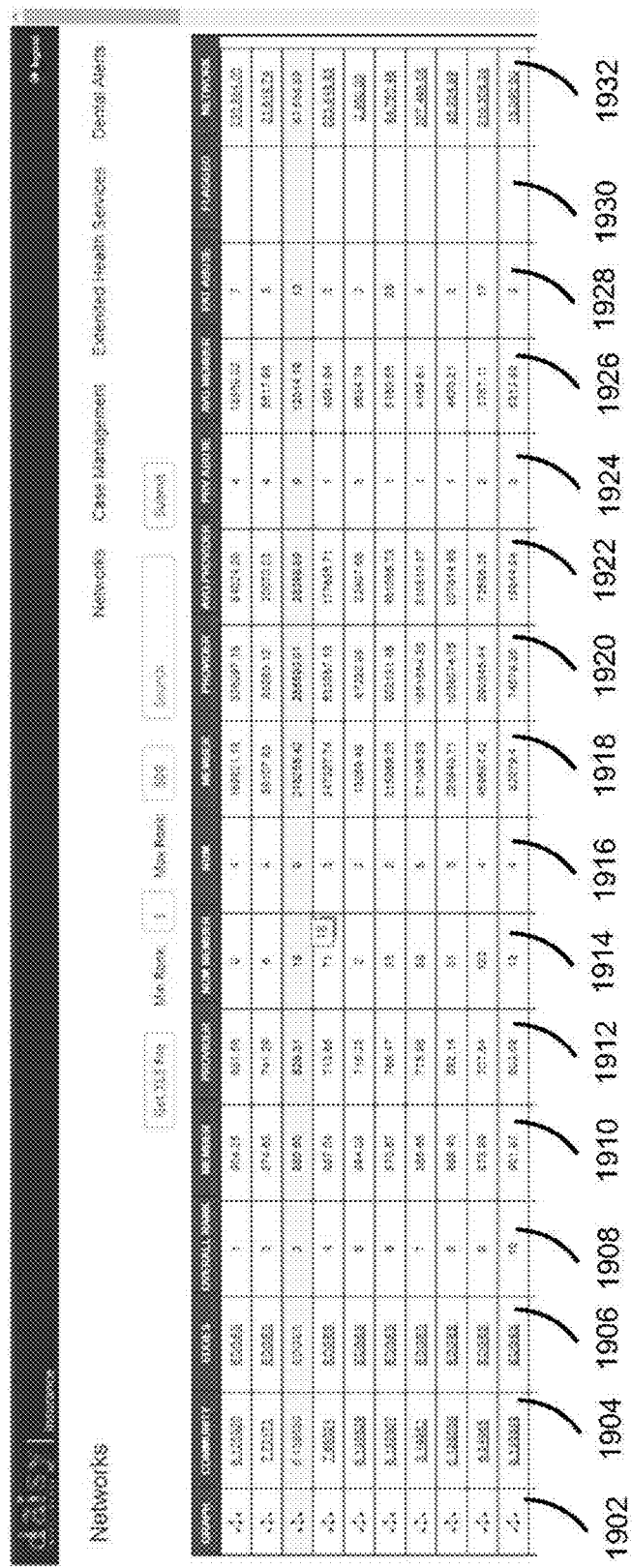
FIG. 18 shows another user interface diagram for the outlier transaction identification system in accordance with one or more embodiments.

Referring next to FIG. 18, there is shown another user interface diagram 1900 for the outlier transaction identification system in accordance with one or more embodiments.

The user interface 1900 may show a listing of networks (or communities) that have been detected, including entities. These networks may be determined using, for example, the method of FIG. 21. The networks (or communities) may identify groupings of potentially fraudulent providers, users, clients, transactions, claims that may be detected using the methods described herein.

The columns of user interface 1900 may include a link to an identified graph 1902, a community identifier 1904, a link showing the edges of the graph 1906, a global rank 1908, a member identifier 1910, a provider identifier 1912, a number of members 1914, a number of entities 1916, an associated member fraud value 1918, an associated provider fraud value 1920, an average provider fraud value 1922, a previous abuse count 1924, an average member fraud value 1926, whether the network has been flagged for review 1930, and a network fraud value 1932.

Figure 19:
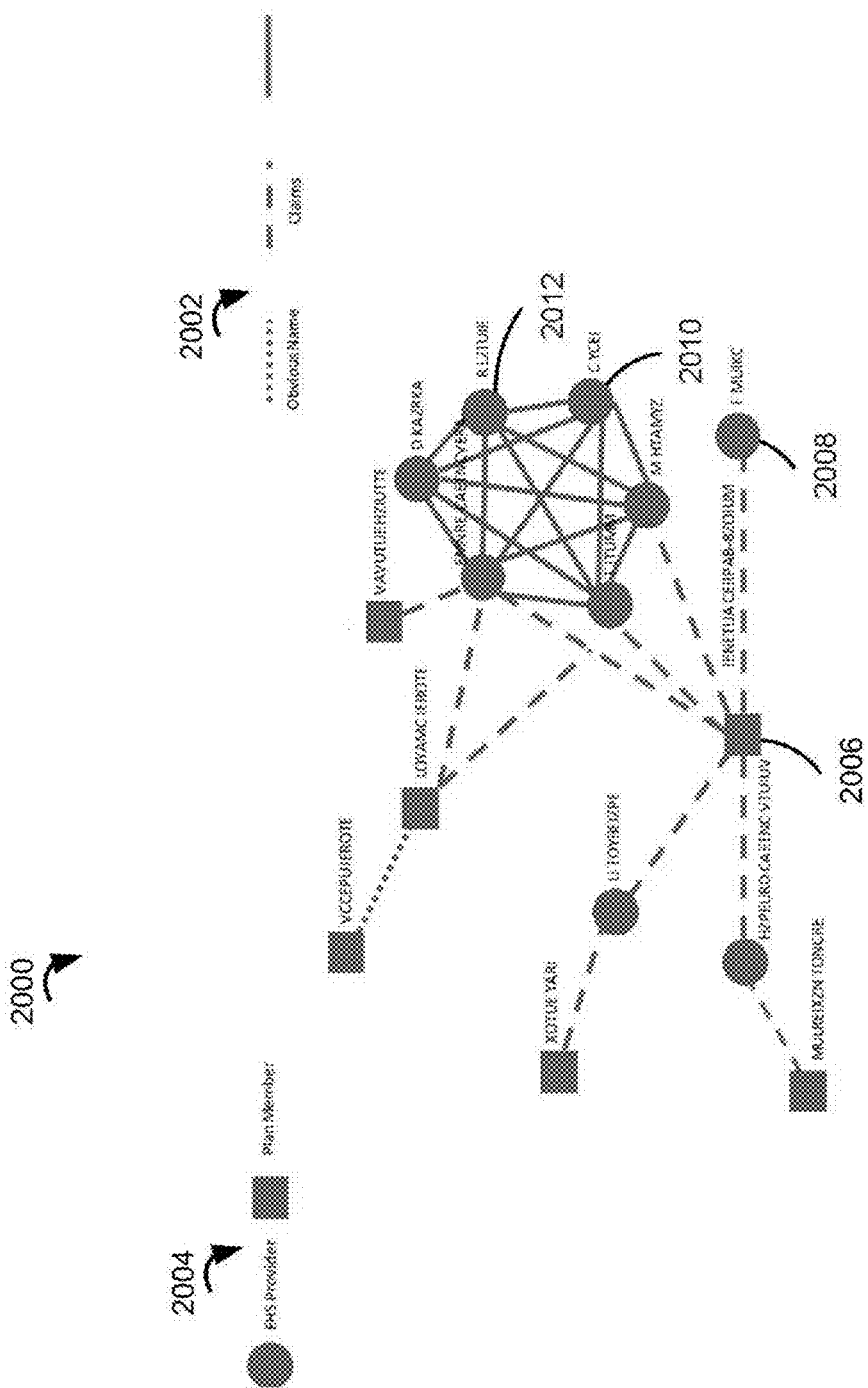
FIG. 19 shows a directed graph drawing of a community detection process in accordance with one or more embodiments.

Referring next to FIG. 19, there is shown a directed graph drawing 2000 of a community detection process in accordance with one or more embodiments. The fraud detection systems and methods herein may be used to generate a user interface identifying entities in a directed graph relationship. The entity relationships may be presented to a user as a community or network, as shown. For example, there may be a plurality of different entity types 2004, for example providers and plan members in the case of an insurance company. Further, the edges of the directed graph may have a plurality of different types 2002, including edges based on names, claims between plan members and providers, and edges based on banking information.

In the displayed graph diagram 2000, plan member 2006 may be connected to provider 2008. This may be, for example, because the plan member 2006 received services from provider 2008 and made a claim using an insurance policy for the services of provider 2008.

There may be a community or network within the diagram 2000 including provider 2010 and provider 2012. There may be a plurality of providers as shown including provider 2010 and provider 2012 that may be connected based on banking information.

The determined community in diagram 2000 may be determined in order to group together potentially fraudulent providers, transactions, claims, plan members.

The outlier detection as described herein may be used in order to determine fraudulent networks or communities.

The fuzzification and community detection described herein may be used in order to build the network or community, in order to determine the connections (both obvious and non-obvious) between the entities.

Figure 7:
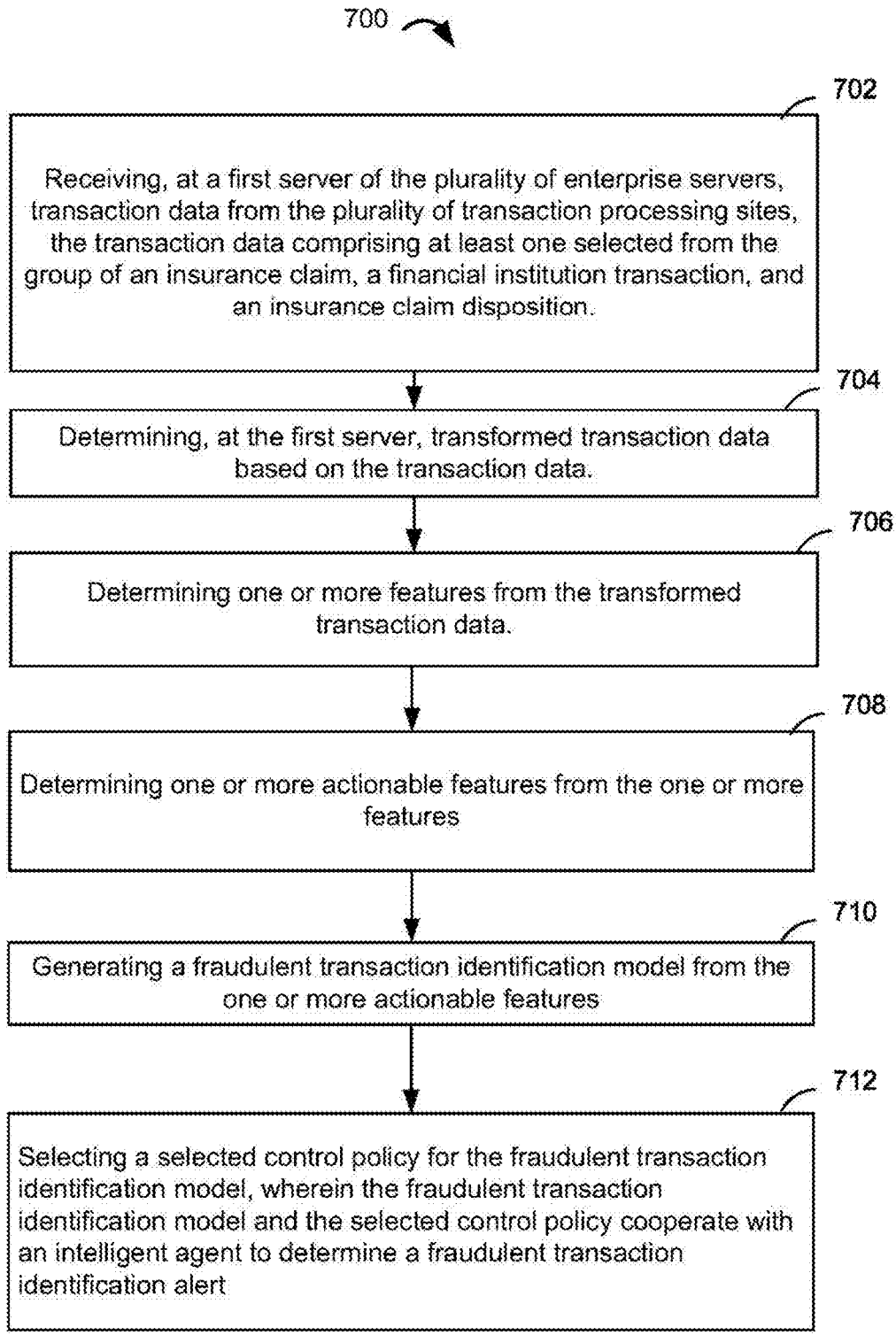
FIG. 7 shows another process flow diagram for generating an outlier transaction identification model and selected control policy for fraud identification in accordance with one or more embodiments.

Referring next to FIG. 7, there is shown another process flow diagram 700 for generating an outlier transaction identification model and selected control policy for fraud identification in accordance with one or more embodiments. The process flow diagram 700 may generally correspond to 602, 604, 606, 608 and 610 in FIG. 6, and may show further detail therein.

At 702, receiving, at a first server of the plurality of enterprise servers, transaction data from the plurality of transaction processing sites, the transaction data comprising at least one selected from the group of an insurance claim, a financial institution transaction, and an insurance claim disposition.

At 704, determining, at the first server, transformed transaction data based on the transaction data.

At 706, determining one or more features from the transformed transaction data.

At 708, determining one or more actionable features from the one or more features.

At 710, generating an outlier transaction identification model from the one or more actionable features.

At 712, selecting a selected control policy for the outlier transaction identification model, wherein the outlier transaction identification model and the selected control policy cooperate with an intelligent agent to determine an outlier transaction identification alert.

Optionally, the generating the outlier transaction identification model may further comprise:
   determining an interaction $I_{jk}^{Pr}$ comprising a j×k matrix, each element of the j×k matrix comprising a correlation between a revenue for product j and a fraud detection activity k based on the transformed transaction data;
   determining an interaction $I_{jk}^{O/H}$ comprising a M×P matrix, each element of the M×P matrix comprising a correlation between an overhead cost for a product M and a fraud detection activity P based on the transformed transaction data; and
   wherein the outlier transaction identification model further comprises the interaction $I_{jk}^{Pr}$ and the interaction $I_{jk}^{O/H}$.

Optionally, the selecting the selected control policy may further comprise:
   determining a coefficient $C_p$ based on the transformed transaction data;
   determining a coefficient $\beta_{c(j)}$ based on the transformed transaction data; and
   wherein the selected control policy further comprises the coefficient $C_p$ and the coefficient $\beta_{c(j)}$.

Optionally, the determining, at the intelligent agent, the coefficient $C_p$ may further comprise performing a gradient descent, and the determining, at the intelligent agent, a coefficient $\beta_{c(j)}$ further comprises performing a gradient descent.

Optionally, the determining, at the intelligent agent, the coefficient $C_p$ may further comprise performing a gradient descent, and the determining, at the intelligent agent, a coefficient $\beta_{c(j)}$ further comprises performing an iterative optimization algorithm as known, including but not limited to, simulated annealing, Markov random fields, particle swarm optimization, genetic algorithms, and other methods as known in the art.

Figure 8A:
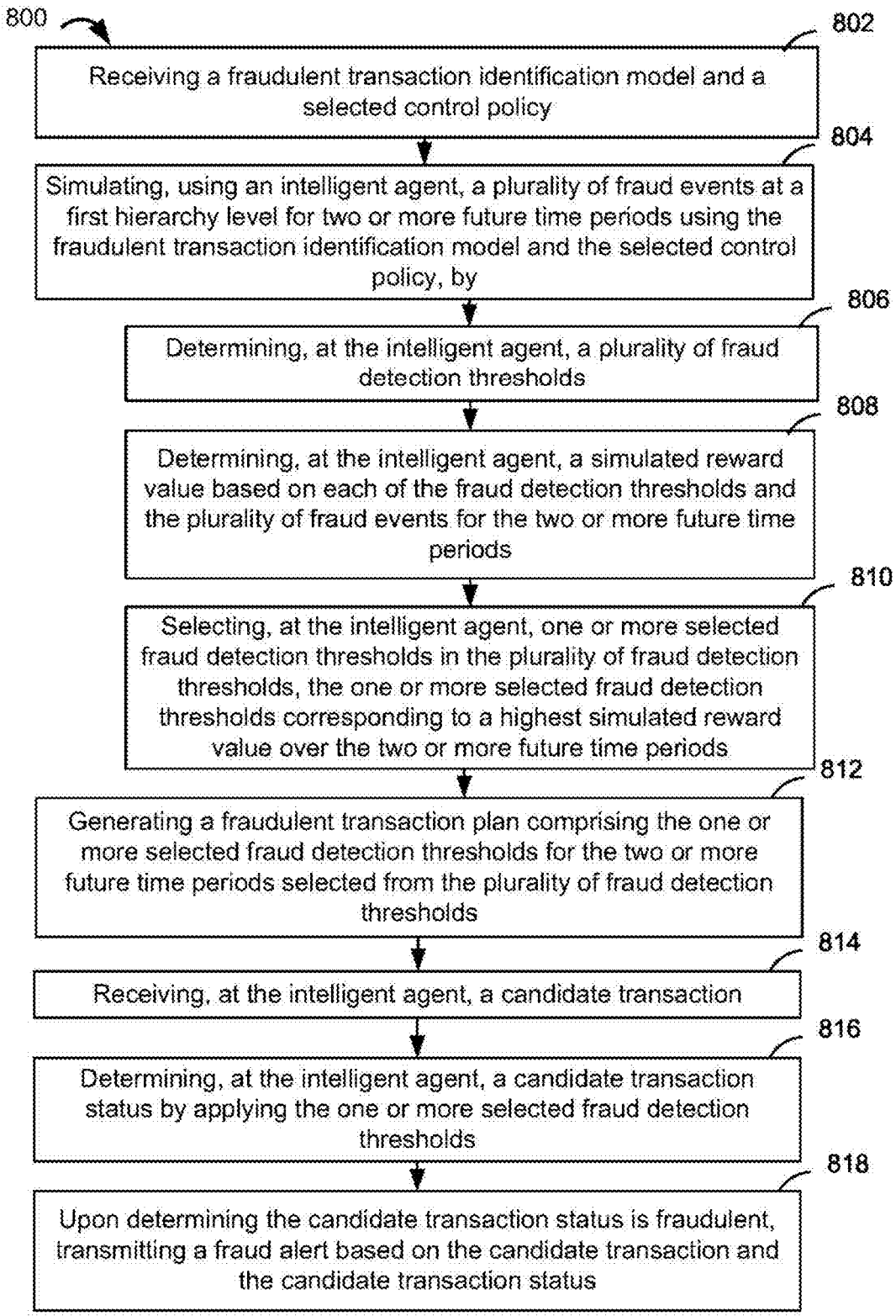
FIG. 8A shows another process flow diagram for using the outlier transaction identification model and selected control policy to determine if a candidate transaction is an outlier transaction in accordance with one or more embodiments.

Referring next to FIG. 8A, there is shown another process flow diagram 800 for using the outlier transaction identification model and selected control policy to determine if a candidate transaction is an outlier transaction in accordance with one or more embodiments.

At 802, receiving an outlier transaction identification model and a selected control policy.

At 804, simulating, using an intelligent agent, a plurality of fraud events at a first hierarchy level for two or more future time periods using the outlier transaction identification model and the selected control policy.

At 806, determining, at the intelligent agent, a plurality of fraud detection thresholds.

At 808, determining, at the intelligent agent, a simulated reward value based on each of the fraud detection thresholds and the plurality of fraud events for the two or more future time periods.

At 810, selecting, at the intelligent agent, one or more selected fraud detection thresholds in the plurality of fraud detection thresholds, the one or more selected fraud detection thresholds corresponding to a highest simulated reward value over the two or more future time periods.

At 812, generating a outlier transaction plan comprising the one or more selected fraud detection thresholds for the two or more future time periods selected from the plurality of fraud detection thresholds.

At 814, receiving, at the intelligent agent, a candidate transaction.

At 816, determining, at the intelligent agent, a candidate transaction status by applying the one or more selected fraud detection thresholds.

At 818, upon determining the candidate transaction status is an outlier, transmitting a fraud alert based on the candidate transaction and the candidate transaction status. Herein, fraud alerts may also be referred to as outlier alerts.

Optionally, the method may further comprise:
   comparing the one or more selected fraud detection thresholds to one or more constraints;
   upon determining that a particular selected fraud detection threshold violates a particular constraint in the one or more constraints, setting the particular selected fraud detection threshold to the particular constraint.

Optionally, the determining, at the intelligent agent, the candidate transaction status may further comprise performing fuzzy matching of the candidate transaction and the one or more selected fraud detection thresholds.

Optionally, the determining, at the intelligent agent, the candidate transaction status may further comprise:
   determining, at the intelligent agent, one or more entity statuses corresponding to one or more entities of the candidate transaction; and
   wherein the candidate transaction status is based on the one or more entity statuses.

Optionally, each of the one or more entities may comprise an entity category type.

Optionally, the determining, at the intelligent agent, the candidate transaction status may further comprise: determining, at the intelligent agent, one or more prior entity statuses corresponding to one or more prior entities, each of the one or more prior entity statuses corresponding to each of the one or more entity statuses of the candidate transaction in a prior time period.

Optionally, wherein the determining, at the intelligent agent, the candidate transaction status further comprises:
   determining, at the intelligent agent, an entity graph, the entity graph comprising one or more edges and the one or more entities, the one or more edges connecting the one or more entities;
   detecting, at the intelligent agent, a community comprising one or more matching entities in the one or more entities, and one or more matching edges in the one or more edges; and
   determining the candidate transaction status based on the community.

Optionally, the determining, at the intelligent agent, the community may further comprise performing fuzzy matching.

Optionally, the determining, at the intelligent agent, the candidate transaction status may further comprise applying the one or more selected fraud detection thresholds to the community.

Figure 8B:
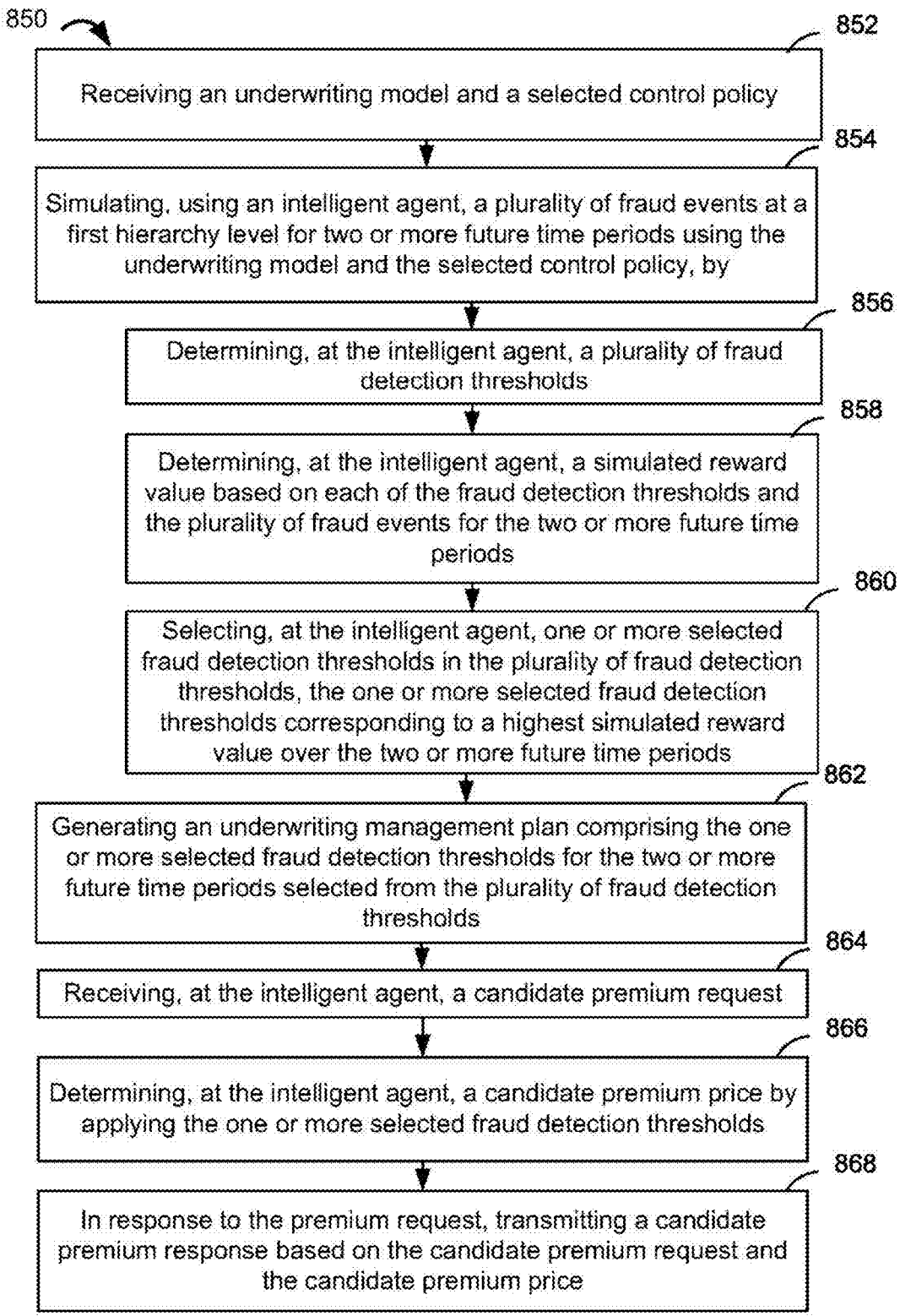
FIG. 8B shows another process flow diagram for using an underwriting model and selected control policy to determine a candidate premium response to a candidate premium price.

Referring to FIG. 8B, there is shown another process flow diagram 850 for using an underwriting model and selected control policy to determine a candidate premium response to a candidate premium price.

At 852, receiving an underwriting model and a selected control policy.

At 854, simulating, using an intelligent agent, a plurality of risk parameters at a first hierarchy level for two or more future time periods using the underwriting model and the selected control policy.

At 856, determining, at the intelligent agent, a plurality of risk thresholds.

At 858, determining, at the intelligent agent, a simulated reward value based on each of the risk thresholds and the plurality of risk parameters for the two or more future time periods.

At 860, selecting, at the intelligent agent, one or more selected risk thresholds in the plurality of risk thresholds, the one or more selected risk thresholds corresponding to a highest simulated reward value over the two or more future time periods.

At 862, generating an underwriting management plan comprising the one or more selected risk thresholds for the two or more future time periods selected from the plurality of risk thresholds.

At 864, receiving, at the intelligent agent, a candidate premium request.

At 866, determining, at the intelligent agent, a candidate premium price by applying the one or more selected risk thresholds.

At 868, in response to the premium request, transmitting a candidate premium response based on the candidate premium request and the candidate premium price.

Optionally, the method may further comprise comparing the one or more selected risk thresholds to one or more constraints; upon determining that a particular selected risk threshold violates a particular constraint in the one or more constraints, setting the particular selected risk threshold to the particular constraint.

Optionally, the determining, at the intelligent agent, the candidate premium price may further comprise performing fuzzy matching of the candidate premium request and the one or more selected risk thresholds; and wherein the fuzzy matching comprises at least one selected from the group of peer group fuzzification and defuzzification, peer rule fuzzification and defuzzification, peer predictive scoring fuzzification and defuzzification, and community/network fuzzification and defuzzification.

Optionally, the determining, at the intelligent agent, the candidate premium price may further comprise determining, at the intelligent agent, one or more entity statuses corresponding to one or more entities of the candidate premium request; and wherein the candidate premium price is based on the one or more entity statuses.

Optionally, each of the one or more entities may comprise an entity category type.

Optionally, the determining, at the intelligent agent, the candidate premium price may further comprise determining, at the intelligent agent, one or more prior entity statuses corresponding to one or more prior entities, each of the one or more prior entity statuses corresponding to each of the one or more entity statuses of the candidate premium price in a prior time period.

Optionally, the determining, at the intelligent agent, the candidate premium price may further comprise determining, at the intelligent agent, an entity graph, the entity graph comprising one or more edges and the one or more entities, the one or more edges connecting the one or more entities; detecting, at the intelligent agent, a community comprising one or more matching entities in the one or more entities, and one or more matching edges in the one or more edges; and determining the candidate premium price based on the community.

Optionally, the determining, at the intelligent agent, the community may further comprises performing fuzzy matching.

Optionally, the determining, at the intelligent agent, the candidate premium price may further comprise applying the one or more selected risk thresholds to the community.

I claim:

1. A computer-implemented method for generating an outlier transaction alert, the method comprising:
   providing, at a memory, an intelligent agent, comprising:
      a simulation component;
      a simulated state of an environment;
      an outlier transaction identification model; and
      a selected control policy,
   simulating at a processor in communication with the memory, using the intelligent agent, a plurality of fraud events at a first hierarchy level for two or more future time periods using the outlier transaction identification model, the selected control policy, the simulated state of the environment, by,
      determining, at the intelligent agent, a plurality of fraud detection thresholds, wherein each fraud detection threshold comprises a metric for an entity score;
      determining, at the intelligent agent, a simulated reward value based on a comparison of each of the fraud detection thresholds and the plurality of fraud events for the two or more future time periods;
      selecting, at the intelligent agent, one or more selected fraud detection thresholds in the plurality of fraud detection thresholds, the one or more selected fraud detection thresholds corresponding to a highest simulated reward value over the two or more future time periods;
   generating, at the processor, an outlier transaction plan comprising the one or more selected fraud detection thresholds for the two or more future time periods selected from the plurality of fraud detection thresholds;
   applying, at the intelligent agent, the outlier transaction plan to the simulated state of the environment;
   receiving, at the intelligent agent, a candidate transaction;
   determining, at the processor using the intelligent agent, a candidate transaction status by applying the one or more selected fraud detection thresholds;
   upon determining the candidate transaction status is an outlier, transmitting an outlier transaction alert based on the candidate transaction and the candidate transaction status, the outlier transaction alert comprising an estimated state and an estimated reward;
   receiving, at the intelligent agent, sensor data comprising a measured reward, wherein the sensor data is representative of a measured state of the environment;
   correcting, in a control loop, the simulated state of the environment based on the sensor data.

2. The method of claim 1, further comprising:
   comparing, at the processor, the one or more selected fraud detection thresholds to one or more constraints;
   upon determining that a particular selected fraud detection threshold violates a particular constraint in the one or more constraints, setting, in the memory, the particular selected fraud detection threshold to the particular constraint.

3. The method of claim 2, wherein the determining, at the processor using the intelligent agent, the candidate transaction status further comprises:

performing, at the processor, fuzzy matching of the candidate transaction and the one or more selected fraud detection thresholds; and
wherein the fuzzy matching comprises at least one selected from the groups of peer group fuzzification and defuzzification, peer rule fuzzification and defuzzification, peer predictive scoring fuzzification and defuzzification, and community/network fuzzification and defuzzification.

4. The method of claim 3, wherein the determining, at the processor using the intelligent agent, the candidate transaction status further comprises:
determining, at the processor using the intelligent agent, one or more entity statuses corresponding to one or more entities of the candidate transaction; and
wherein the candidate transaction status is based on the one or more entity statuses.

5. The method of claim 4, wherein each of the one or more entities comprises an entity category type.

6. The method of claim 5, wherein the determining, at the processor using the intelligent agent, the candidate transaction status further comprises:
determining, at the intelligent agent, one or more prior entity statuses corresponding to one or more prior entities, each of the one or more prior entity statuses corresponding to each of the one or more entity statuses of the candidate transaction in a prior time period.

7. The method of claim 6, wherein the determining, at the processor using the intelligent agent, the candidate transaction status further comprises:
determining, at the processor using the intelligent agent, an entity graph, the entity graph comprising one or more edges and the one or more entities, the one or more edges connecting the one or more entities;
detecting, at the processor using the intelligent agent, a community comprising one or more matching entities in the one or more entities, and one or more matching edges in the one or more edges; and
determining the candidate transaction status based on the community.

8. The method of claim 7, wherein the determining, at the processor using the intelligent agent, the community further comprises performing fuzzy matching.

9. The method of claim 7, wherein the determining, at the processor using the intelligent agent, the candidate transaction status further comprises:
applying the one or more selected fraud detection thresholds to the community.

10. A computer-implemented system for generating an outlier transaction alert, the system comprising:
a memory, comprising:
an intelligent agent, comprising:
a simulation component;
a simulated state of an environment;
an outlier transaction identification model; and
a selected control policy, and
a processor in communication with the memory, the processor configured to:
simulate, using the intelligent agent, a plurality of fraud events at a first hierarchy level for two or more future time periods using the outlier transaction identification model, the selected control policy, the simulated state of the environment, by,
determining a plurality of fraud detection thresholds, wherein each fraud detection threshold comprises a metric for an entity score;
determining a simulated reward value based on a comparison of each of the fraud detection thresholds and the plurality of fraud events for the two or more future time periods;
selecting one or more selected fraud detection thresholds in the plurality of fraud detection thresholds, the one or more selected fraud detection thresholds corresponding to a highest simulated reward value over the two or more future time periods;
generate an outlier transaction plan comprising the one or more selected fraud detection thresholds for the two or more future time periods selected from the plurality of fraud detection thresholds;
applying the outlier transaction plan to the simulated state of the environment;
receive a candidate transaction;
determine a candidate transaction status by applying the one or more selected fraud detection thresholds;
upon determining the candidate transaction status is an outlier, transmit an outlier transaction alert based on the candidate transaction and the candidate transaction status, the outlier transaction alert comprising an estimated state and an estimated reward;
receiving, at the intelligent agent, sensor data comprising a measured reward, wherein the sensor data is representative of a measured state of the environment; and
correcting, in a control loop, the simulated state of the environment based on the sensor data.

11. The system of claim 10, wherein the processor is further configured to:
compare the one or more selected fraud detection thresholds to one or more constraints;
upon determining that a particular selected fraud detection threshold violates a particular constraint in the one or more constraints, setting the particular selected fraud detection threshold to the particular constraint.

12. The system of claim 11 wherein the processor is further configured to determine the candidate transaction status by:
performing fuzzy matching of the candidate transaction and the one or more selected fraud detection thresholds.

13. The system of claim 12 wherein the processor is further configured to determine the candidate transaction status by:
determining one or more entity statuses corresponding to one or more entities of the candidate transaction; and
wherein the candidate transaction status is based on the one or more entity statuses.

14. The system of claim 13 wherein each of the one or more entities comprises an entity category type.

15. The system of claim 14 wherein the processor is further configured to determine the candidate transaction status by:
determining one or more prior entity statuses corresponding to one or more prior entities, each of the one or more prior entity statuses corresponding to each of the one or more entity statuses of the candidate transaction in a prior time period.

16. The system of claim 15 wherein the processor is further configured to determine the candidate transaction status further by:
determining an entity graph, the entity graph comprising one or more edges and the one or more entities, the one or more edges connecting the one or more entities;

detecting a community comprising one or more matching entities in the one or more entities, and one or more matching edges in the one or more edges; and determining the candidate transaction status based on the community.

17. The system of claim 16 wherein the processor is further configured to determine the community by performing fuzzy matching.

18. The system of claim 17 wherein the processor is further configured to determine the candidate transaction status by:

applying the one or more selected fraud detection thresholds to the community.

* * * * *